US006940647B2

(12) United States Patent
Islam et al.

(10) Patent No.: US 6,940,647 B2
(45) Date of Patent: Sep. 6, 2005

(54) APPARATUS AND METHOD FOR CONTROLLING POLARIZATION OF AN OPTICAL SIGNAL

(75) Inventors: Mohammed N. Islam, Allen, TX (US); Amos Kuditcher, Allen, TX (US)

(73) Assignee: Cheetah Omni, LLC, Ann Arbor, MI (US)

( * ) Notice: Subject to any disclaimer, the term of this patent is extended or adjusted under 35 U.S.C. 154(b) by 0 days.

(21) Appl. No.: 10/977,015

(22) Filed: Oct. 28, 2004

(65) Prior Publication Data

US 2005/0088738 A1 Apr. 28, 2005

Related U.S. Application Data

(63) Continuation of application No. 09/746,125, filed on Dec. 22, 2000, now Pat. No. 6,856,459.

(51) Int. Cl.[7] ........................ G02B 27/28; G02B 26/00; G02B 26/06

(52) U.S. Cl. ........................ 359/485; 359/499; 359/900; 359/290; 250/227.12

(58) Field of Search ................................. 359/290, 291, 359/483, 485, 487, 498, 499, 900; 250/227.12

(56) References Cited

U.S. PATENT DOCUMENTS

| | | | |
|---|---|---|---|
| 4,011,009 A | 3/1977 | Lama et al. | 350/162 R |
| 4,836,649 A | 6/1989 | Ledebuhr et al. | 350/331 |
| 4,900,119 A | 2/1990 | Hill et al. | 350/96.15 |
| 5,084,807 A | 1/1992 | McKechnie et al. | 362/228 |
| 5,153,752 A | 10/1992 | Kurematsu et al. | 359/40 |
| 5,212,743 A | 5/1993 | Heismann | 385/11 |
| 5,239,322 A | 8/1993 | Takanashi et al. | 353/31 |
| 5,278,595 A | 1/1994 | Nishida et al. | 353/78 |
| 5,311,360 A | 5/1994 | Bloom et al. | 359/572 |
| 5,374,968 A | 12/1994 | Haven et al. | 353/31 |
| 5,398,082 A | 3/1995 | Henderson et al. | 348/781 |
| 5,400,038 A | 3/1995 | Riza et al. | 342/375 |
| 5,430,454 A | 7/1995 | Refregier et al. | 342/375 |
| 5,459,610 A | 10/1995 | Bloom et al. | 359/572 |
| 5,473,457 A | 12/1995 | Ono | 359/161 |

(Continued)

FOREIGN PATENT DOCUMENTS

| | | | |
|---|---|---|---|
| JP | 06-118455 A | 4/1994 | G02F/1/31 |
| JP | 06-095035 | 8/1994 | G02B/27/28 |
| JP | 09-281537 A | * 10/1997 | |

OTHER PUBLICATIONS

K. E. Petersen, "Micromechanical Light Modulator Array Fabricated On Silicon," Applied Physics Letters, vol. 31, No. 8, pp. 521–523, Oct. 15, 1977.

O. Solgaard, et al., "Deformable Grating Optical Modulator," Optics Letters, vol. 17, No. 9, pp. 688–690, May 1, 1992.

(Continued)

*Primary Examiner*—John Juba, Jr.
(74) *Attorney, Agent, or Firm*—Baker Botts L.L.P.

(57) ABSTRACT

In one aspect of the invention, a polarization controller includes a first polarization beam splitter operable to receive an input optical signal having an input state of polarization and to separate the signal into a first and a second principal mode of polarization. The polarization controller further includes at least three stages of phase shifters each operable to introduce a phase shift between the first and second principal modes, at least one phase shifter comprising a beam splitter that is shared with at least one other of the phase shifters. The at least three stages of phase shifters include a first stage coupled to the first polarization beam splitter and a last stage coupled to a second polarization beam splitter. The second polarization beam splitter is operable to receive phase shifted copies of the first and second principal modes, and to align the phase shifted copies of the principal modes to an output state of polarization.

48 Claims, 19 Drawing Sheets

U.S. PATENT DOCUMENTS

| | | | | |
|---|---|---|---|---|
| 5,500,761 A | | 3/1996 | Goossen et al. | 359/290 |
| 5,654,819 A | | 8/1997 | Goossen et al. | 359/291 |
| 5,658,060 A | | 8/1997 | Dove | 353/33 |
| 5,659,412 A | | 8/1997 | Hakki | 359/156 |
| 5,659,418 A | | 8/1997 | Yurke | 359/290 |
| 5,661,592 A | | 8/1997 | Bornstein et al. | 359/291 |
| 5,701,193 A | | 12/1997 | Vogel et al. | 359/290 |
| 5,745,271 A | | 4/1998 | Ford et al. | 359/130 |
| 5,751,469 A | | 5/1998 | Arney et al. | 359/291 |
| 5,786,934 A | | 7/1998 | Chiu et al. | 359/494 |
| 5,793,511 A | | 8/1998 | Bulow | 359/161 |
| 5,822,100 A | | 10/1998 | Robinson et al. | 359/161 |
| 5,825,528 A | | 10/1998 | Goossen | 359/291 |
| 5,826,959 A | | 10/1998 | Atsuchi | 353/20 |
| 5,835,255 A | | 11/1998 | Miles | 359/291 |
| 5,841,579 A | | 11/1998 | Bloom et al. | 359/572 |
| 5,850,492 A | | 12/1998 | Morasca et al. | 385/11 |
| 5,859,939 A | | 1/1999 | Fee et al. | 385/24 |
| 5,860,720 A | | 1/1999 | Negishi et al. | 353/74 |
| 5,870,221 A | | 2/1999 | Goossen | 359/290 |
| 5,879,065 A | | 3/1999 | Shirochi et al. | 353/8 |
| 5,914,804 A | | 6/1999 | Goossen | 359/291 |
| 5,914,817 A | | 6/1999 | Browning et al. | 359/634 |
| 5,929,945 A | | 7/1999 | Negishi et al. | 348/825 |
| 5,930,414 A | | 7/1999 | Fishman et al. | 385/11 |
| 5,943,155 A | | 8/1999 | Goossen | 359/247 |
| 5,943,158 A | | 8/1999 | Ford et al. | 359/295 |
| 5,943,454 A | | 8/1999 | Aksyuk et al. | 385/22 |
| 5,949,571 A | | 9/1999 | Goossen et al. | 359/291 |
| 5,974,206 A | | 10/1999 | Bricheno et al. | 385/11 |
| 5,974,207 A | | 10/1999 | Aksyuk et al. | 385/24 |
| 5,982,554 A | | 11/1999 | Goldstein et al. | 359/629 |
| 5,986,796 A | | 11/1999 | Miles | 359/260 |
| 6,002,513 A | | 12/1999 | Goossen et al. | 359/291 |
| 6,017,123 A | | 1/2000 | Bleha et al. | 353/30 |
| 6,072,923 A | | 6/2000 | Stone | 385/16 |
| 6,104,515 A | | 8/2000 | Cao | 359/161 |
| 6,113,239 A | | 9/2000 | Sampsell et al. | 353/31 |
| 6,186,629 B1 | | 2/2001 | Iwamura et al. | 353/31 |
| 6,247,814 B1 | | 6/2001 | Lin | 353/20 |
| 6,309,071 B1 | | 10/2001 | Huang et al. | 353/31 |
| 6,375,330 B1 | | 4/2002 | Mihalakis | 353/31 |
| 6,430,345 B1 | | 8/2002 | Dultz et al. | 385/122 |
| 6,445,485 B1 | | 9/2002 | Frigo et al. | 359/246 |
| 6,473,244 B1 | | 10/2002 | Sugano | 359/794 |
| 6,498,673 B1 | | 12/2002 | Frigo et al. | 359/246 |
| 6,530,666 B1 | | 3/2003 | Smith et al. | 353/121 |
| 6,538,787 B1 | | 3/2003 | Moeller et al. | 359/158 |
| 6,557,999 B1 | | 5/2003 | Shimizu | 353/20 |
| 6,676,280 B1 | | 1/2004 | Takatsuka et al. | 362/372 |
| 6,778,782 B1 | * | 8/2004 | Watley et al. | 398/147 |
| 6,784,961 B2 | | 8/2004 | Suzuki et al. | 349/117 |
| 6,831,707 B2 | | 12/2004 | Fukuda | 349/9 |
| 2003/0099013 A1 | | 5/2003 | Su et al. | 359/124 |

OTHER PUBLICATIONS

W. R. Wiszniewski, et al., Mechanical Light Modulator Fabricated On A Silicon Chip Using Simox Technology, pp. 1027–1030.

M. W. Chbat, "High–spectral–efficiency transmission systems," OFC 2000, Baltimore, MD, pp TuJ1–1, 134–136, 2000.

J.W. Bayless, et al., "The Specification and Design of Bandlimited Digital Radio Systems," IEEE Transactions on Communications, vol. COM–27 (12): pp. 1763–1770, 1979.

D.E. Sene, et al., "Polysilicon Micromechanical Gratings for Optical Modulation," Elsevier vol. Sensors and Actiators (A 57), pp. 145–151, 1996.

D. M. Burns, et al., "Micro–Electro–Mechanical Variable Blaze Gratings," IEEE 10th Annual International Workshop on Micro Mechanical Systems, pp. 385–391, 1997.

Bulow, H., et al., "Measurement of the Maximum Speed of PMD Fluctuation in Installed Field Fiber," OFC '99, pp. WE4–1, 83–85, 1999.

A. Mecozzi, et al., "A simple compensator for high order polarization mode dispersion effects," OFC 2000, Baltimore, MD, pp. WL201, 192–194, 2000.

M. W. Chbat, "Mitigation of Polarization Mode Dispersion," OFC '99, San Diego, CA, pp. TuB3, 151–152, 1999.

Z. Pan, et al., "Chirp–Free Tunable PMD Compensation using Hi–Bi Nonlinearly–Chirped FBGs in a Dual–Pass Configuration," OFC 2000, Baltimore, MD, pp. ThH2–1, 113–115, 2000.

L. Y. Lin, et al., "Micromachined polarization–state controller and its application to polarization–mode dispersion compensation," OFC 2000, Baltimore, MD, pp. ThQ3–1, 244–246, 2000.

S. Lee, et al., "High–birefringence nonlinearly–chirped fiber Bragg grating for tunable compensation of polarization mode dispersion," OFC '99, San Diego, CA, pp. TuS3–1, 272–274, 1999.

J.W. Bayless, et al., "High Density Digital Data Transmission," National Telecommunications Conference, Dallas, TX, pp. 1–6, 1976.

Rudkevich et al., "Understanding polarization–mode dispersion," www.optoelectronics–world.com, 3 pages, Jun. 2000.

T. Takahashi, et al, "Automatic Compensation Technique for Timewise Fluctuating Polarisation Mode Dispersion in In–Line Amplifier Systems," Electronic Letters vol. 30 (4), pp. 348–349, 1994.

R.W. Corrigan, et al., "17.3: Calibration of a Scanned Linear Grating Light Value™ Projection System," www.siliconlight.com, 1999.

SLM "GLV Technology," www.siliconlight.com, 1999.

R.W. Corrigan, et al., "Grating Light Valve Technology for Projection Displays," Presented at the International Display Workshop, Kobe, Japan, 1998.

M. Ming, et al., "Principles and Applications of Optical Communications," Irwin, pp. 468 & 470, 1996.

R. Noe, et al., "Endless Polarization Control Systems for Coherent Optics," Journal of Lightwave Technology, vol. 6 (7), pp. 1199–1208, 1988.

F. Heismann, "Analysis of a Reset–Free Polarization Controller for Fast Automatic Polarization Stabilization in Fiber–optic Transmission Systems," Journal of Lightwave Technology, vol. 12 (4), pp. 690–699, 1994.

SLM "The Grating Light Valve Technology," www.siliconlight.com, 1999.

SLM "The Scanned Grating Light Valve Display Architecture," www.siliconlight.com, 1999.

A. Willner, "WDM Systems 1," OFC '97, Dallas, TX, pp. TuJ, 43–45, 1997.

F. Heismann, et al., "Automatic Compensation of First–Order Polarization Mode Dispersion in a 10 Gb/s Transmission System," ECOC '98, Madrid, Spain, pp. 529–530, 1998.

T. Ono, et al., "Key Technologies for Terabit/Second WDM Systems with High Spectral Efficiency of Over 1 bit/s/Hz," IEEE Journal, vol. 34 (11), pp. 20802088, Nov. 1998.

C. Pu, et al., "Michromachined Integrated Optical Polarization–State Rotator," IEEE Photonics Technology Letters, vol. 12 (10), pp. 1358–1360, Oct. 2000.

A. D. Sandel, et al., "Automatic Polarisation Mode Dispersion Compensation in 40 Gbit/s Optical Transmission System," Electronic Letters, vol. 34 (23), pp. 2258–2259, 1998.

H. Y. Pua, et al., "An Adaptive First–Order Polarization–Mode dispersion Compensation System Aided by Polarization Scrambling: Theory and Demonstration," Journal of Lightwave Technology, vol. 8 (6), pp. 832–841, 2000.

T. Kudou, et al., "Theoretical Basis of Polarization Mode Dispersion Equalization Up To The Second Order," Journal of Lightwave Technology, vol. 18 (4), pp. 614–617, 2000.

H. Kogelnik, et al., "Jones Matrix for Second–Order Polarization Mode Dispersion," Optics Letters, vol. 25 (1), pp. 19–21, 2000.

R. Noe, et al., "Polarisation Mode Dispersion Compensation at 20 Gbit/s with Fibre–Based Distributed Equaliser," Electronic Letters, vol. 34 (25), pp. 2421–2422, 1998.

D. A. Watley, et al., "Compensation of Polarisation–Mode Dispersion Exceeding One Bit Period Using Single High–Birefringence Fibre," Electronic Letters, vol. 35 (13), pp. 1094–1095, 1999.

H. Sunnerud, et al., "Analytical Theory for PMD–Compensation," IEEE Photonics Technology Letters, vol. 12 (1), pp. 50–52, 2000.

H. C. Lefevre, "Single–Mode Fibre Fractional Wave Devices and Polarisation Controllers," Electronic Letters, vol. 16 (20), pp. 778–780, 1980.

M. Sharma, et al., "Optical Circuits for Equalizing Group Delay Dispersion of Optical Fibers," Journal of Lightwave Technology, vol. 12 (10), pp. 1759–1765, 1994.

T. Ozeki, et al., "Polarization–Mode–Dispersion Equalization Experiment Using A Variable Equalizing Optical Circuit Controlled by a Pulse–Waveform–Comparison Algorithm," OFC '94, San Jose, CA, pp. TuN4, 62–64, 1994.

J. H. Winters, et al., "Experimental Equalization of Polarization Dispersion," IEEE Photonics Technology Letters, vol. 2 (8), pp. 591–593, 1990.

D. T. Amm, et al., "5.2: Grating Light Valve™ Technology: Update and Novel Applications," Presented at Society for Information Display Symposium, Anaheim, CA, pp. 1–4, May 1998.

D. M. Bloom, "The Grating Light Valve: revolutionizing display technology," www.siliconlight.com, 1998.

D. T. Amm, et al., "Optical Performance of the Grating Light Valve Technology," Presented at Photonics West–Electronic Imaging, Sunnyvale, CA, pp. 1–8, 1999.

M. W. Chbat, et al., "Long Term Field Demonstration of Optical PMD Compensation on an Installed OC–192 Link," OFC '99, San Diego, CA, pp. Post–deadline paper PD12, 1999.

J. E. Ford, et al., "Fiber–Coupled Variable Attenuator Using a MARS Modulator," SPIE, vol. 3226, pp. 86–96, 1997.

D. M. Burns, et al., "Development of Michromechanical Variable Blaze Gratings," Elsevier Science S.A., vol. Sensors and Actuators, pp. 7–15, 1998.

C. K. Madsen, et al., "A Tunable Dispersion Compensating MEMS All–Pass Filter," IEEE Photonics Technology Letters, vol. 12 (6),pp. 651–653, 2000.

J. E. Ford, et al., "Passband–Free Dynamic WDM Equalization," ECOC '98, Madrid, Spain, pp. 317–318, 1998.

K. W. Goossen, et al., Micromechanical Gain Slope Compensator for Spectrally Linear Optical Power Equalization, 2000.

K. W. Goossen, et al., "Silicon Modulator Based on Mechanically–Active Anti–Reflection Layer with 1 Mbit/sec Capability for Fiber–in–the–Loop Applications," IEEE Photonics Technology Letters, vol. 6 (9), pp. 1119–1121, 1994.

L. Y. Lin, et al., "Angular–Precision Enhancement in Free–Space Micromachined Optical Switches," IEEE Photonics Technology Letters, vol. 11 (10), pp. 1253–1255, 1999.

L. Y. Lin, et al., "Free–Space Micromachined Optical Switches with Submillisecond Switching Time for Large–Scale Optical Crossconnects," IEEE Photonics Technology Letters, vol. 10 (4), pp. 525–527, 1998.

L. Y. Lin, et al., "Optical Crossconnects for High–capacity Lightwave Networks," Journal of High Speed Networks, pp. 17–34, 1999.

E. P. Furlani, et al., "Analysis of grating light valves with partial surface electrodes," American Institute of Physics, vol. 83 (2), pp. 629–634, 1998.

E. P. Furlanl, et al., "Theory and simulation of viscous damped reflection phase gratings," J. Phys. D: Appl. Phys., vol. 32, pp. 412–416, 1999.

K. Aratani, et al., "Surface micromachined tuneable interferometer array," Sensors and Actuators, vol. 43, pp. 17–23, 1994.

R. T. Howe, et al., "Polycrystalline Silicon Micromechanical Beams," Journal Electrochemical Society, vol. 130 (6), pp. 1420–1423, 1983.

S. R. Mallinson, "Wavelength–selective filters for single–mode fiber WDM systems using Fabry–Perot interferometers," Applied Optics, vol. 26 (3), pp. 430–436, 1987.

N. G. Walker, et al., "Polarization Control for Coherent Communications," Journal of Lightwave Technology, vol. 8 (3), pp. 438–458, 1990.

T. Okoshi, "Polarization–State Control Schemes for Heterodyne or Homodyne Optical Fiber Communications," Journal of Lightwave Technology, vol. LT–3 (6), pp. 1232–1236, 1985.

L. Y. Lin, et al., "Micromachined Polarization–state–controller and its Application to Polarization–mode Dispersion–compensation," OFC 2000, Baltimore, MD, pp. ThQ3–1, 144–246, 2000.

L. Y. Lin, et al., "Optical–layer Networking: Opportunities for and Progress in LIghtwave Micromachines," OFC 2000, Baltimore, MD, pp. 1–88, 2000.

Burnett et al., "Diffraction and Interference," in E. U. Condon and H. Odishaw, eds., *Handbook of Physics* (McGraw–Hill, New York, Toronto, and London), pp. 6–102 and 6–103, 1958.

"Polarization Mode Dispersion (PMD)," Cables & Components Technical Papers, http://www.usa.alcatel.com/cc/techprs/fnlpmd2.htm, 2000.

Curtis Menyuk, University of Maryland, Baltimore County "PMD in Optical Transmission System," Menyuk tutorial, OFC 2000, pp. 78–97 specifically pp. 92–94, Mar. 2000.

Yeh, et al., "Overcoming Polarization Impairments," Fiberoptic Product News www.fpnmag.com Special Feature, 5 pages, Oct. 2000.

Walker et al., "Endless Polarisation Control using Four Fibre Squeezers," Electronics Letters, vol. 23, No. 6, 3 pages, Mar. 12, 1987.

Nelson, et al., "Polarization Mode Dispersion Measurement and Impact on High Bit–rate Systems," Lucent Technologies and Bell Labs Innovations, OOA/IPR2000, Paper JWA2, 34 pages, Jul. 12, 2000.

Girard et al., "PDM: The New Telecommunication Frontier Emerges," Laser & Optronics®, FIBEROPTICS, http://www.laseroptmag.com, 6 pages, Feb. 1997.

Mark Shtaif, et al., "A Compensator for the Effects of High–Order Polarization Mode Dispersion in Optical Fibers," IEEE Photonics Tech. Letters, vol. 12, No. 4, pp. 434–436, Apr. 2000.

C. M. Ragdale, et al., "Integrated Laser and Add–Drop Optical Multiplexer for Narrowband Wavelength Division Multiplexing," Electronic Letters, vol. 28, No. 89, pp. 712–714, Apr. 9, 1992.

K. Aratani, et al., "Process and Design Considerations for Surface Micromachined Beams for A Tuneable Interferometer Array in Silicon," Handbook of Physics, pp. 230–235, 1993.

F. Roy, et al., "A simple dynamic polarization mode dispersion compensator," OFC '99, San Diego, CA, pp. TuS4–1, 275–277, 1999.

C. Marxer, et al., "Megahertz Opto–Mechanical Modulator," Elsevier Science S.A., pp. 46–50, 1996.

C. M. Ragdale, et al., "Integrated Three Channel Laser and Optical Multiplexer for Narrowband Wavelength Division Multiplexing," Electronics Letters, vol. 30, No. 11, pp. 897–898, May, 26, 1994.

K. O. Hill, et al., "Narrow–Bandwidth Optical Waveguide Transmission Filters," Electronic Letters, vol. 23, No. 9, pp. 465–466, Apr. 23, 1987.

* cited by examiner

FIG. 16a
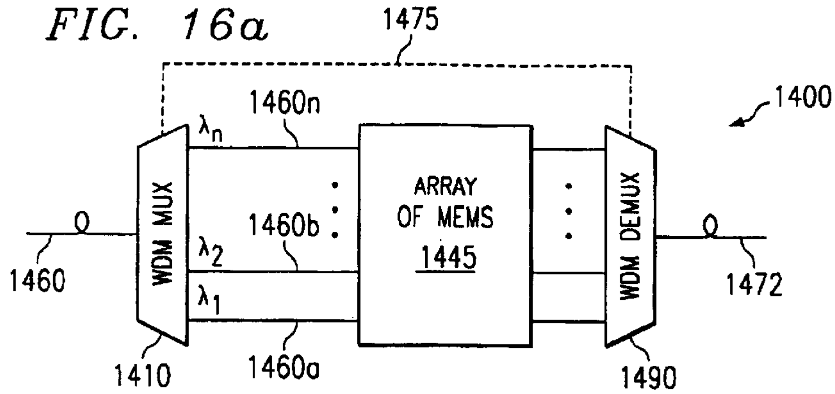
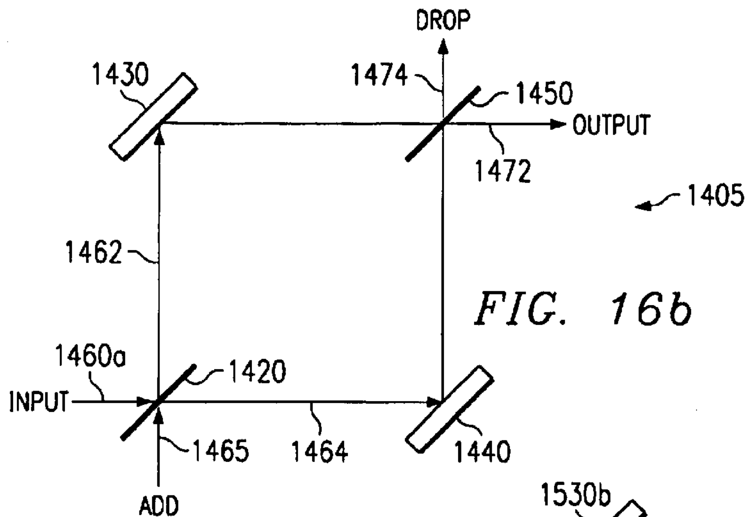
FIG. 16b
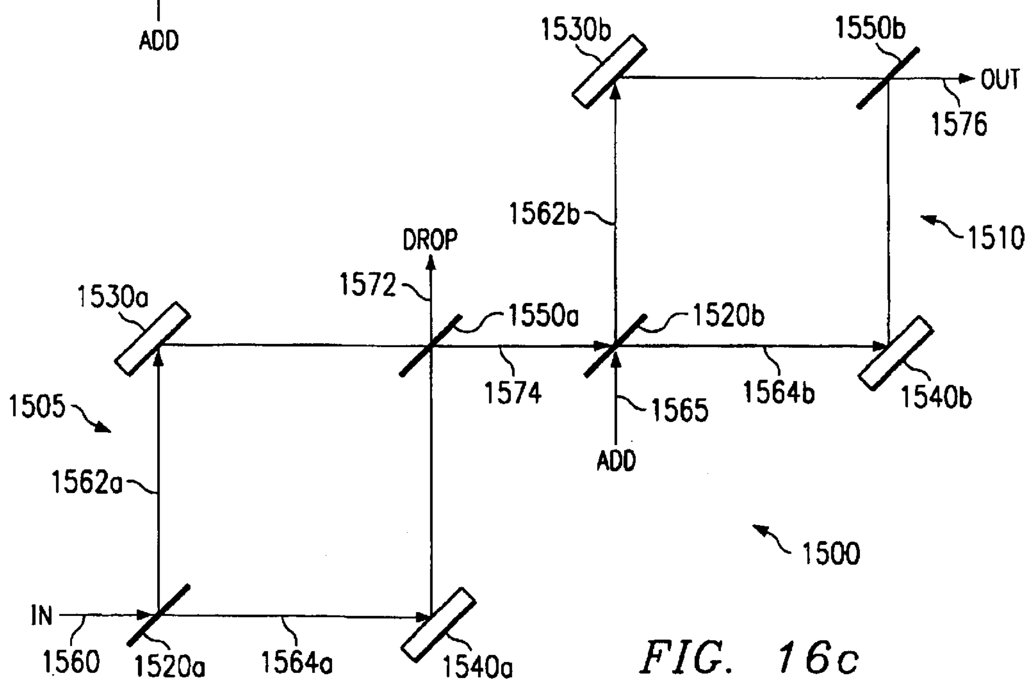
FIG. 16c

APPARATUS AND METHOD FOR CONTROLLING POLARIZATION OF AN OPTICAL SIGNAL

RELATED APPLICATIONS

This application is a continuation of application Ser. No. 09/746,125, entitled "Apparatus and Method for Controlling Polarization of an Optical Signal," filed Dec. 22, 2000, now U.S. Pat. No. 6,856,459. Application Ser. No. 09/746,125 is related to application Ser. No. 09/746,850, entitled "Apparatus and Method for High Speed Optical Signal Processing," filed on Dec. 22, 2000; to application Ser. No. 09/746,822, entitled "Apparatus and Method for Optical Add/Drop Multiplexing," filed on Dec. 22, 2000; and to application Ser. No. 09/746,813, entitled "entitled "Apparatus and Method for Providing Gain Equalization," filed on Dec. 22, 2000.

TECHNICAL FIELD OF THE INVENTION

The present invention relates to the field of communication systems, and more particularly to an apparatus and method operable to facilitate control of the state of polarization of one or more optical signals.

BACKGROUND OF THE INVENTION

As optical systems continue to increase the volume and speed of information communicated, polarization controllers are becoming increasingly important optical networking elements. For example, polarization controllers are essential in polarization multiplexed lightwave transmission systems. These systems can operate in a number of ways. In one embodiment, alternate bits can be polarized orthogonal to one another and combined to create a faster overall transmission rate. In another embodiment, densely packed adjacent wavelengths can be orthogonally polarized to minimize interaction between the adjacent wavelengths. In either case, a polarization controller is used to appropriately align the signals' states of polarization.

As another example, polarization controllers can be useful in upgrading the operation of polarization sensitive optical components. Where an optical component's performance changes depending on the state of polarization of the signal it processes, a polarization controller can be used to align the signal's state of polarization with the state that maximizes the device's performance.

Polarization controllers also find application in devices used to mitigate polarization mode dispersion arising in optical signals. Most all optical fibers exhibit non-circular—typically elliptical—core shapes, which result in the fiber having two principal axes having different modal indices. The orientation of these axes varies randomly with position and time. Signals polarized parallel to the two principal axes experience differential delay, which—coupled with the random variation in polarization modes—leads to pulse broadening, intersymbol interference, and bit error ratio (BER) impairment. These types of phenomena are typically referred to as polarization mode dispersion. Polarization mode dispersion can limit an optical system's transmission range by $1/R^2$, where R represents the system's channel rate. Many communication systems consider unacceptable any pulse broadening greater than ten percent of the bit period. As a result, it has been estimated that polarization mode dispersion renders over twenty percent of all currently deployed fiber unsuitable for transmission at ten Giga-bits per second, and over 75% of all installed fiber unsuitable for transmission at forty Giga-bits per second. Polarization controllers can be used in polarization mode dispersion compensators, for example, to help align the principal states of polarization with appropriate axes of a polarization delay line.

Various techniques have been devised to attempt to control or modify the state of polarization of optical signals. For example, butterfly polarization controllers exist consisting of multiple rings of fiber that are physically rotated with respect to each other. This approach, however, is too slow to be effective for most applications. Another approach is to mechanically squeeze the fiber at strategic locations and times. This technique is also typically to slow to be of practical use. Lithium niobate based polarization controllers have been produced that exhibit acceptable speeds. However, these devices can be prohibitively expensive, even in a single wavelength application.

Another approach uses polarization rotators constructed from micro-machined movable mirrors to help rotate the state of polarization of an incoming signal. This approach suffers, however, because it requires either physical rotation of the polarization rotators, or requires insertion of bulk wave plates between each of the polarization rotators. These limitations make it difficult, if not impossible, to package arrays of the polarization controllers, and can result in high fabrication costs. The design and fabrication cost of these devices generally renders them unsuitable for multiple wavelength applications.

Another device that is somewhat related to a polarization controller, which is designed for integrated waveguide implementation, uses two phase shift stages coupled to a variable delay line. This approach suffers because requiring a variable delay line typically results in greater expense than a fixed delay element, and generally requires more complex and expensive control circuitry.

SUMMARY OF THE INVENTION

The present invention recognizes a need for a method and apparatus operable to economically facilitate control of an optical signal's state of polarization. In accordance with the present invention, an apparatus and method operable to assist in polarization control are provided that substantially reduce or eliminate at least some of the shortcomings associated with prior approaches.

In one aspect of the invention, a polarization controller comprises a first polarization beam splitter operable to receive an input optical signal having an input state of polarization and to separate the signal into a first and a second principal mode of polarization. The polarization controller further comprises at least three stages of phase shifters each operable to introduce a phase shift between the first and second principal modes, at least one phase shifter comprising a beam splitter that is shared with at least one other of the phase shifters. The at least three stages of phase shifters include a first stage coupled to the first polarization beam splitter and a last stage coupled to a second polarization beam splitter. The second polarization beam splitter is operable to receive phase shifted copies of the first and second principal modes, and to align the phase shifted copies of the principal modes to an output state of polarization.

In another aspect of the invention, a polarization controller comprises a polarization beam splitter operable to separate an optical signal into a first and a second principal mode of polarization, and at least two stages of phase shifters each operable to introduce a phase shift between the first and second principal modes. At least one phase shifter comprises a beam splitter that is shared with at least one other of the phase shifters, and at least one of the phase shifters comprises a micro-electro-optic system (MEMS) device comprising a moveable mirror layer operable to receive one of the principal modes of polarization and to change its position to contribute to a relative phase difference between the first and second principal modes.

In still another aspect of the invention, a polarization controller comprises at least two stages of phase shifters each operable to receive a first and a second principal mode of polarization of an optical signal, and to introduce a phase shift between the first and second principal modes. At least one phase shifter includes a beam splitter that is shared with at least one other of the phase shifters, and each of the phase shift stages is operable to introduce a phase shift between the first and second principal modes in less than one millisecond.

One other aspect of the invention comprises an endlessly rotatable polarization controller including at least two stages of phase shifters each operable to receive a first and a second principal mode of polarization of an optical signal, and to introduce a phase shift between the first and second principal modes, at least one phase shifter comprising a beam splitter that is shared with at least one other of the phase shifters. Each of the phase shift stages comprises a micro-electro-mechanical system (MEMS) device including a moveable mirror layer operable to change its position to contribute to a relative phase shift between the first and second modes, the moveable mirror layer operable to change positions at a faster rate than a rate of change of the polarization of the optical signal.

In another aspect of the invention, a polarization mode dispersion (PMD) compensator comprises a first polarization beam splitter operable to receive an input optical signal and to separate the signal into a first and a second principal mode of polarization and at least three stages of phase shifters each operable to introduce a phase shift between the first and second principal modes. At least one phase shifter comprises a beam splitter that is shared with at least one other of the phase shifters. The at least three stages of phase shifters comprising a first stage coupled to the first polarization beam splitter and a last stage coupled to a second polarization beam splitter wherein the second polarization beam splitter is operable to receive phase shifted copies of the first and second principal modes, and to align the phase shifted copies of the principal modes to principal axes of a fixed delay element coupled to the second polarization beam splitter.

In yet another aspect of the invention, a PMD compensator comprises a variable delay line and a polarization controller coupled to the variable delay line. The polarization controller is operable to receive an optical signal having an input state of polarization and to align an output state of polarization of the optical signal to the variable delay line. The polarization controller comprises a polarization beam splitter operable to separate the optical signal into a first and a second principal mode of polarization, and at least two stages of phase shifters each operable to introduce a phase shift between the first and second principal modes. At least one phase shifter includes a beam splitter that is shared with at least one other of the phase shifters. At least one of the phase shifters comprises a micro-electro-optic system (MEMS) device comprising a moveable mirror layer operable to receive one of the principal modes of polarization and to change its position to contribute to a relative phase difference between the first and second principal modes.

Another aspect of the invention comprises a variable delay line including a first polarization maintaining fiber coupled to a first polarization beam splitter, the first polarization beam splitter operable to receive an input optical signal and to separate the signal into a first and a second principal mode of polarization. The variable delay line further includes at least three stages of phase shifters each operable to introduce a phase shift between the first and second principal modes, at least one phase shifter comprising a beam splitter that is shared with at least one other of the phase shifters. The at least three stages of phase shifters comprise a first stage coupled to the first polarization beam splitter and a last stage coupled to a second polarization beam splitter, wherein the second polarization beam splitter is operable to receive phase shifted copies of the first and second principal modes, and to align the phase shifted copies of the principal modes to principal axes of a second polarization maintaining fiber coupled to the second polarization beam splitter.

In another aspect of the invention, a system operable to facilitate mitigation of polarization mode dispersion in optical signals carrying multiple wavelengths of light comprises a wavelength division demultiplexer operable to receive the optical signal and to separate the optical signal into a plurality of wavelengths. The system further comprises an array of phase shift based polarization controllers coupled to the wavelength division demultiplexer. Each polarization controller is operable to receive one wavelength and to introduce a phase shift between two principal modes of polarization of the wavelength to align the wavelength with two principal axes of a delay element, the principal axes of the delay element comprising a fast principal axis and a slow principal axis. The delay element is operable to receive the phase shifted wavelengths and to communicate a leading mode of polarization parallel with the slow axis and a lagging mode of polarization parallel with the fast axis.

In another aspect of the invention, an optical communication system comprises an optical source operable to communicate an optical signal, an optical receiver operable to receive the optical signal, and a plurality of fiber spans coupling the optical source to the optical receiver. The system further comprises a plurality of in-line optical amplifiers each coupled between two of the plurality of fiber spans, and a polarization mode dispersion (PMD) compensator coupled between the receiver and the in-line optical amplifier closest to the receiver. The system still further includes a margin enhancing element coupled to one of the fiber spans and operable to increase the margin of the optical signal relative to noise associated with the optical signal.

In still another aspect of the invention, a system operable to facilitate polarization multiplexing of multiple signal wavelengths comprises a wavelength division demultiplexer operable to receive an optical signal carrying substantially orthogonally polarized neighboring wavelength signals and to substantially separate the neighboring wavelength signals from one another. The system further comprises an array of phase shift based polarization controllers coupled to the wavelength division demultiplexer, each operable to receive one wavelength and adjust the state of polarization of the wavelength to facilitate separation of the wavelength from its neighboring wavelengths. Each of the phase shift-based polarization controllers comprises a first polarization beam splitter operable to receive an input wavelength signal having an input state of polarization and to separate the signal into a first and a second principal mode of polarization, and at least three stages of phase shifters. Each phase shifter stage is operable to introduce a phase shift between the first and second principal modes, at least one phase shifter comprising a beam splitter that is shared with at least one other of the phase shifters. The at least three stages of phase shifters include a first stage coupled to the first polarization beam splitter and a last stage coupled to a second polarization beam splitter. The second polarization beam splitter is operable to receive phase shifted copies of the first and second principal modes, and to align the phase shifted copies of the principal modes to an output state of polarization.

In another aspect of the invention, a system operable to facilitate coherent optical communication comprises a local oscillator operable to generate a local optical signal and an optical mixer operable to receive an incident optical signal and the local optical signal and to combine the incident optical signal with the local optical signal to generate a combined signal. The system further includes a polarization controller operable to receive either the local optical signal or the incident optical signal and to adjust the state of polarization of the received signal to ensure that the received signal is not polarized orthogonally to the other signal when the signals are combined at the optical mixer. The polarization controller comprises a first polarization beam splitter operable to receive an input wavelength signal having an input state of polarization and to separate the signal into a first and a second principal mode of polarization and at least three stages of phase shifters. Each phase shifter stage is operable to introduce a phase shift between the first and second principal modes, at least one phase shifter comprising a beam splitter that is shared with at least one other of the phase shifters. The at least three stages of phase shifters include a first stage coupled to the first polarization beam splitter and a last stage coupled to a second polarization beam splitter. The second polarization beam splitter is operable to receive phase shifted copies of the first and second principal modes, and to align the phase shifted copies of the principal modes to an output state of polarization.

In yet another aspect of the invention, a method of controlling the state of polarization of an optical signal comprises receiving an optical signal having an input state of polarization and separating the optical signal into a first principal mode of polarization and a second principal mode of polarization. The method further comprises introducing at least three stages of phase shift between the first and second modes of polarization to align the first and second modes of polarization with a desired output state of polarization. Each of the at least three stages of phase shift are introduced by one of at least three phase shift stages, at least one phase shift stage sharing a beam splitter with at least one other phase shift stage.

According to yet another aspect of the invention, a method of controlling the state of polarization of an optical signal comprises receiving an optical signal having an input state of polarization and separating the optical signal into a first principal mode of polarization and a second principal mode of polarization. The method further comprises introducing at least two stages of phase shift between the first and second modes of polarization to align the first and second modes of polarization with a desired output state of polarization. Each of the at least two stages of phase shift are introduced by one of at least two phase shift stages, at least one phase shift stage sharing a beam splitter with at least one other phase shift stage, at least one phase shift stage comprising a micro-electro-optic system (MEMS) device operable to change its position to alter the phase of the first principal mode relative to the phase of the second principal mode.

In another aspect of the invention, a method of mitigating polarization mode dispersion comprises separating an optical signal into a first principal mode of polarization and a second principal mode of polarization, one of the first and second modes comprising a leading mode and one of the first and second modes comprising a lagging mode. The method further comprises introducing at least three stages of phase shift between the leading and lagging modes of polarization to align the leading mode with a slow principal axis of a fixed delay element and the lagging mode with a fast principal axis of the fixed delay element. The method also includes communicating the leading mode parallel to the slow axis and the lagging mode parallel to the fast axis. Each of the at least three stages of phase shift are introduced by one of at least three phase shift stages, at least one phase shift stage sharing a beam splitter with at least one other phase shift stage.

In yet another aspect of the invention, a method of mitigating polarization mode dispersion comprises separating an optical signal into a first principal mode of polarization and a second principal mode of polarization, one of the first and second modes comprising a leading mode and one of the first and second modes comprising a lagging mode. The method further includes introducing at least two stages of phase shift between the leading and lagging modes of polarization to align the leading mode with a slow principal polarization axis of a variable delay element and the lagging mode with a fast principal polarization axis of the variable delay element. In addition, the method includes communicating the leading mode parallel to the slow axis and the lagging mode parallel to the fast axis. Each of the at least two stages of phase shift are introduced by one of the at least two phase shift stages, at least one phase shift stage sharing a beam splitter with at least one other phase shift stage. At least one phase shift stage comprises a micro-electro-optic system (MEMS) device operable to change its position to alter the phase of the first principal mode relative to the phase of the second principal mode.

In still another aspect of the invention, a method of providing variable delay between modes of polarization in an optical signal comprises receiving an optical signal from a first polarization maintaining fiber and separating the optical signal into a first principal mode of polarization and a second principal mode of polarization, one of the first and second modes comprising a leading mode and one of the first and second modes comprising a lagging mode. The method further includes introducing at least three stages of phase shift between the leading and lagging modes of polarization to align the leading mode with a slow principal axis of a second polarization maintaining fiber and the lagging mode with a fast principal axis of the second polarization maintaining fiber. The method also comprises communicating the leading mode parallel to the slow axis and the lagging mode parallel to the fast axis. Each of the at least three stages of phase shift are introduced by one of at least three phase shift stages, at least one phase shift stage sharing a beam splitter with at least one other phase shift stage.

In another aspect of the invention, a method of mitigating polarization mode dispersion in multiple wavelengths of an optical signal comprises separating an optical signal into a plurality of wavelengths and communicating at least some of the wavelengths to an array of polarization controllers, each polarization controller operable to receive one wavelength. At each polarization controller, the method comprises separating the wavelength into a first principal mode of polarization and a second principal mode of polarization, introducing phase shift between the first and second modes of polarization to align the principal modes of polarization with principal axes of a delay element, and communicating one principal mode parallel to one principal axis of the delay element and the other principal mode parallel to the other principal axis of the delay element.

Depending on the specific features implemented, particular embodiments of the present invention may exhibit some, none, or all of the following technical advantages. One aspect of the present invention provides an effective and cost efficient mechanism for controlling the polarization of one or more optical signals. The invention provides significant advantages over other polarization controller designs, by facilitating alignment of an optical signal's state of polarization without requiring the use of physical rotation of the compensator, physical squeezing of the fiber communication line, the use of expensive lithium niobate waveguide devices, the use of bulk wave plates between stages of phase shifters, or the use of variable delay elements. The novel polarization controller may be implemented, for example, in a PMD compensator, in a polarization multiplexed lightwave transmission system, in a coherent optical communication system, or in conjunction with one or more polarization sensitive optical components.

In a particular embodiment where the polarization controller is implemented into a PMD compensator, the controller facilitates mitigation of polarization mode dispersion with either a fixed or a variable delay line, but does not require the use of more expensive variable delay elements.

Implementing phase shifter based polarization controllers using MEMs devices that do not require intermediate bulk waveguide devices allows for fabrication of arrays of these devices at an incremental additional cost to fabricating a single compensator. This aspect of the invention provides significant advantages in facilitating rapid, effective, and economical polarization control, particularly in a multiple wavelength environment.

Other technical advantages are readily apparent to one of skill in the art from the attached figures, description, and claims.

BRIEF DESCRIPTION OF THE DRAWINGS

For a more complete understanding of the present invention, and for further features and advantages thereof, reference is now made to the following description taken in conjunction with the accompanying drawings, in which:

FIG. 16*a* is a block diagram showing one embodiment of an exemplary wave division add/drop multiplexer architecture constructed according to the teachings of the present invention;

FIGS. 16*b*–16*c* are block diagrams showing various example embodiments of add/drop multiplexers constructed according to the teachings of the present invention;

DETAILED DESCRIPTION OF THE INVENTION

I. Building Blocks for High Speed Optical Signal Processing

Figure 1A:
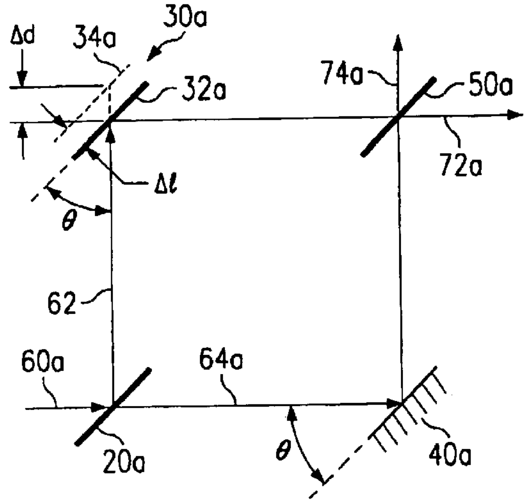
FIG. 1*a* is a block diagram of an exemplary embodiment of an apparatus operable to provide high speed optical signal processing according to the teachings of the present invention.

FIG. 1*a* is a block diagram of one exemplary embodiment of an apparatus 10*a* operable to provide high speed optical signal processing. Throughout this document, the term "signal processing" includes attenuation, switching, phase shifting, polarization control, mitigation of polarization mode dispersion, or any other manipulation of one or more optical signals.

Apparatus 10*a* includes a beam splitter 20*a*, which communicates with mirrors 30*a* and 40*a*. Beam splitter 20*a* may comprise any structure or combination of structures operable to pass a first copy of an optical signal in one direction and a second copy of the optical signal in another direction. For example, in a particular embodiment, beam splitter 20*a* may comprise a partially silvered mirror. As another example, beam splitter 20*a* may comprise a mirror having one or more layers of a dielectric coating. As still another example, beam splitter 20*a* may comprise a fiber coupler.

Throughout this document, the terms "copy" and "signal copy" are used to describe optical signals that are at least substantial copies of the input optical signal, each having at least substantially equal quantities of wavelengths as the other. Depending on the type of beam splitter used to create the multiple signal copies, the two copies may or may not have equal intensities. For example, a 50/50 beam splitter will generate two substantially identical copies of the input signal—substantially equal in content and intensity. Other types of beam splitters, however, may create uneven distributions of intensities in the resulting signal "copies." Beam splitters having various ratios other than 50/50 could be used consistent with the present invention. However, an approximately 50/50 beam splitter typically provides a good contrast ratio by maintaining the optical symmetry of a physically symmetrical device.

Apparatus 10*a* includes a plurality of mirrors, in this case a first mirror 30*a* and a second mirror 40*a*. Throughout this document, the term "mirror" refers to an at least substantially reflective surface or collection of surfaces. At least one of mirrors 30*a* and 40*a* comprises a moveable at least substantially reflective surface or collection of surfaces. In this example, second mirror 40*a* comprises a fixed mirror structure. The location of second mirror 40*a* relative to beam splitter 20*a* does not change during operation of the device. In this embodiment, first mirror 30*a*, however, comprises a moveable mirror layer of a micro-electro-optic system (MEMS) device operable to be displaced anywhere between positions 32*a* and 34*a*. Movement of first mirror 30*a* can be, for example, in response to a control signal, such as a control voltage. Although this embodiment includes just one moveable mirror, apparatus 10*a* could alternatively comprise additional moving mirrors. Some embodiments of apparatus using multiple moving mirrors will be described below.

In the illustrated embodiment, first copy 62*a* of input optical signal 60*a* meets first mirror 30*a* at a grazing angle THETA. In a similar manner, second copy 64*a* of signal 60*a* meets second mirror 40*a* at approximately angle THETA. In the example shown in FIG. 1, angle THETA comprises approximately forty-five degrees. Other grazing angles could be used without departing from the scope of the invention. In addition, mirrors 30*a* and 40*a* could receive first and second signal copies 62*a* and 64*a* at different angles from one another without departing from the present invention. Maintaining symmetry between the arms of the device, however, provides an advantage of increasing the contrast ratio at the device's output.

In this particular embodiment, apparatus 10*a* further includes a beam splitter 50*a* operable to receive first copy 62*a* and second copy 64*a* of input signal 60*a*, after those signals have been reflected off of mirrors 30*a* and 40*a*, respectively. Beam splitter 50*a* combines components of first copy 62*a* and second copy 64*a* of input signal 60*a* to result in first output signal 72*a* and second output signal 74*a*. Beam splitter 50*a* can be similar in structure and function to beam splitter 20*a* described above. In some embodiments (described more fully below), beam splitters 20*a* and 50*a* could comprise locations on a single beam splitting device.

In the illustrated embodiment, first and second mirrors 30*a* and 40*a* are separated from beam splitter 20*a* by a distance (d). Apparatus 10*a* can introduce a difference (DELTA d) in signal path (d) by moving first mirror 30*a* in an at least substantially piston-like motion by a distance DELTA L. Throughout this document, the term "piston-like" motion refers to a motion in which the moveable mirror is intended to be displaced in an approximately parallel plane to the previous mirror position. In other words, a "piston-like" motion is intended to substantially maintain the grazing angle THETA between at least a portion of the moveable surface of first mirror 30*a* and first signal copy 62*a*. Moving the mirror layer 30*a* in a substantially piston-like motion to substantially maintain the grazing angle THETA results in an advantage of reducing signal dispersion when the signal copies are combined.

In practice, for various reasons, physical embodiments of the invention may not exhibit true "piston-like" motion, although such embodiments are intended to be within the scope of the invention. For example, the moveable mirror layer may be anchored at its ends and may exhibit some curvature between the anchor points as it moves from one position to another. In addition, variances in resistance across the moveable mirror layer may result in one portion of the moveable mirror layer experiencing more movement than another portion. The invention is intended to encompass these embodiments within the definition of "piston-like" motion.

Figure 1B:
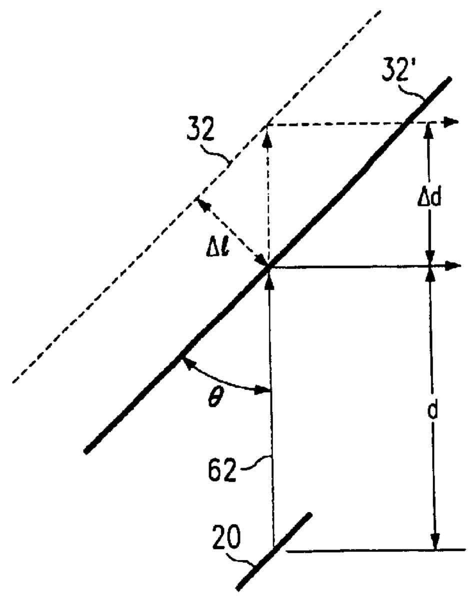
FIG. 1*b* is a block diagram showing an exemplary geometry associated with one embodiment of an apparatus operable to provide high speed optical signal processing according to the teachings of the present invention.

FIG. 1*b* is a block diagram showing an exemplary geometry associated with one embodiment of an apparatus operable to provide high speed optical signal processing according to the present invention. Line 32' in FIG. 1*b* represents a position of first mirror 30*a* that would provide a distance (d) between beam splitter 20*a* and first mirror 30*a* residing at a first position 32'. Line 32*a* shows a modified position of first mirror 30*a* after a piston-like movement resulting in a displacement of DELTA L from position 32*a'*.

As shown in FIG. 1*b*, moving first mirror 30*a* from position 32*a*' to position 32*a* by distance DELTA L creates a difference of DELTA d in the length of the signal path of first signal copy 62*a*. This difference in signal path translates to a difference in phase between first signal copy 62*a* and second signal copy 64*a* of input signal 60*a*. The phase difference between first and second copies 62*a* and 64*a* results in an interference, which alters the amplitude of output signal 72*a* relative to that of input signal 60*a*.

In operation, because first copy 62*a* of input signal 60*a* travels a different signal path length than second copy 64*a* of input signal 60*a*, a phase difference between the two signal copies results in interference between the two signals when they are combined. For a given change in the signal path length, the amplitude of first output 72*a* is proportional to $\cos^2$ of one half of the phase difference PHI between signal copies 62*a* and 64*a*. In a similar manner, for a given change in the signal path length, the amplitude of second output 74*a* is proportional to $\sin^2$ of one half of the phase difference PHI between signal copies 62*a* and 64*a*.

Figure 1C:
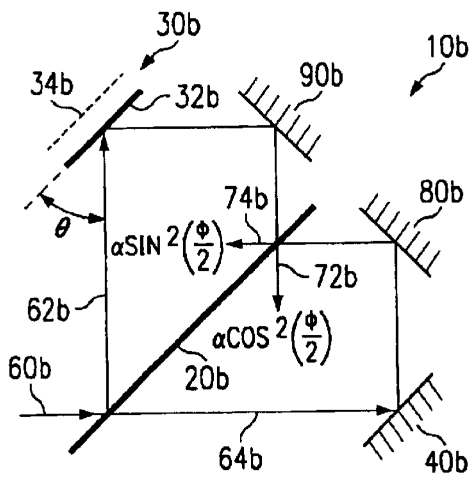
FIGS. 1*c*–1*d* are block diagrams showing other exemplary embodiments of apparatus operable to provide high speed optical signal processing according to the teachings of the present invention.
Figure 1D:
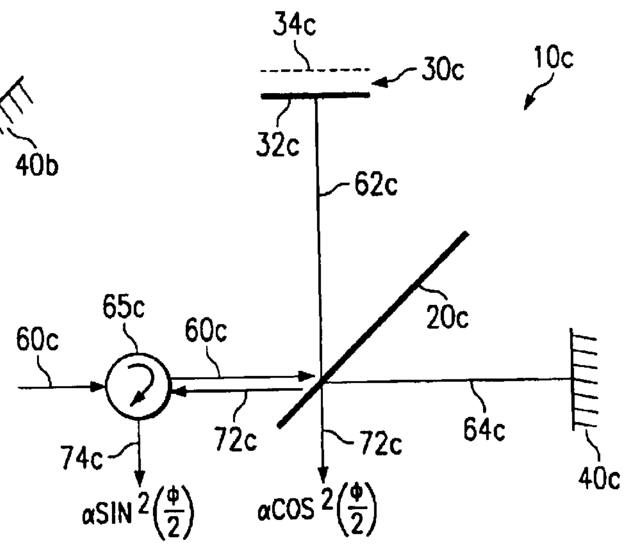

FIGS. 1*c* and 1*d* show additional exemplary embodiments of apparatus operable to provide high speed optical signal processing. FIG. 1*c* is a block diagram of an apparatus 10*b*, which operates in a similar manner to apparatus 10*a*, but uses a single beam splitting device 20*b* to comprise a first beam splitter operable to separate the input signal 60*b* into signal copies 62*b* and 64*b*, and a second beam splitter operable to combine components of the reflected signal copies to form output signals 72*b* and 74*b*.

Beam splitter 20*b* communicates with a plurality of at least substantially reflective surfaces including mirrors 30*b* and 40*b*. Beam splitter 20*b* is similar in structure and function to beam splitters 20*a* and 50*a* discussed with respect to FIG. 1*a*. As in apparatus 10*a* described with respect to FIG. 1*a*, apparatus 10*b* includes at least one moveable mirror, in this case first mirror 30*b*. In this example, moving mirror 30*b* is similar in structure and function to first mirror 30*a* in FIG. 1*a*. Apparatus 10*b* could include additional and/or other moving mirrors without departing from the scope of the invention.

Apparatus 10*b* also includes mirrors 90*b* and 80*b* operable to reflect signal copies 62*b* and 64*b* back toward beam splitter 20*b*, where components of the reflected signals can be combined to form output signals 72*b* and 74*b*.

In operation, apparatus 10*b* receives optical input signal 60*b* at beam splitter 20*b*. Beam splitter 20*b* communicates a first signal copy 62*b* toward first mirror 30*b*, and communicates a second signal copy 64*b* toward second mirror 40*b*. First mirror 30*b* is operable to be displaced by a distance DELTA L to create a path length difference DELTA d between the signal path lengths of first signal copy 64*a* and second signal copy 64*b*. The difference in path length creates a phase difference between the signal copies, which results in a change in amplitude of the signal relative to input signal 60*b*. By selectively varying the position of, for example, first mirror 30*b*, apparatus 10*b* can control the intensity of output signals 72*b* and 74*b*.

FIG. 1*d* is a block diagram of another example configuration of an apparatus 10*c* operable to facilitate high speed optical signal processing. Apparatus 10*c* operates in a similar manner to apparatus 10*a* and 10*b*, but uses a single beam splitter 20*c*, and orients first and second mirrors 30*c* and 40*c* at ninety-degree grazing angles THETA.

Apparatus 10*c* includes a beam splitter 20*c*, which communicates with a plurality of at least substantially reflective surfaces including mirrors 30*c* and 40*c*. Beam splitter 20*c* is similar in structure and function to beam splitters 20*a* and 50*a* discussed with respect to FIG. 1*a*. As in apparatus 10*a* described with respect to FIG. 1*a*, apparatus 10*c* includes at least one moveable mirror, in this case first mirror 30*c*. In this example, moving mirror 30*c* is similar in structure and function to first mirror 30*c* in FIG. 1*a*. Apparatus 10*c* could include additional and/or other moving mirrors without departing from the scope of the invention.

Apparatus 10*c* also includes a circulator 65*c* operable to receive input signal 60*c* and to communicate that signal to beam splitter 20*c*, while also receiving output signal 72*c* and communicating that signal away from the source of input signal 60*c*.

In operation, apparatus 10*c* receives optical input signal 60*c* at beam splitter 20*c*. Beam splitter 20*c* communicates a first signal copy 62*c* toward first mirror 30*c*, and communicates a second signal copy 64*c* toward second mirror 40*c*. First mirror 30*c* is operable to be displaced by a distance DELTA L to create a path length difference DELTA d between the signal path lengths of first signal copy 64*a* and second signal copy 64*b*. The difference in path length creates a phase difference between the signal copies, which results in a change in amplitude of the signal relative to input signal 60*c*. By selectively varying the position of, for example, first mirror 30*c*, apparatus 10*c* can control the intensity of output signals 72*c* and 74*c*.

Figure 2A:
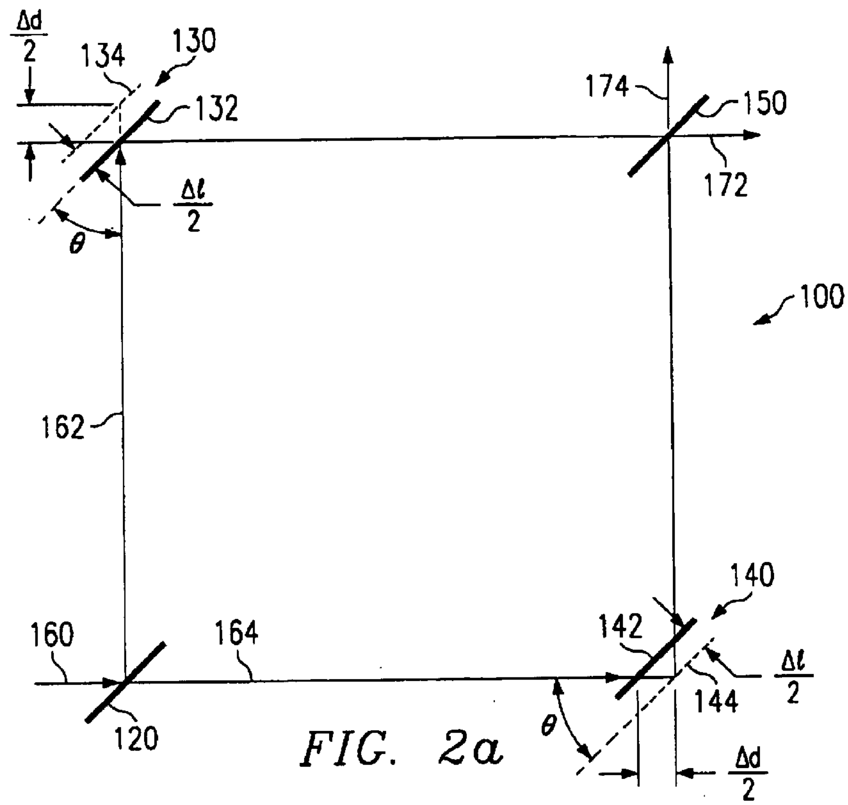
FIGS. 2*a*–2*c* are block diagrams of various embodiments of apparatus operable to provide high speed optical signal processing according to the teachings of the present invention.
Figure 2B:
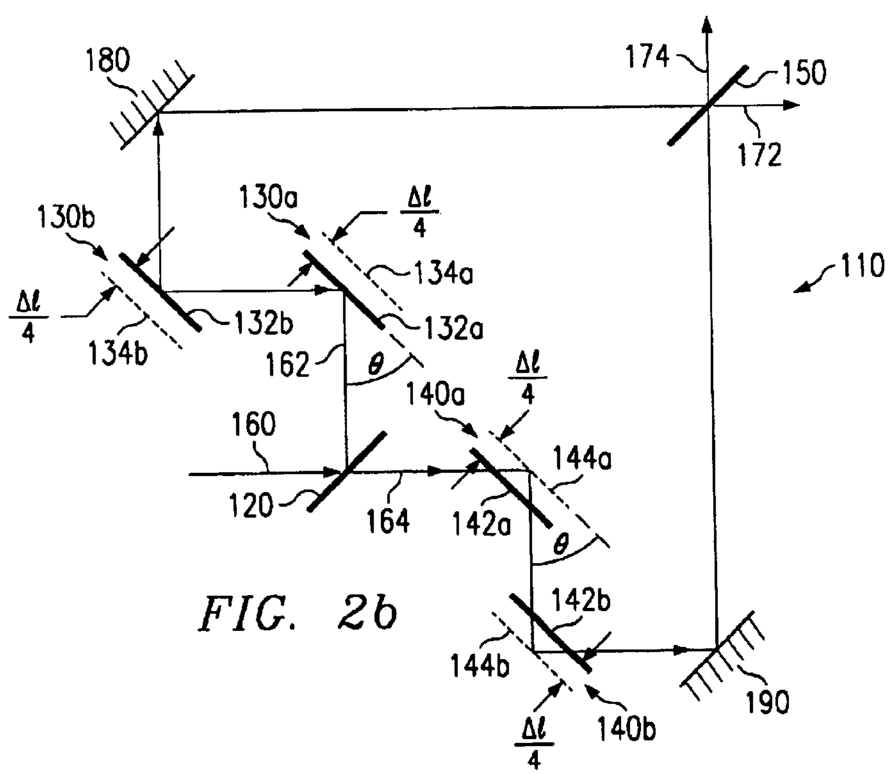
Figure 2C:
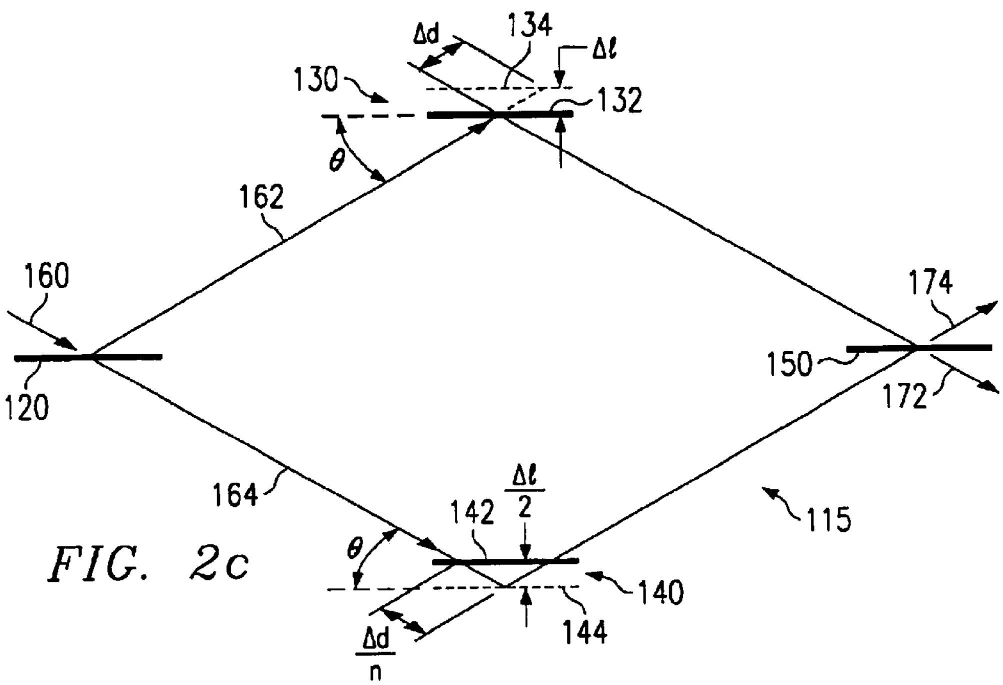

The aggregate difference in signal path length (DELTA d) achieved for a given mirror displacement DELTA L can be improved in a variety of ways. FIGS. 2*a*–2*c* are block diagrams of various embodiments of apparatus operable to provide additional phase shift between signal copies for a given per-mirror displacement.

Apparatus 100 shown in FIG. 2*a* is similar in structure and function to apparatus 10*a* shown in FIG. 1*a*, but includes moveable mirror elements in each arm of the device. Apparatus 100 includes a first beam splitter 120, which receives an input signal 160 and sends a first signal copy 162 toward a first mirror 130, and a second signal copy 164 toward a second mirror 140. First and second mirrors 130 and 140 reflect first and second signal copies 162 and 164 toward a second beam splitter 150. Second beam splitter 150 combines components of the reflected first and second signal copies 162 and 164 to form first output 172 and second output 174.

In this example, both first mirror 130 and second mirror 140 comprise moveable mirror structures. Each of mirrors 130 and 140 is operable to move relative to the other to contribute to a difference in path length of the signals received and reflected toward second beam splitter 150. Using multiple moving mirrors facilitates the same overall path difference with each mirror moving only a fraction of the distance DELTA L. For example, where the angle THETA is forty five degrees, for a desired total path difference of DELTA d, each of first and second mirrors 130 and 140 moves a distance DELTA L/2, each creating a path difference of DELTA d/2, combining for a total path difference of DELTA d.

As a particular example, first mirror 130 may move away from first beam splitter 120 from position 132 to position 134 to increase the path length of first signal copy 162 by DELTA d/2. Second mirror 140 may move toward first beam splitter 120 from position 144 to position 142 to decrease the path length of second signal copy 164 by DELTA d/2. The combined effect of the movement of first and second mirrors 130 and 140 is to create a total path difference of DELTA d, resulting in a desired phase difference and output intensity.

Implementing multiple moving mirrors provides an advantage of decreasing the displacement of each moving mirror. This, in turn, decreases the drive voltage necessary to operate each moving mirror, and increases the speed at which the position of the mirrors, and hence the intensity of the output signal, can be manipulated. Although apparatus 100 is described with respect to the configuration shown in FIG. 1*a*, multiple moving mirrors could be similarly be implemented in other embodiments, such as those shown in FIGS. 1*c*–1*d*.

Another way to reduce the amount of displacement experienced by each moving mirror for a given level of phase difference is to implement additional moving mirrors in each arm of the device. For example, FIG. 2*b* shows an apparatus 110 having multiple moveable mirrors on each arm between the first beam splitter 120 and the second beam splitter 150.

Apparatus 110 shown in FIG. 2*b* is similar in structure and function to apparatus 100 shown in FIG. 2*a* and apparatus 105 shown in FIG. 2*a*. Apparatus 110 includes a first beam splitter 120, which receives an input signal 160 and sends a first signal copy 162 toward a first mirror 130*a*, and a second signal copy 164 toward a second mirror 140*a*. First mirror 130*a* reflects first signal copy 162 toward a third mirror 130*b* that, in turn, reflects first signal copy 162 toward a fixed mirror 180 and on to second beam splitter 150. Similarly, second mirror 140*a* reflects second signal copy 164 toward a fourth mirror 140*b* that, in turn, reflects second signal copy 164 toward a fixed mirror 190 and on to second beam splitter 150. Second beam splitter 150 combines components of the reflected first and second signal copies 162 and 164 to form first output 172 and second output 174.

In this example, each of mirrors 130*a*–130*b* and mirrors 140*a*–140*b* comprises a moveable mirror structure. Each of mirrors 130*a*–130*b* and 140*a*–140*b* is operable to move to contribute to a difference in path length of the signals received and reflected toward second beam splitter 150. In addition, although mirrors 180 and 190 are shown as fixed mirrors, one or more of those mirrors could alternatively comprise moveable mirror structures.

Using multiple moving mirrors in each arm of device 100 facilitates an overall path difference L with each mirror moving only a fraction of the distance DELTA L. For example, where the angle THETA is forty five degrees, for a desired total path difference of DELTA d, each of first and second mirrors 130 and 140 moves a distance DELTA L/4, each creating a path difference of DELTA d/4, combining for a total path difference of DELTA d.

In a particular example, mirrors 130*a*–*b* may move from positions 132 to positions 134 to increase the path length of first signal copy 162 by DELTA d/2. Second mirrors 140*a*–*b* may move from positions 144 to positions 142 to decrease the path length of second signal copy 164 by DELTA d/2. The combined effect of the movement of first and second mirrors 130*a*–*b* and 140*a*–*b* is to create a total path difference of DELTA d, resulting in a desired phase difference and output intensity.

The embodiment shown in FIG. 2*b* provides an advantage of further decreasing the necessary displacement of moveable mirrors 130 and 140. This decreases the drive voltage needed to move each mirror and increases the speed of the device. This concept also applies to other embodiments of the invention, including those shown in FIGS. 1*c*–1*d*.

Still another way to reduce the amount of displacement experienced by each moving mirror while still attaining a given level of phase difference is to reduce the grazing angle (THETA) between signals 162 and 164 on first and second mirrors 130 and 140, respectively. In a particular embodiment, first and second beam splitters 120 and 150 form a rhombus with first and second mirrors 130 and 140. Referring to FIG. 1*b* to illustrate, the path difference DELTA d can be calculated as DELTA d=DELTA L/sin(THETA). Reducing the grazing angle THETA reduces the term sin (THETA), resulting in a greater path difference DELTA d for a given change in mirror location represented by the distance DELTA L.

Apparatus 115 shown in FIG. 2*c* is similar in structure and function to apparatus 100 shown in FIG. 2*a*, and apparatus 110 shown in FIG. 2*b*. Apparatus 115 includes a first beam splitter 120, which receives an input signal 160 and sends a first signal copy 162 toward a first mirror 130, and a second signal copy 164 toward a second mirror 140. First and second mirrors 130 and 140 reflect first and second signal copies 162 and 164 toward a second beam splitter 150. Second beam splitter 150 combines components of the reflected first and second signal copies 162 and 164 to form first output 172 and second output 174.

In this example, both first mirror 130 and second mirror 140 comprise moveable mirror structures. Each of mirrors 130 and 140 is operable to move relative to the other to contribute to a difference in path length of the signals received and reflected toward second beam splitter 150. In the illustrated embodiment, for a desired total path difference of DELTA d, each of first and second mirrors 130 and 140 may move a distance DELTA L, each creating a path difference of DELTA L/sin(THETA), combining for a total path difference of DELTA d. The smaller the angle THETA, the larger the path difference created for a given mirror displacement. Said another way, using mirrors at small grazing angles to signals 162 and 164, desired path differences can be created with smaller mirror displacements. This results in smaller drive voltages needed to move the mirrors, and faster device operation.

Efficiency and speed advantages can be compounded by implementing combinations of the embodiments shown in FIGS. 2*a*–2*c*. For example, a desired phase difference can be introduced between signal copies 162 and 164 using minimal mirror displacement by implementing multiple moving mirrors in each arm of the device, where one or more of the mirrors has grazing angle with the incoming signal that is less than forty five degrees.

Figure 3A:
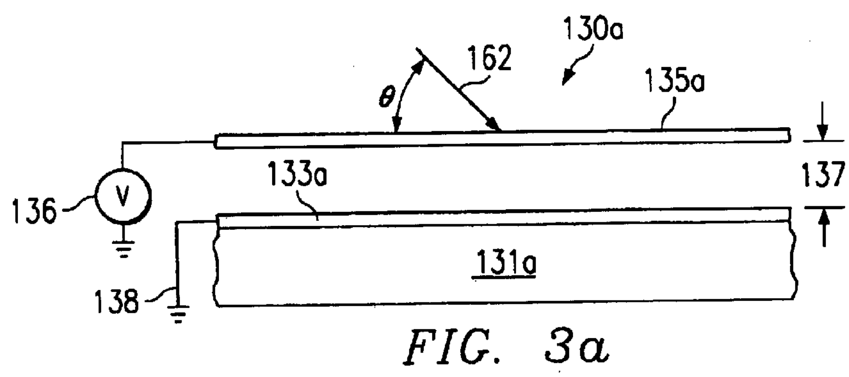
FIGS. 3*a*–3*c* are block diagrams showing a plurality of views of various embodiments of moveable mirrors operable for use with the apparatus described in FIGS. 1 and 2 and constructed according to the teachings of the present invention.
Figure 3B:
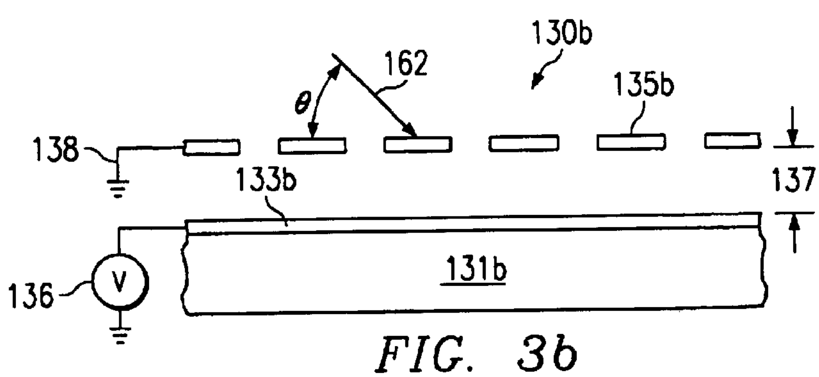
Figure 3C:
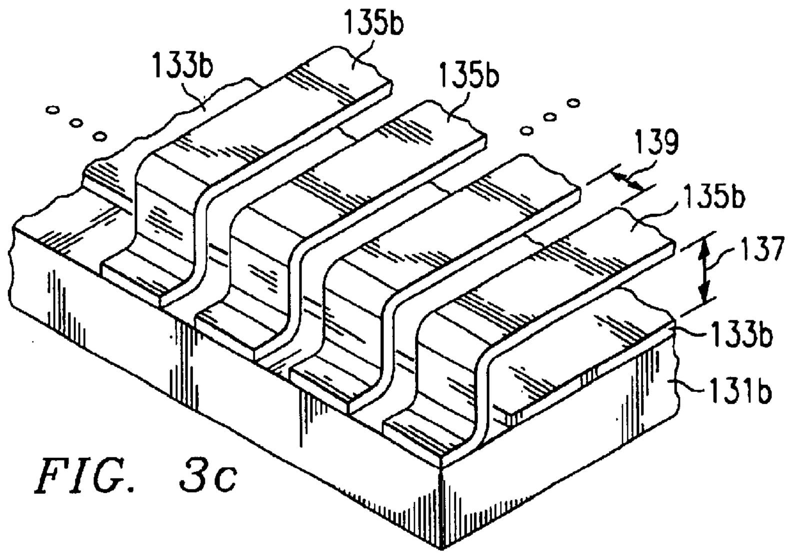

FIGS. 3*a*–3*c* are block diagrams showing a plurality of views of various embodiments of moveable mirrors suitable for use with the apparatus described in FIGS. 1 and 2. FIG. 3*a* is a block diagram showing a movable mirror 130, which can be used in devices shown in FIGS. 2*a*–2*d* and describe above. In the particular example shown in FIG. 3*a*, movable mirror device 130*a* comprises a micro-mechanical electro-optical switching ("MEMS") device. MEMS device 130*a* includes a reflective conducting layer 135*a* disposed outwardly from an inner conductive layer 131*a* or 133*a*. Reflective conducting layer 135*a* comprises one or more at least substantially reflective structures that are operable to at least substantially conduct electricity. Reflective conducting layer 135*a*, in this embodiment, comprises a layer of metal, such as aluminum, that is substantially reflective of optical signals 162 incident thereon and substantially conductive of electricity. Reflective conducting layer 135*a* and inner conductive layer 133*a* may comprise single layers of one material, or may alternatively comprise multiple layers of one or more materials.

Reflective conducting layer 133*a* resides outwardly from inner conductive layer 131*a* and/or 133*a*. Throughout this document, the term "inner conductive layer" is used to refer to material disposed inwardly from a moveable mirror layer, which is operable to at least substantially conduct electricity. Inner conductive layer 133*a* may comprise, for example, semiconductor substrate 131*a*, which has been doped sufficiently to render it at least substantially conductive. In another embodiment, a layer 133*a* of metal or a layer of doped polysilicon can be formed outwardly from semiconductor substrate 131*a*, and that layer 133*a* can comprise the "inner conductive layer." It is not necessary that the inner conductive layer comprise a continuous structure. Inner conductive layer 133 could, for example, comprise a series of adjacent electrically coupled strips (or other discontinuous structures) of material.

MEMS device 130*a* is formed so that a space 137 resides between reflective conducting layer 135*a* and inner conductive layer 131*a* (or 133*a* if used). Various layers interstitial to layers 135 and substrate 131 may be formed for various purposes. Regardless of any other structures formed, however, some amount of space 137 resides between reflective conducting layer 135 and substrate 131, to facilitate reflective conducting layer 135*a* moving inwardly toward substrate 131*a*.

MEMS device 130 receives optical signals 162 at a grazing angle THETA to reflective conducting layer 135*a*. Reflecting conducting layer 135*a* reflects a substantial copy of signal 162 away from MEMS device 130*a*.

Movement of reflective conducting layer 135*a* toward substrate 131*a* is accomplished by establishing a voltage differential between reflective conducting layer 135*a* and substrate 131*a* or, if used, conductive layer 133*a*. This voltage differential creates an electrostatic force between the two at least substantially conductive layers, which tends to pull reflective conducting layer 135*a* toward substrate 131*a*.

In the illustrated embodiment, reflective conducting layer 135*a* is biased with a voltage 136, while inner conductive layer 133*a* is coupled to ground 138. Other voltage biasing techniques may be used. For example, voltage 136 may be applied to inner conductive layer 133*a*, and reflective conducting layer 135*a* may be grounded. As another example, a first voltage may be applied to reflective conducting layer 135*a*, while a second voltage, which is different from the first voltage, is applied to inner conductive layer 133*a*. Any biasing scheme operable to establish a voltage differential between layers 135*a* and substrate 131*a*, or layer 135*a* and layer 133*a* (if used), is within the scope of the invention. Of course, semiconductor substrate 131*a* may itself comprise the "inner conductive layer."

FIG. 3*b* is a block diagram of another embodiment of a moving mirror 130*b* useful, for example, in devices shown in FIG. 2*a*–2*d*. Moving mirror device 130*b* also comprises a MEMS device. MEMS device 130*b* includes a substrate 131*b*, and may also include a conductive layer 133*b*. Conductive layer 133*b* is similar in structure and function to conductive layer 133*a* shown in FIG. 3*a*. Substrate 131*b* is similar in structure and function to substrate 131*a* shown in FIG. 3*a*.

MEMS device 130*b* also includes a plurality of reflective conducting strips 135*b*. Reflective conducting strips may comprise any material operable to substantially reflect an incident optical signal 162 and to substantially conduct electricity. Reflective conducting strips 135*b* may comprise, for example, doped polysilicon or a metal, such as aluminum. In addition, inner conductive layer 133*b* and/or reflective conductive strips 135*b* may comprise multiple layered structures.

Various structures may be formed interstitial to reflective conducting layer 135*b* and substrate 131*b* for accomplishing various functions and results. Regardless of what structures are formed interstitial to layers 135*b* and substrate 131*b*, a space 137 is formed between reflective conducting strips 135*b* and substrate 131*b* to facilitate movement of reflecting conductive strips 135*b* toward substrate 131*b*.

Movement of reflective conducting strips 135*b* toward substrate 131*b* is accomplished by establishing a voltage differential between strips 135*b* and substrate 131*b* (or conductive layer 133*b*, if used). As a particular example, strips 135*b* may be coupled to ground 138, while substrate 131*b* (or conductive layer 133*b*) is coupled to a voltage source 136. Again, other methods of creating a voltage differential could be used. For example, strips 135*b* could be coupled to a voltage source, while substrate 131*b* (or conductive layer 133*b*) are coupled to a ground, or differential voltage sources could be coupled to each of these layers.

FIG. 3*c* shows another view of MEMS device 130*b*. As shown in FIG. 3, each end of each of strips 135*b* is anchored to, for example, substrate 131*b*. In this embodiment, all strips 135*b* are coupled to the same voltage potential. When a voltage differential is created between strips 135*b* and conductive layer 133*b*, all strips 135*b* move toward substrate 131*b*. The embodiment depicted in FIGS. 3*b* and 3*c* provides an advantage of controlling air damping during movement of strips 135*b* toward substrate 131*b*. In particular, air gaps 139 between strips 135*b* allow air in space 137 to escape when strips 135*b* move toward substrate 131*b*. Air gaps 139 can be optimally sized to provide adequate control of air damping, while minimizing loss associated with optical signals 162 impinging on strips 135*b*.

Although the illustrated embodiment shows strips 135*b* as being elongated rectangular strips, other shapes and configurations could be used without departing from the present invention. In addition, although the illustrated embodiment shows each of strips 135*b* as being substantially identical to other strips 135*b*, various of strips 135*b* could have different dimensions than others without departing from the present invention.

As a particular example of a biasing technique, moveable mirror devices 130*a* and/or 130*b* could be implemented in a configuration such as device 105 shown in FIG. 2*b*. Device 105 could be biased to switch between a state where moveable mirror elements of mirrors 130 and 140 reside at positions 132 and 144, respectively, to a state where those mirror elements switch to positions 134 and 142, respectively. This switching action would create a longer path length (DELTA d/2) for first signal copy 162 and a shorter path length (DELTA d/2) for second signal copy 164, resulting in a total path difference of DELTA d.

Mirrors 130 and 140 could be biased to accomplish this switching, for example, by applying a control voltage to mirror 140 and no voltage to mirror 130 while device 105 remains in the first state. This would cause mirror 140 to remain in position 144 and mirror 130 to remain in position 132. When switching is desired, device 105 can terminate the control voltage applied to mirror 140, causing the moveable mirror element to return to position 142, and apply a control voltage to mirror 130, causing the moveable mirror element to be drawn to position 134. Other biasing techniques could be used consistent with the present invention.

II. Variable Attenuation

Figure 4:
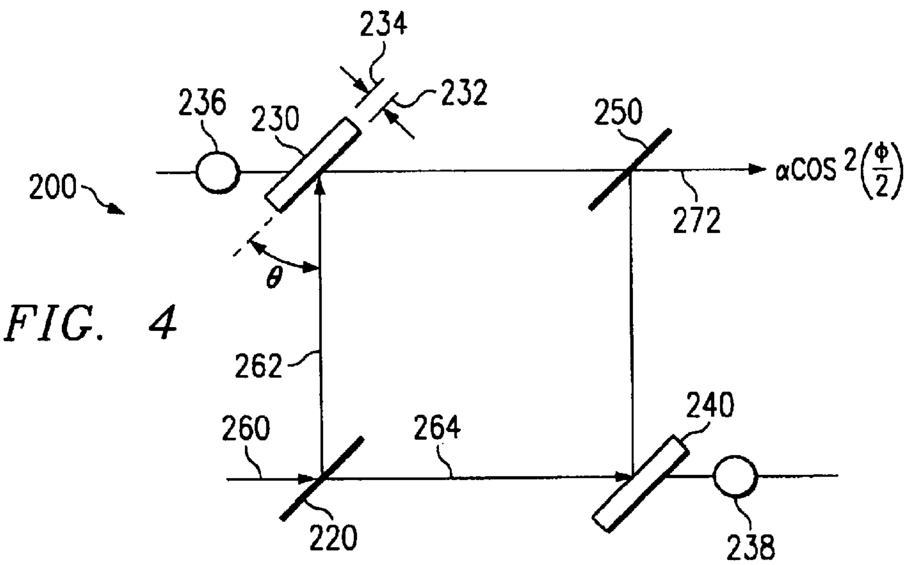
FIG. 4 is a block diagram of one embodiment of a variable attenuator constructed according to the teachings of the present invention.

One particular aspect of the invention involves a novel variable attenuator and method for providing variable attenuation. FIG. 4 shows a block diagram of one embodiment of a variable attenuator 200. Variable attenuator 200 is described with reference to a configuration similar to that of apparatus 100 shown in FIG. 1*a*. Attenuator 200 could alternatively be constructed using other configurations, such as those shown in FIGS. 1*c*–1*d*.

In this example, variable attenuator 200 includes a first beam splitter 220, which receives an input signal 260 and sends a first signal copy 262 toward a first mirror 230, and a second signal copy 264 toward a second mirror 240. First and second mirrors 230 and 240 reflect first and second signal copies 262 and 264 toward a second beam splitter 250. Second beam splitter 250 combines components of the reflected first and second signal copies 262 and 264 to form output signal 272.

One or both of mirrors 230 and 240 can comprise a moveable mirror structure operable to vary its location anywhere between position 232 and position 234 to result in a change in the length of the path of first and/or second signal copies 262 and 264 through attenuator 200. In operation, control signals 236 and/or 239 are selectively applied to moveable mirrors 230 and/or 240, respectively, to cause one or more of those mirrors to move relative to first and/or second beam splitters 220 and 250. The further mirrors 230 and/or 240 are moved, the higher the degree of phase shift between first and second signal copies 262 and 264. The intensity of output signal 272 is proportional to $\cos^2$ of one half of the phase difference PHI between first and second signal copies 262 and 264. Therefore, by controlling the amount of movement each mirror 230 and/or 240 experiences, the intensity or attenuation of output signal 272 can be regulated.

Although variable attenuator 200 is shown as having only one mirror 230/240 in each arm of the device, additional mirrors could be implemented in each arm without departing from the scope of the invention. In addition, although grazing angle THETA in FIG. 4 is shown as approximately forty-five degrees, other grazing angles could be implemented consistent with the invention.

III. Optical Switching

Figure 5A:
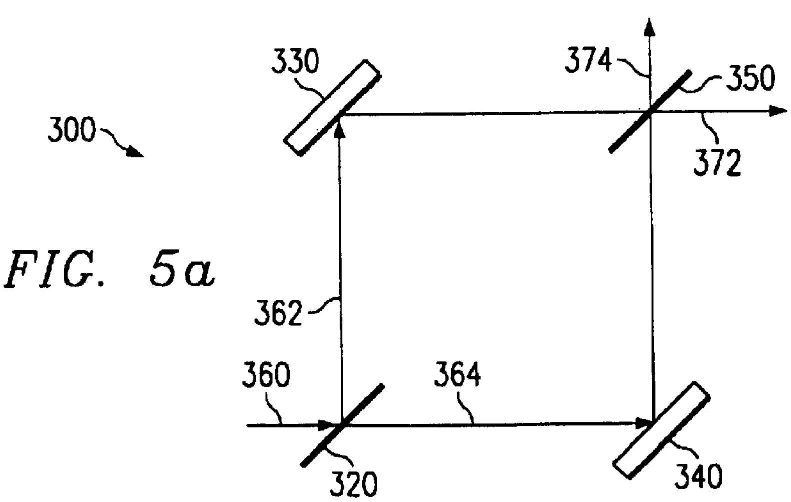
FIG. 5*a* is a block diagram of one embodiment of a one-by-two switch constructed according to the teachings of the present invention.

In another aspect of the invention, a novel digital switching architecture and methodology is presented. FIG. 5*a* shows a block diagram of a one-by-two optical switch 300. In this example, optical switch 300 is similar in structure to variable attenuator 200, which bears similarity to the configuration shown in FIG. 1*a*. Optical switch 300 could, however, alternatively be constructed using other configurations, such as those shown in FIGS. 1*c*–1*d*.

In the illustrated embodiment, optical switch 300 includes a first beam splitter 320, which receives an input signal 360 and sends a first signal copy 362 toward a first mirror 330, and a second signal copy 364 toward a second mirror 340. First and second mirrors 330 and 340 reflect first and second signal copies 362 and 364 toward a second beam splitter 350. Second beam splitter 350 combines components of the reflected first and second signal copies 362 and 364 to form output signals 372 and 374.

One or both of mirrors 330 and 340 can comprise a moveable mirror structure operable to vary its position to result in a change in the length of the path of and phase difference between first and/or second signal copies 362 and 364. The intensity of first output signal 372 is proportional to $\cos^2$ of one half of the phase difference PHI between first and second signal copies 362 and 364. The intensity of second output signal 374 is proportional to $\sin^2$ of one half the phase difference PHI between first and second signal copies 362 and 364. Therefore, when there is no phase difference (or a phase difference of 2–Pi, or an even multiple thereof), first output 372 is at a maximum, while second output 374 is zero, or near zero. When the phase difference equals an odd multiple of Pi, second output 374 is at a maximum, while first output 372 is zero, or near zero. By varying the positions of mirrors 330 and/or 340 to switch between a phase difference of, for example, approximately zero and Pi, optical switch 300 facilitates switching between first output 372 and second output 374.

Figure 5B:
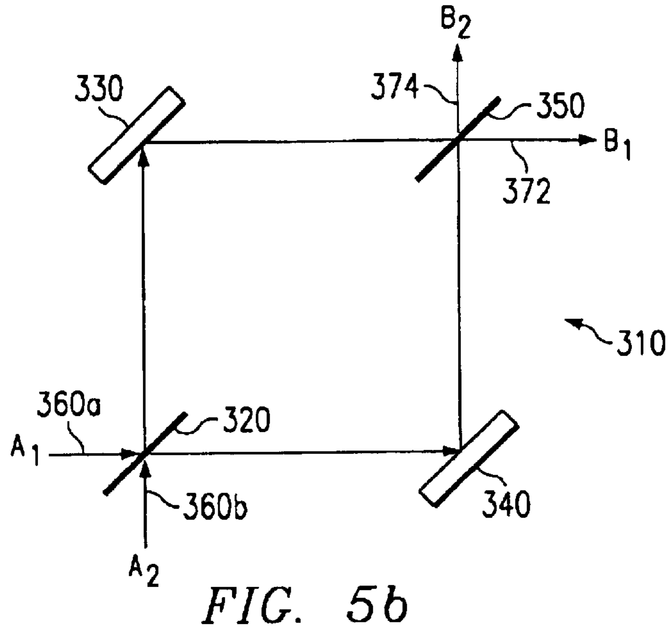
FIG. 5*b* is a block diagram of one embodiment of a two-by-two switch constructed according to the teachings of the present invention.

FIG. 5*b* is a block diagram showing one embodiment of a two-by-two switch 310. Two-by-two switch 310 is similar in structure and function to one-by-two switch 300 described with respect to FIG. 5*a*, except two-by-two switch 310 receives both a first input 360*a* (labeled “A1”) and a second input 360*b* (labeled “A2”) at beam splitter 320. Of course, optical switch 310 could also be constructed using elements having other configurations, such as those depicted in FIGS. 1*c*–1*d*.

In this example, beam splitter 320 sends a copy of each input signal 360*a* and 360*b* toward first and second mirrors 330 and 340, which reflect those signal copies toward beam splitter 350. Depending on the position of mirrors 330 and/or 340, switch 310 provides pass through or cross over operation to outputs 372 and 374.

For example, mirrors 330 and/or 340 could be positioned to provide no phase shift between the signal copies of each arm, resulting in pass through operation where input 360*a* passes through to output 372 and input 360*b* passes through to output 374. Alternatively, mirrors 330 and/or 340 could move to provide a phase shift resulting in cross-over operation, where input 360*a* crosses over to output 374 and input 360*b* crosses over to output 372. Of course, mirrors 330 and 340 could also be initially positioned to provide cross-over operation in a first state, and pass-through operation when one or more of the mirrors are moved.

Figure 5C:
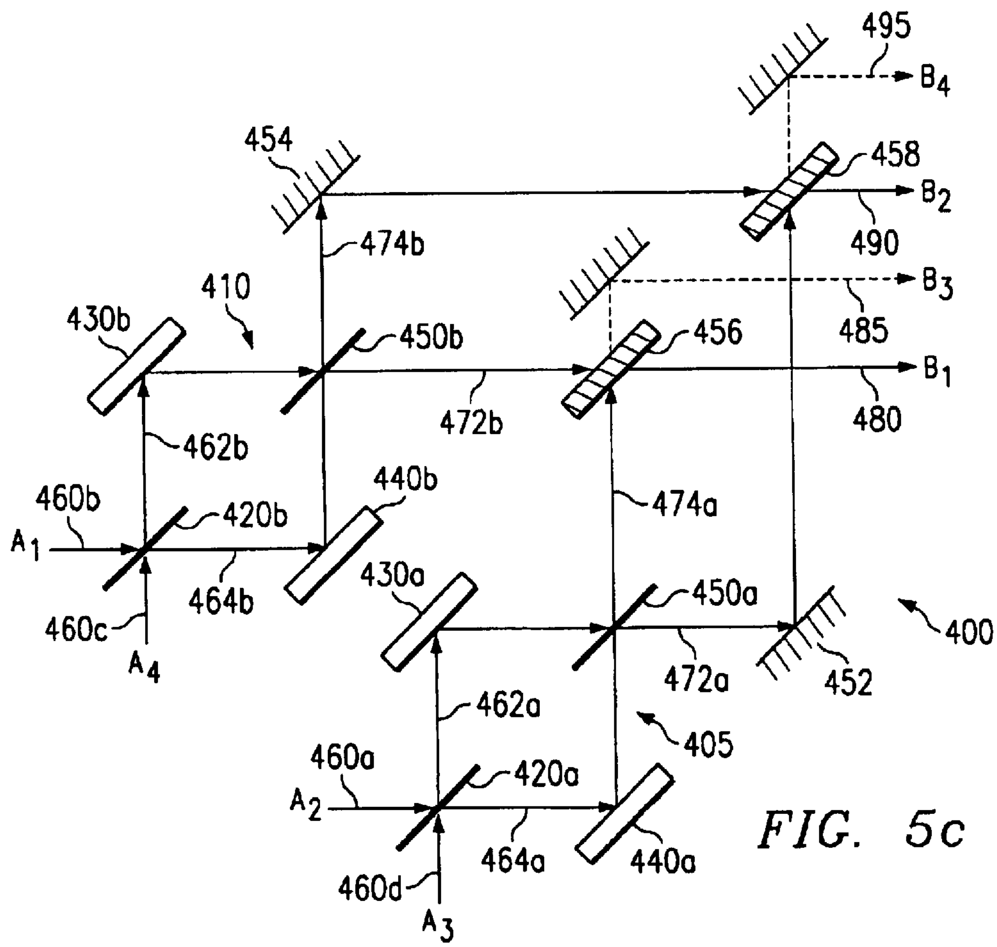
FIG. 5*c* is a block diagram of one embodiment of an n-by-n switch constructed according to the teachings of the present invention.

FIG. 5*c* is a block diagram showing another example of a two-by-two optical switch 400, and optionally added components to enable further switching stages. Elements represented in dashed lines comprise optional elements that can be added to provide additional switching stages. As previously discussed, although optical switch 400 uses a elements similar in configuration to those shown in FIG. 1*a*, optical switch 400 could implement elements having alternative configurations, such as those shown in FIGS. 1*c*–1*d*.

In a basic two-by-two embodiment (ignoring the elements shown as coupled by dashed lines), switch 400 includes a first optical switch element 405, which receives a first optical signal 460*a*. Switch 400 further includes a second optical switch element 410, which receives a second optical signal 460*b*. Each of first and second optical switch elements 405 and 410 includes a first beam splitter 420, which receives input signals 460*a* and 460*b*, respectively, and sends a first signal copy 462 toward a first mirror 430, and a second signal copy 464 toward a second mirror 440. First and second mirrors 430 and 440 reflect first and second signal copies 462 and 464 toward a second beam splitters 450. Second beam splitters 450 combine the reflected first and second signal copies 462 and 464 to form output signals 472*a*–*b* and 474*a*–*b*.

In the illustrated embodiment, output signals 472*b* and 474*a* are communicated toward a beam combiner 456, which combines those signals to create output signal 480. Also in this embodiment, output signals 472*a* and 474*b* reflect off of mirror 452 and 454, respectively, toward a beam combiner 458, which combines those signals to create output signal 490. Beam combiners 456 and 458 may comprise any structure or combination of structures operable to receive a plurality of signals and combine those signals into one or more output signals. For example, beam combiners 456 and 458 may each comprise a 50/50 beam splitter.

Some or all of mirrors 430*a*–*b* and 440*a*–*b* can comprise moveable mirror structures operable to vary their positions to result in changes in the length of the path of and phase difference between first and/or second signal copies 462 and 464. By varying the positions of mirrors 430 and/or 440 to switch between a phase difference of, for example, approximately zero and Pi, each of optical switches 400 facilitates switching between first output 472 and second output 474.

Through appropriate combinations of mirror movements, switch 400 can operate in either pass-through or cross-over mode. For example, mirrors 430*a* and/or 440*a* can be operated to create no phase shift between first and second signal copies 462*a* and 464*a*, while mirrors 430*b* and 440*b* can be manipulated to create no phase difference between first and second signal copies 262*b* and 264*b*. This operation would result in a pass-though mode of operation, allowing signals 460*a* and 460*b* to pass through to outputs 480 and 490, respectively. In particular, in this mode of operation, a zero phase difference between first and second signal copies 462*b* and 464*b* results in output 474*b* being near zero, while output 472*b* is near a maximum. An approximately Pi phase difference between first signal copy 462*a* and second signal copy 464*a* results in output 472*a* being near a maximum, while output 474*a* is near zero. Output 480, which is a combination of outputs 472*b* (maximum) and 474*a* (zero), therefore, equals output 472*b*, which corresponds to signal 460*b*. Output 490, which is a combination of outputs 472*a* (maximum) and 474*b* (zero), therefore, equals output 472*a*, which corresponds to input signal 460*a*.

As another example, mirrors 430*a* and/or 440*a* can be manipulated to create approximately a Pi phase difference between first and second signal copies 462*a* and 464*a*, while mirrors 430*b* and 440*b* can be operated to create an approximately Pi phase difference between first and second signal copies 262*b* and 264*b*. This operation would result in a cross-over mode of operation, causing signal 460*a* to cross over to output 480, while signal 460*b* crosses over to output 490.

Although FIG. 5*c* is a block diagram showing one embodiment of a two-by-two switch, additional switching elements could be combined in a similar manner to create an n-by-n optical switch. For example, by implementing components shown in dashed lines in FIG. 5*c* and substituting 2×2 switches for beam combiners 456 and 458, switch 400 becomes a four-by-four switch. In that embodiment, beam splitter 420*a* receives input signals 460*a* and 460*d*, while beam splitter 420*b* receives input signals 460*b* and 460*c*. In this embodiment, each switch 405 and 410 comprises a two-by-two switch operable to provide either pass through or cross over operation of its input signals 460.

For example, where mirrors 430 and 440 are positioned to create a Pi phase shift facilitating pass through operation, inputs 460*a* and 460*b* pass through to outputs 490 and 480, respectively. Likewise, inputs 460*c* and 460*d* pass through to outputs 495 and 485, respectively. Where, however, mirrors 430 and/or 440 introduce no phase shift, inputs 460*a* and 460*b* cross over to outputs 480 and 490, respectively; while inputs 460*c* and 460*d* cross over to outputs 485 and 495, respectively.

Although this example shows examples of two-by-two and a four-by-four switches, an n-by-n switch can similarly be constructed from additional combinations of two-by-two switches in a similar manner.

Although switches 300, 310, and 400 are shown as having only one mirror in each arm of the devices, additional mirrors could be implemented in each arm without departing from the scope of the invention. Moreover, although grazing angle THETA in FIGS. 5*a*–5*c* is shown as approximately forty-five degrees, other grazing angles could be implemented consistent with the invention.

Figure 6:
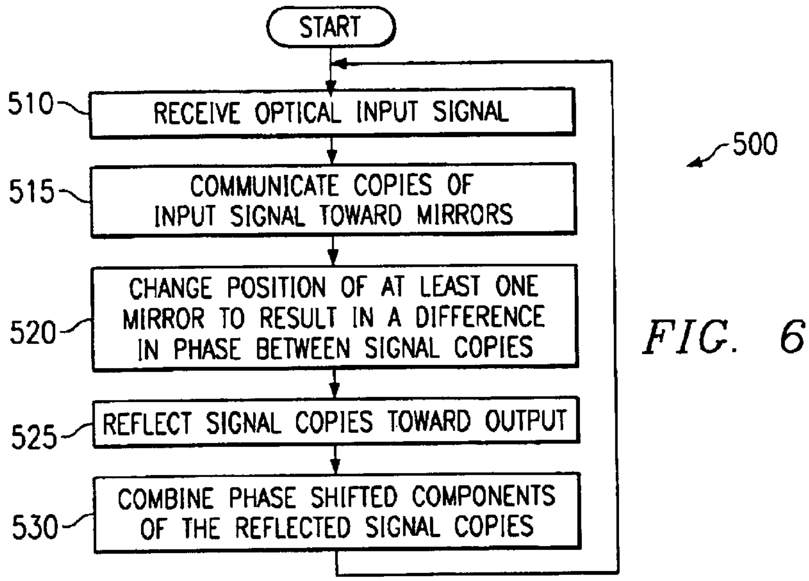
FIG. 6 is a flowchart showing one example of a method of facilitating optical signal processing according to the teachings of the present invention.

FIG. 6 is a flowchart showing one example of a method 500 of facilitating optical signal processing. Method 500 begins at step 510 where beam splitter 120 (e.g., FIG. 2*b*) receives optical signal 160. Beam splitter 120 communicates copies of input signal 160 toward a first mirror and a second mirror at step 515. This may include, for example, a partially silvered mirror receiving input signal 160 and communicating a first signal copy 162 toward first movable mirror 130, and a second signal copy 164 toward second movable mirror 140. First and second mirrors 130 and 140 receive signal copies 162 and 164 at grazing angles other than 90 degrees. In a particular embodiment, mirrors 130 and 140 may receive signal copies 162 and 164 at grazing angles less than 45 degrees. This configuration provides an advantage of minimizing displacement of mirrors 130 and/or 140 to achieve a given signal path difference.

One or more mirrors 130 and/or 140 comprises a MEMS device having a moveable mirror layer that changes its position in a substantially piston-like motion at step 520 to result in a difference in phase between signal copies 162 and 164. This may include, for example, first mirror layer 130 switching from position 132 to position 134, and/or mirror layer 140 switching from position 144 to position 142. First and second mirrors 130 and 140 reflect signal copies 162 and 164, respectively, toward an output at step 525. This may include, for example, first and second mirrors 130 and 140 reflecting signal copies 162 and 164 toward a second beam splitter 150. Alternatively, first and second mirrors 130 and 140 may reflect signal copies to additional moveable mirror elements (see, e.g. FIG. 2*c*). Implementing additional moving mirrors in each arm of device 105 provides an advantage of minimizing the displacement of any one of the movable mirrors while attaining a given signal path difference.

Phase shifted components of first and second signal copies 162 and 164 are combined at step 530 to produce one or more output signals 172 and/or 174. Depending on the level of displacement of mirrors 130 and/or 140, device 105 can operate to provide, for example, phase shifting, variable attenuation, and/or switching functionality on input signal 160.

IV. Polarization Controllers

Figure 7A:
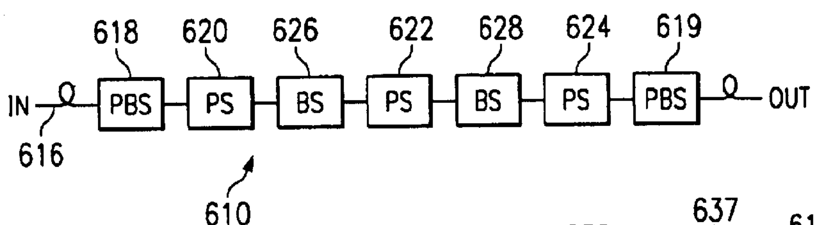
FIGS. 7*a*–*c* are block diagrams showing various embodiments of polarization controllers constructed according to the teachings of the present invention.

FIG. 7*a* is a block diagram showing an exemplary embodiment of a polarization controller 610. In this particular embodiment, polarization controller 610 comprises a phase shift-based polarization controller. Rather than requiring physical rotation of the polarization controller, polarization controller 610 uses phase shifts between the principal modes of input signal 616 to orient the output states of polarization.

In the particular example shown in FIG. 7*a*, polarization controller 610 includes three stages of phase shifters 620, 622, and 624, each operable assist in translating the input state of polarization to a desired output state of polarization. In this embodiment, first phase shifter 620 couples to a polarization beam splitter 618, which receives input optical signal 616 and separates the two principal modes of polarization. Each of phase shifters 620–624 introduces a phase shift between these two principal modes of polarization.

Each phase shifter 620–624 comprises a device or collection of devices operable to introduce a phase shift into an optical signal it receives. Phase shifters 620–624 may comprise, for example, micro-electro-mechanical systems (MEMS) comprising moveable mirror elements in each arm facilitating a phase shift between signal copies communicated through each arm. Any device operable to introduce a phase shift into an optical signal, however, may be used.

In this example, beam splitters 626 and 628 couple second phase shifter 622 to first phase shifter 620 and third phase shifter 624, respectively. In one embodiment, at least two phase shift stages share a common beam splitter. The example shown in FIG. 7*a* depicts phase shifters 620–624 sharing two common beam splitters 626 and 628. In another embodiment, phase shifters 620–624 could, for example, all share one common beam splitter.

In any case, each of beam splitters 626–628 may comprise, for example, a partially silvered mirror, a mirror having one or more layers of a dielectric coating, or a fiber coupler. In a particular embodiment, each of beam splitters 620–624 comprises an approximately 50/50 beam splitter. While other beam splitter ratios can be used consistent with the scope of the invention, an approximately 50/50 beam splitter maintains the symmetry of the device to provide a good contrast ratio.

In one particular embodiment, beam splitters 626 and 628 may each comprise a mode coupling beam splitter. For example, beam splitters 626 and 628 may include or be coupled to a polarization converter to render beam splitters 626 and 628 mode coupling. This embodiment ensures that polarization controller 610 can convert any arbitrary state of polarization (including eigen modes) into any other state of polarization. In addition, this embodiment produces a single output from polarization beam splitter 619, which reduces polarization dependent losses that might otherwise be associated with systems having multiple outputs.

The embodiment of polarization controller 610 shown in FIG. 7*a* also includes a polarization beam splitter 619, which receives a phase shifted signal from third phase shifter 624, and aligns the two principal modes of polarization of that signal as desired.

The embodiment shown in FIG. 7*a* provides significant advantages over other polarization controller designs, by facilitating reorientation of the principal modes of polarization without requiring the use of physical rotation of the compensator, physical squeezing of the fiber communication line, the use of expensive lithium niobate waveguide devices, or the use of additional beam splitter elements due to the presence of bulk wave plates between stages of phase shifters.

Figure 7B:
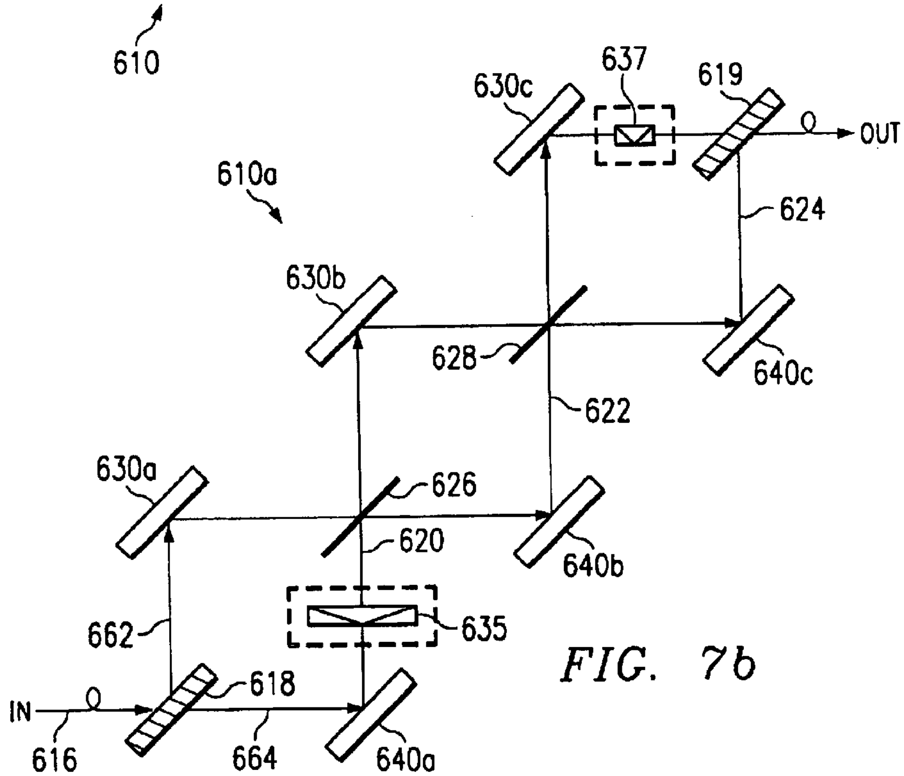

FIG. 7*b* is a block diagram of one particular configuration of a polarization controller 610*a*. Polarization controller 610*a* as shown in FIG. 7*b* includes a plurality of phase shifter stages 620–624 each comprising a MEMS-based device, such as the device described above with respect to FIG. 4. Although each of phase shifter stages 620–640 has a similar configuration to apparatus 100 shown in FIG. 2*a*, phase shifter stages 620–640 could implement other configurations, such as those shown in FIGS. 1*c*–1*d.*

In the illustrated example, each phase shifter 620–624 includes two arms 662 and 664, at least one of which comprises a moveable mirror structure 630 and/or 640. Mirrors 630 and/or 640 are operable to move in response to one or more control signals to result in a change in the length of the signal path and, therefore, a phase shift between signal copies communicated through the arms of phase shifters 620–624. Phase shifter stages 620–624 are coupled together by beam splitters 626 and 628. In this example, phase shifter stages 620 and 622 share beam splitter 626, while phase shifter stages 622 and 624 share beam splitter 628.

In this example, polarization beam splitter 618 receives optical input signal 616 and separates the two principal modes of polarization onto a first signal path 662 and a second signal path 664. A polarization beam splitter 619 receives phase shifted signals from third phase shifter stage 624 and aligns the principal modes of polarization with the principal axes of delay line 612.

The heretofore described embodiment of polarization controller 610*a* succeeds in transforming any input states of polarization that are not eigen modes of the system. For example, s-polarized and p-polarized waves are not transformed into any other state using that configuration. To facilitate transforming any arbitrary state of polarization (including eigen modes) into any other state of polarization, FIG. 7*b* also shows the optional use of polarization converter 635 to the first phase shift stage (630*a*/640*a*) of polarization controller 610*a.*

As a particular example, assume that polarization beam splitter 618 operates to reflect the s-polarized waves and to transmit the p-polarized waves. Polarization converter 635 receives the p-polarized waves and converts them to s-polarized waves, so that beam splitter 628 can combine s-polarized waves coming from first and second arms 662 and 664 and communicate the combined signals toward the second phase shift stage. Although this example shows polarization converter 635 coupled between MEMS device 640*a* and beam splitter 626, polarization converter 635 could alternatively reside between polarization beam splitter 618 and MEMS device 640*a*. In addition, polarization converter 635 could alternatively reside in first arm 662 of polarization controller 610*a.*

The polarization controller of FIG. 7*b* also shows the optional use of a polarization converter 637 coupled to the last phase shift stage (630*c*/640*c*). Polarization converter 637 operates to convert the polarization of the received signal to match that of the signal in the opposing arm of the phase shift stage, so that polarization beam splitter 619 will concentrate the output into one output signal. Polarization converter 637, can reduce or eliminate polarization dependent losses otherwise associated with the output signal. Although this example shows polarization converter 637 coupled between MEMS device 640*c* and beam splitter 619, polarization converter 635 could alternatively reside between polarization beam splitter 619 and MEMS device 640*c*. In addition, polarization converter 637 could alternatively reside in first arm 662 of polarization controller 610*a.*

Polarization converters 635 and 637 may comprise any device or combination of devices operable to flip the polarization of an incoming signal to an orthogonal mode of polarization. Wave plates, Transverse Electrical Transverse Magnetic (TETM) converters, Faraday converters, and mirrors positioned so as to flip the polarization of an incoming signal to a polarization orthogonal to the input state of polarization provide just a few examples of polarization converts suitable for use with this system.

Although FIG. 7*b* shows the optional use of a single polarization converter in the first and last phase shift stages, alternatively, a polarization converter could reside in each arm of the first and/or last phase shift stages. In this manner, the physical symmetry of the device can be maintained, so as to increase the contrast ratio of the device. As one particular non-limiting example, where polarization converters are used in each arm of the first and/or last phase shift stage, each polarization converter can comprise a half wave plate—one oriented at forty-five degrees to the mode axis, the other oriented parallel to the mode axis. Multiple polarization converters in a single phase shift stage may, but need not, be formed from like materials.

Figure 7D:
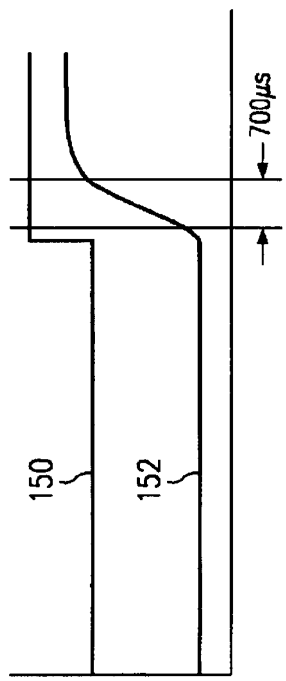
FIG. 7*d* is a graph showing example switching speeds associated with one particular embodiment of the invention.
Figure 7C:
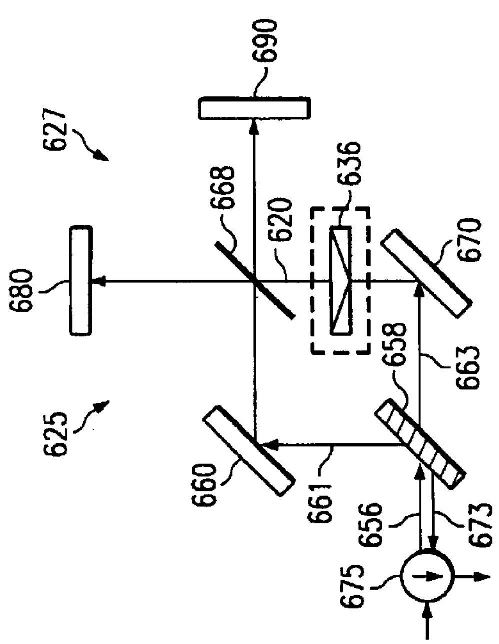

FIG. 7*c* shows an alternate embodiment of a polarization controller 610*b* operable to transform any linear input state of polarization to any arbitrary output state of polarization. In this example, polarization controller 610*b* includes a polarization beam splitter 658 coupled to at least two substantially reflective surfaces 660 and 670. In a particular embodiment, at least one of the substantially reflective surfaces 660, 670 comprises a MEMS based device operable to undergo a substantially piston like movement to introduce a difference in signal path length and a corresponding difference in phase between a first signal copy 661 and second signal copy 662.

Reflective surfaces 660 and 670 are further coupled to a beam splitter 668, which is still further coupled to at least substantially reflective surfaces 680 and 690. In a particular embodiment, at least one of the substantially reflective surfaces 680, 690 comprises a MEMS based device operable to undergo a substantially piston like movement to introduce a difference in signal path length and a corresponding difference in phase between signal copies received.

In operation, polarization beam splitter 658 receives input optical signal 656 and generates two at least substantial copies of that signal. Polarization beam splitter 658 communicates one copy toward first substantially reflective surface 660 and the other copy toward second substantially reflective surface 67 At least one of reflective surfaces 660 and 670, in response to a control signal, changes its position to create a phase difference between the signal copies received at beam splitter 668. Beam splitter 668 receives first and second signal copies 661 and 663, combines components of those signals, and communicates the combined components toward reflective surfaces 680 and 690. At least one of reflective surfaces 680 and/or 690, in response to a control signal, changes its position to create a further phase difference between the signal copies received from beam splitter 668. Reflective surfaces 680 and 690 reflect the further phase shifted signal copies toward beam splitter 668, which receives the signal copies and combines components of those signals.

Beam splitter 668 then communicates the combined components toward reflective surfaces 660 and 670, which introduce yet a further phase shift between the principal modes, and communicate the further phase shifted modes toward polarization beam splitter 658. Polarization beam splitter 658 communicates a phase shifted output 673 toward a circulator 675, which directs the phase shifted output signal from polarization controller 610*b*.

As with polarization controller 610*a*, polarization controller 610*b* may optionally include a polarization converter 636. Polarization converter 636 operates to facilitate polarization control of eigen modes and operates to reduce polarization dependent losses.

Polarization controller 610*b* includes three stages of phase shift. Reflective surfaces 660 and 670 comprise the first and third phase shift stages, while reflective surfaces 680 and 690 comprise the second phase shift stage. In this example, all phase shift stages share a single beam splitter 668. By sharing one beam splitter between multiple phase shift stages, this embodiment of the invention advantageously reduces the number of components required to provide polarization control. For example, this embodiment reduces the number of beam splitters needed, and also reduces the number of polarization converters necessary to both process eigen modes and reduce or eliminate polarization dependent losses. In addition, this embodiment facilitates implementing a single polarization beam splitting device to serve as both the first (input) polarization beam splitter and the second (output) polarization beam splitter.

Polarization controllers 610*a* and 610*b* can be used in a variety of signal processing applications. For example, use in conjunction with polarization sensitive optical components, use in polarization multiplexed lightwave transmission systems, use in coherent communication systems, and use in polarization mode dispersion compensators are just a few examples of applications for polarization controllers 610*a* and 610*b*.

If the characteristic for which the polarization controller is being used changes at a rate that is slower than the reset speed of the polarization controller and, ideally, if the polarization controller can switch at a rate faster than the bit rate of the information being processed, the polarization controller can be made infinitely rotatable (also known as "reset free" or "endless polarization rotation"). In other words, the polarization controller can be used to provide one phase adjustment along the Poincare Sphere, reset, and provide a second phase adjustment modulo 2Pi from the first phase adjustment. In this manner, phase shifters 620–624 can emulate a single large phase shift using numerous smaller phase shifts between changes in polarization.

Through this technique, polarization controller 610*a* can simulate an ability to provide a number of rotations on the Poincare Sphere, without actually having the physical range that would otherwise be necessary to perform the transformation.

One example of a device that is capable of switching at speeds faster than most signals' polarization changes is a MEMS-based phase shifter stage—in particular those operable to undergo substantially piston-like motion and using multiple moving mirror strips to control air damping. For example, in mitigating polarization mode dispersion, polarization controller 610*a* can switch at speeds faster than once each milli-second, the approximate time scale on which polarization mode dispersion varies. Therefore, MEMS-based phase shifter stages 620–624 capable of switching at speeds significantly greater than, for example, once each milli-second can be implemented to provide an endlessly rotatable polarization controller in a PMD compensator.

FIG. 7D is a graph showing realized switching speeds using one particular embodiment of polarization controller 610, which implements MEMS based phase shift stages similar to the device depicted in FIG. 3*a*. In this example, trace 152 shows a switching of the phase shift stages in response to a control voltage 150. As shown in this example, rise times of seven hundred micro-seconds have been obtained. Other switching speeds may be ascertainable, depending on the processing demands and particular device characteristics utilized. For example, faster switching speeds can be obtained using an embodiment similar to that shown in FIG. 3*b*.

Another technique for producing an infinitely rotatable polarization controller is to implement at least four stages of phase shifters. For example, although the embodiments shown in FIGS. 7*b* and 7*c* include three stages of phase shifters, one or more additional phase shift stages could be cascaded with the illustrated stages to render the controllers endlessly rotatable based on the number of phase shift stages being used. Using four or more stages of phase shifters, for example, allows for resetting one stage of phase shifters, while one or more other stages is processing the signal. This facilitates endless polarization rotation while maintaining lower switching speeds.

FIGS. 8–13 provide various examples of methods and apparatus employing polarization controllers of the present invention. For ease of description, FIGS. 8–13 illustrate various examples using details of polarization controller 610*a* shown in FIG. 7*b*. It should be noted that other embodiments, such as polarization controller 610*b* shown in FIG. 7*c* (or various derivatives thereof) could also be used in the examples given in FIGS. 8–13 without departing from the scope of the invention.

Figure 8A:
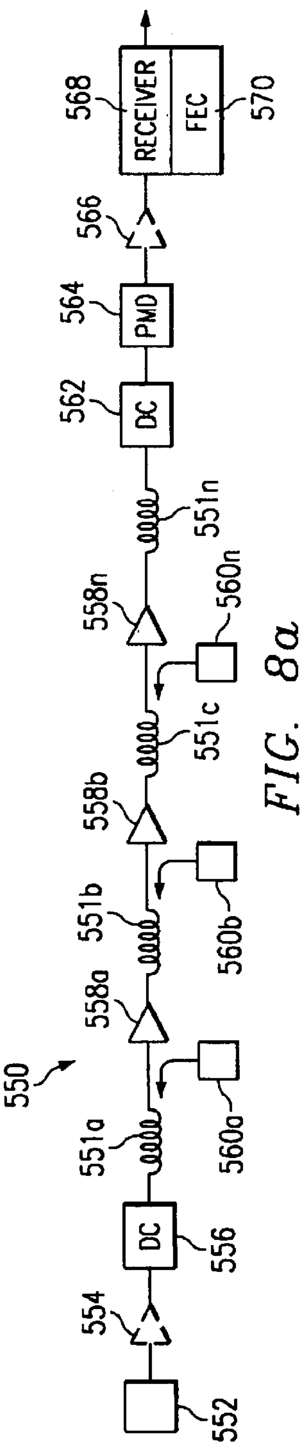
FIGS. 8*a*–8*h* are block diagrams showing various embodiments of systems implementing polarization mode dispersion (PMD) compensators, PMD compensator designs, and components suitable for use in PMD compensators constructed according to the teachings of the present invention.

One aspect of the invention provides novel methods and apparatus useful in mitigating polarization mode dispersion (PMD). FIGS. 8*a*–8*h* are block diagrams showing various embodiments of systems implementing PMD compensators, PMD compensator designs, and components suitable for use in PMD compensators. FIG. 8*a* is a block diagram of an optical communication system 550 implementing a PMD compensator along with one or more margin enhancing elements. As optical communication systems communicate information at higher and higher rates, the need for mitigating polarization mode dispersion increases. In addition, as the bit rate increases, so does the need for more system margin. Conventional systems operating at, for example, ten Giga-bits per second have implemented margin enhancing techniques, such as distributed Raman amplification, forward-error-correction, and dispersion management. To date, however, no system has emerged which optimizes the location and/or operation of one or more of these margin enhancement techniques in conjunction with mitigation of polarization mode dispersion.

In one aspect of the invention, an optical communication system is presented that optimizes the use of PMD compensators in conjunction with one or more margin enhancing devices. System 550 shown in FIG. 8*a* shows an example of one such system. System 550 includes a plurality of fiber spans 551*a*–551*n* coupled between an optical source 552 and an optical receiver 568. In-line amplifiers 558*a*–558*n* reside between fiber spans 551 to provide amplification of the optical signals traversing those spans. These amplifiers may comprise, for example, erbium doped amplifiers, Raman amplifiers, or any other suitable optical amplifying device.

System 564 also includes a PMD compensator 564 operable to reduce polarization mode dispersion in the optical signals being communicated. In this embodiment, PMD compensator 564 resides somewhere along the fiber span coupling the last in-line filter 558*n* and receiver 568. System 550 also includes one or more pre-amplifiers 554 coupled to or integral with optical source 552, and one or more post-amplifiers 566 coupled to or integral with optical receiver 568. One or more post-amplifiers 566 could reside either before the input or after the output of PMD compensator 564.

Coupling PMD compensator 564 at or near the final fiber span provides an advantage of optimizing the optical signal to nose ratio. Placing PMD compensator close to the end of the transmission system results in attenuating both the signal and the noise equally, allowing the system to maintain a good signal-to-noise ratio.

In this embodiment, system 550 implements a plurality of margin enhancing techniques. For example, system 550 includes a dispersion compensator 556 near the optical source and a dispersion compensator 562 close to the optical receiver. This embodiment facilitates pre-amplification, in line amplification, and post-amplification dispersion compensation. For example, dispersion compensators could reside prior to the first amplification stage, between various amplifications stages, and/or after the last amplification stage.

This example also implements distributed Raman amplification to enhance the system margin. In particular, system 550 implements counter-propagating pumps 560*a*–560*n*, which help prevent coupling of pump fluctuations to the optical signals being communicated by system 550. Also in this example, system 550 utilizes forward-error-correction circuitry 570 at or accessible to receiver 568.

Although this particular example shows the use of three margin enhancing techniques, the invention does not require each of these techniques. Rather, by implementing a polarization mode dispersion compensator and at least one margin enhancing technique, this aspect of the invention provides significant advantages in facilitating optical signal transmission at speeds of, for example, forty Giga-bits per second or more. In addition, by locating the PMD compensator near the optical receiver, system 550 maintains a good signal-to-noise ratio.

Figures 8B, 8C, 8D, 8E, 8F:
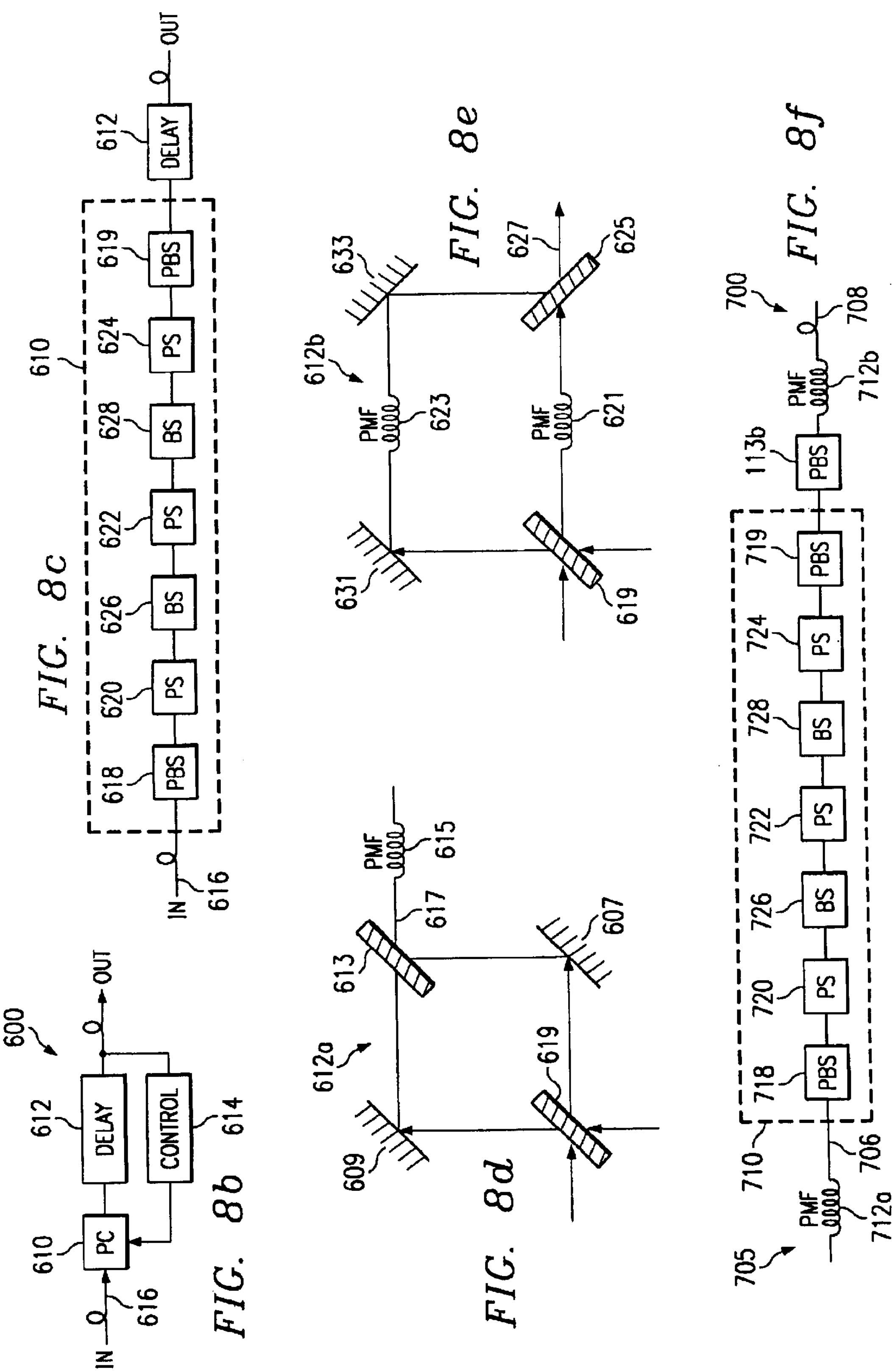

FIG. 8*b* is a block diagram showing one embodiment of a PMD compensator 600 including a polarization controller (PC) coupled to a delay element controlled through control circuitry 614. In a particular embodiment, polarization controller 610 may be similar in structure and function to polarization controller 610 shown in FIG. 7*a*. PMD compensator 600 operates to reestablish a linear polarization between the various modes of an incoming optical signal 616, by delaying the mode associated with the faster axis of the fiber to result in an equalization in communication speeds of both principal axes.

In operation, PMD compensator 600 receives an optical signal 616 at polarization controller 610. In one embodiment, polarization controller 610 is operable to receive an optical signal having any arbitrary state of polarization and to convert the signal to one having a linear state of polarization. In another embodiment, polarization controller 610 operates to receive an optical signal having any arbitrary state of polarization and to convert that signal to one having any other state of polarization. Polarization controller 610 adjusts the state of polarization of each of the principal modes of input signal 616, and passes the adjusted signal to a delay element 612, which delays the leading mode and/or speeds up the lagging mode of polarization. The output from delay element 612, or an electrical version thereof, is then fed back to control block 614, which generates control signals for use by polarization controller 610 in continually adjusting the state of polarization of each principal mode.

FIG. 8*c* is a block diagram showing one possible embodiment of a polarization controller 610 coupled to a delay element 612. In this particular embodiment, polarization controller 610 comprises a phase shift-based polarization controller comprising at least three stages of phase shifters 620, 622, and 624, each operable to provide one degree of freedom in translating the input state of polarization to a desired output state of polarization. In this embodiment, first phase shifter 620 couples to a polarization beam splitter 618, which receives input optical signal 616 and separates the two principal modes of polarization. Phase shifters 620–624 introduce phase shifts between these two principal modes of polarization. In the illustrated embodiment, beam splitters 626 and 628 couple second phase shifter 622 to first phase shifter 620 and third phase shifter 624, respectively. In this example, each of phase shifters 620–624 shares a common beam splitter 626 or 628. Phase shifters 620–624 may comprise, for example, micro-electro-mechanical systems (MEMS) comprising moveable mirror elements in each arm facilitating a phase shift between signal copies communicated through each arm of the phase shifter, as shown in FIGS. 7*b* and 7*c*. Sharing beam splitters between phase shifter stages provides an advantage of reducing the number of components necessary by eliminating the need for bulk wave plates between each phase shift stage. This reduces the cost and complexity of device fabrication, particularly in multiple wavelength applications. The embodiment of polarization controller 610*b* shown in FIG. 7*c* facilitates sharing a single beam splitter between three stages of phase shifters. The embodiment of polarization controller 610 shown in FIG. 8*c* also includes a polarization beam splitter 619, which receives a phase shifted signal from third phase shifter 624, separates the two principal modes of polarization of that signal to ultimately facilitate transmission of the lagging mode of polarization parallel to a faster principal axis of delay element 612, and transmission of the leading mode of polarization parallel to a slower principal axis of delay element 612. The embodiment shown in FIG. 7*c* facilitates implementing the first and second polarization beam splitters as a single beam splitting device 658.

Delay element 612 can comprise any device—hardware, software, firmware, or combination thereof operable to provide a delay to one component of an optical signal with respect to another component of that signal. In a particular embodiment, delay element may comprise, for example, a length of polarization maintaining fiber (PMF) that has been intentionally formed so that one of its principal axes is faster than the other. Where delay element 612 comprises a fixed delay element, polarization controller 610 should comprise at least three stages of phase shifters 620–624 to ensure adequate flexibility in aligning the principal modes of polarization of input signal 616 to the fast and slow axes of fixed delay element 612. Polarization controller 610 could alternatively, however, comprise additional phase shift stages beyond the three shown in FIG. 7*b*. Where PMD compensator 600 comprises a fixed delay element 612, polarization controller 610 can comprise any number of phase shift stages greater than two. Additional stages of phase shifters provide an advantage of allowing the use of more simple control algorithms in control block 614.

Other typed of delay elements could be used consistent with the invention. For example, delay element 612 could comprise one or more retardation plates, or other suitable birefringent material. In another embodiment, delay element 612 could comprise a variable delay line comprising, for example, a polarization controller coupled between lengths of polarization maintaining fiber. In still another embodiment, delay element 612 could comprise an electronic delay circuit. Chirped HiBi fiber gratings provide still another example of a delay element applicable to the present invention. For ease of description, the following examples will assume use of polarization maintaining fiber as a delay element. Other delay elements could be used consistent with the invention.

The embodiment shown in FIG. 8*c* provides significant advantages over other PMD compensator designs, by mitigating the effects of polarization mode dispersion without requiring the use of physical rotation of the compensator, physical squeezing of the fiber communication line, the use of expensive lithium niobate waveguide devices, or the use of bulk wave plates between each stage of phase shifters. Moreover, while this embodiment can be used with a variable delay line, it does not require the use of more expensive variable delay elements. Instead, it facilitates the use of an inexpensive fixed delay element, such as a length of polarization maintaining fiber.

Where polarization controller 610 implements a polarization converter coupled to the last phase shift stage, the polarization controller generates a single output. In that case, a delay element can be coupled directly to the output of the polarization controller. FIGS. 8*d*–8*e* are block diagrams showing illustrative examples of coupling delay elements 612*a* and 612*b*, respectively, to a polarization controller that does not use a polarization converter to result in a single output. In FIG. 8*d*, delay element 612*a* comprises a fixed delay element including a polarization beam splitter 613 coupled to a length of polarization maintaining fiber 615. In this example, mirrors 607 and 609 reflect the two phase shifted outputs of polarization beam splitter 619 toward polarization beam splitter 613. Polarization beam slitter 613 acts as a signal combiner to form output 617, which is communicated to polarization maintaining fiber 615.

Delay element 612*b* shown in FIG. 8*e* includes a first delay line 621 and a second delay line 623, each coupled to polarization beam splitter 619. In this particular example, each of delay lines 612 and 623 comprises a length of polarization maintaining fiber. In the illustrated embodiment, polarization beam splitter 619 directs a first phase shifted principal mode of polarization toward first delay line 621, and directs a second phase shifted principal mode of polarization toward a mirror 631, which reflects the second principal mode toward second delay line 623. A mirror 633 receives a delayed phase shifted principal mode from second delay line 623, and directs that signal toward a polarization beam splitter 625. Polarization beam splitter 625 receives the delayed phase shifted principal modes of polarization from delay lines 621 and 623, and combines those signals into a compensated output 627.

The embodiments of delay elements 612*a* and 612*b* shown in FIGS. 8*d* and 8*e* are intended for illustrative purposes only. Other delay elements and/or configurations of elements could be used without departing from the scope of the invention.

A related aspect of the invention comprises a method and apparatus for facilitating variable delay for use, for example, in a PMD compensator. FIG. 8*f* is a block diagram of one embodiment of a variable delay line 700. Variable delay line 700 comprises at least one polarization controller 710 coupled between a pair of polarization maintaining fibers (PMF) 712*a*–712*b*. Polarization maintaining fibers 712 are similar in structure and function to fixed delay element 612 described with respect to FIG. 8*b*. Polarization controller 710 is similar in structure and function to polarization controller 610 described with respect to FIGS. 7*a* and 8*a*.

In operation, first polarization maintaining fiber 712 receives an optical signal 705 having its two principal modes of polarization oriented for transmission substantially parallel with the principal axes of first polarization maintaining fiber 712*a*. First polarization maintaining fiber 712*a* communicates the lagging mode of polarization of signal 705 parallel to its faster axis, and communicates the leading mode of polarization of signal 705 parallel to its slower axis to generate a partially compensated signal 706.

Polarization controller 710 receives partially compensated signal 708 and performs a phase shift on that signal to align the principal modes with the principal axes of second polarization maintaining fiber 712*b*. Second polarization maintaining fiber 712*b* then communicates the leading mode of polarization of signal 708 on its slower principal axis, and communicates the lagging mode of polarization of signal 708 on its slower principal axis. In this example, a polarization beam splitter 713*b* receives the phase shifted signal from polarization beam splitter 719 of polarization controller 710, and facilitates transmission of the leading principal mode parallel to the slow axis and the lagging principal mode parallel to the fast axis of polarization maintaining fiber 712*b*.

By implementing multiple stages of polarization maintaining fiber coupled to a polarization controller, variable delay line 700 facilitates more granular control over compensation than a fixed delay element. To add still more granularity of control, additional stages of polarization maintaining fiber separated by additional polarization controllers can be cascaded serially.

Figure 8G:
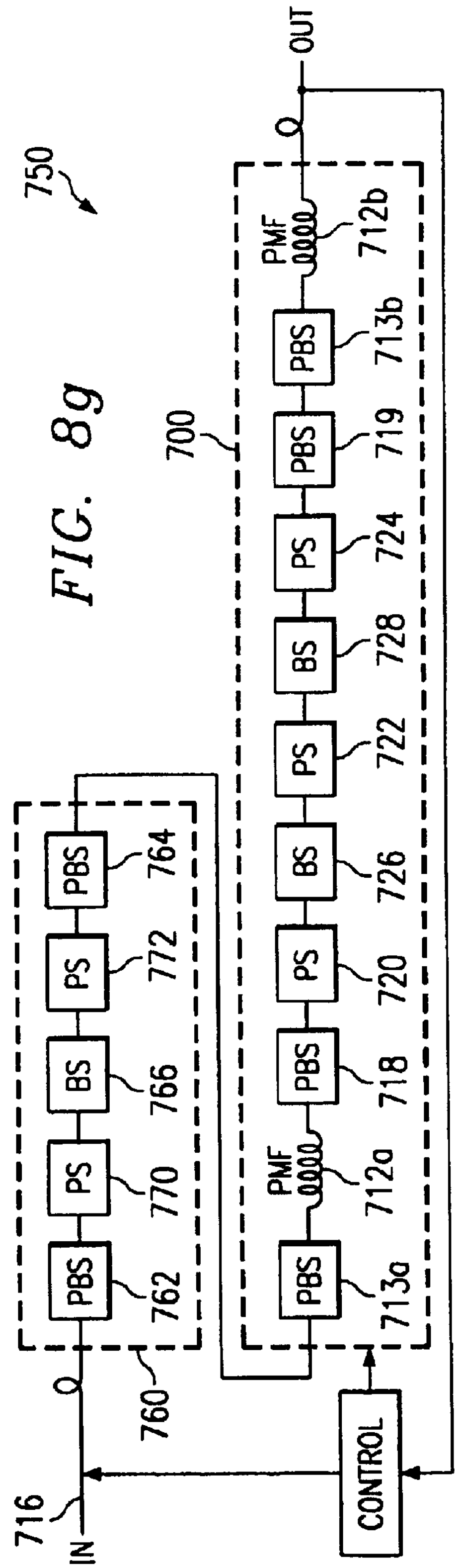

FIG. 8*g* is a block diagram showing one embodiment of a PMD compensator 750 implementing variable delay line 700. PMD compensator 750 includes a polarization controller 760 coupled to variable delay line 700 and a control block 714. Polarization controller 760 comprises a first polarization beam splitter 762 operable to receive optical signal 716 and to separate the principal modes of polarization of that signal, and a beam splitter 764 operable to align the principal modes of polarization of the phase shifted signal with the principal axes of variable delay line 780. In the illustrated embodiment, polarization controller 760 includes just two phase shifters 770 and 772 separated by a beam splitter 766. In a particular embodiment, beam splitter 766 may comprise an approximately 50/50 beam splitter. Implementing a variable delay line, such as variable delay line 700, allows PMD compensator to utilize a two stage phase-shift based polarization controller 760. While additional stages of phase shifters in polarization controller 760 could be used without departing from the scope of the invention, using variable delay line 700 facilitates similar PMD compensation to a three or more stage phase shift polarization controller, while eliminating a stage of phase shifters.

Figure 8H:
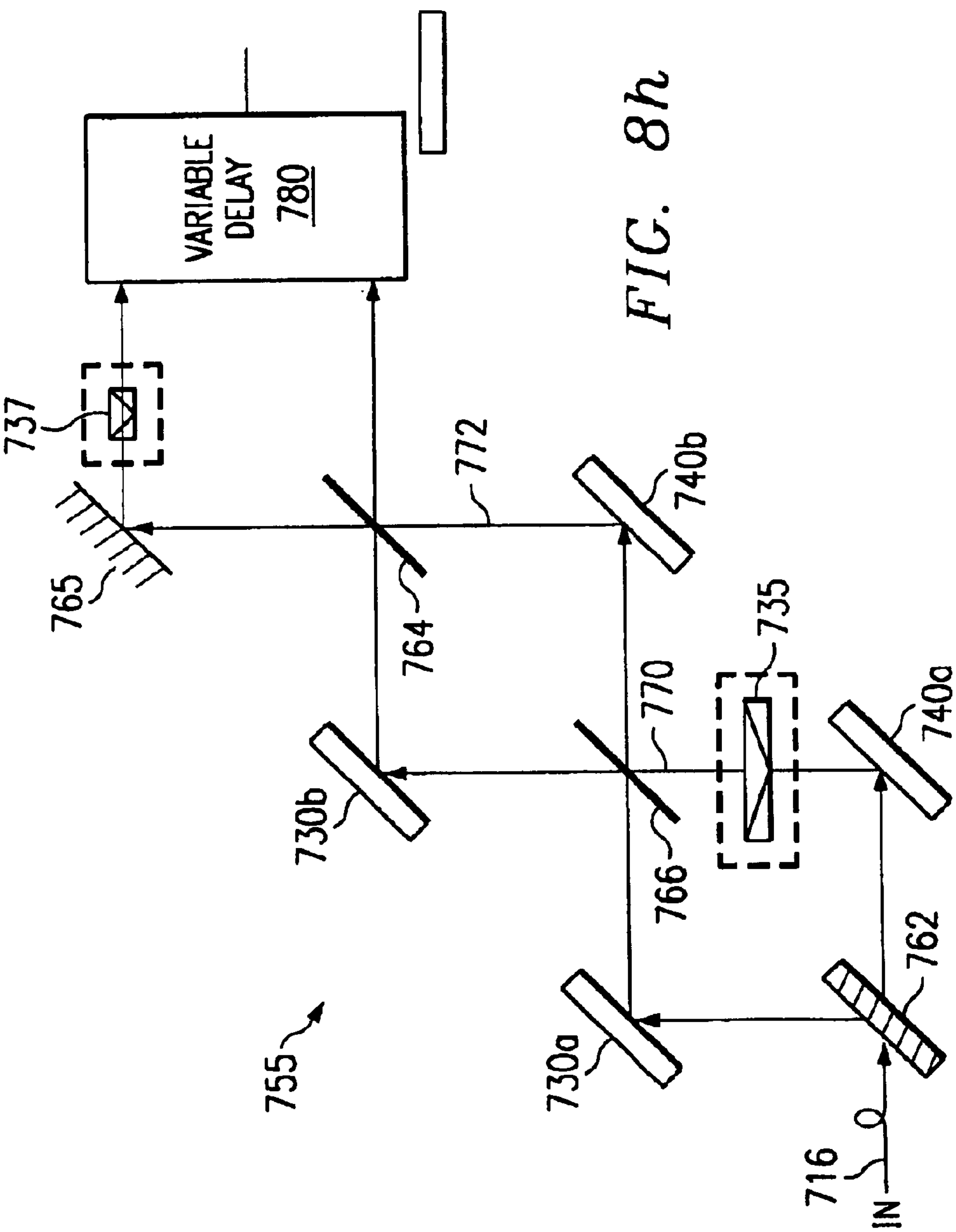

FIG. 8*h* is a block diagram showing one possible embodiment of a two-stage phase shift based polarization controller 755 coupled to a variable delay element 780. In this example, each phase shifter stage 770–772 of polarization controller 755 comprises a MEMS-based device, such as the device described above with respect to FIG. 4. Although phase shifter stages 770–772 have a similar configurations to apparatus 100 shown in FIG. 2*a*, phase shifter stages 770–772 could implement other configurations, such as those shown in FIGS. 1*c*–1*d*.

In this example, each phase shifter 770–772 includes two arms, at least one of which comprises a moveable mirror structure 730 and/or 740. Mirrors 730 and/or 740 are operable to move in response to one or more control signals to result in a change in the length of the signal path and, therefore, a phase shift between signal copies communicated through the arms of phase shifters 770–772. Phase shifter stages 720 and 722 share a beam splitter 766 coupled between those stages.

Polarization beam splitter 762 receives optical input signal 716 and separates the two principal modes of polarization onto a first signal path directed toward mirror 730*a*, and a second signal path directed toward mirror 740*a*. Each phase shift stage 770 and 772 introduces a phase shift between the principal modes of polarization of signal 716. A beam splitter 764 receives phase shifted signals from second phase shifter stage 772 and aligns the principal modes of polarization with the principal axes of variable delay line 780. Variable delay line 780 may comprise any device or combination of devices operable to provide a tunable delay line.

Using the configuration shown in FIG. 8*h*, two stage polarization controller 755 can receive an input signal having any arbitrary state of polarization, and can generate an output signal having a linear state of polarization. Variable delay line 780 can then complete the PMD compensation by introducing variable levels of delay into one or more modes of polarization of the phase shifted signal from polarization controller 755. Consequently, the PMD compensator of FIG. 8*h* provides efficient and cost effective PMD compensation for signals having any state of polarization.

Figure 9:
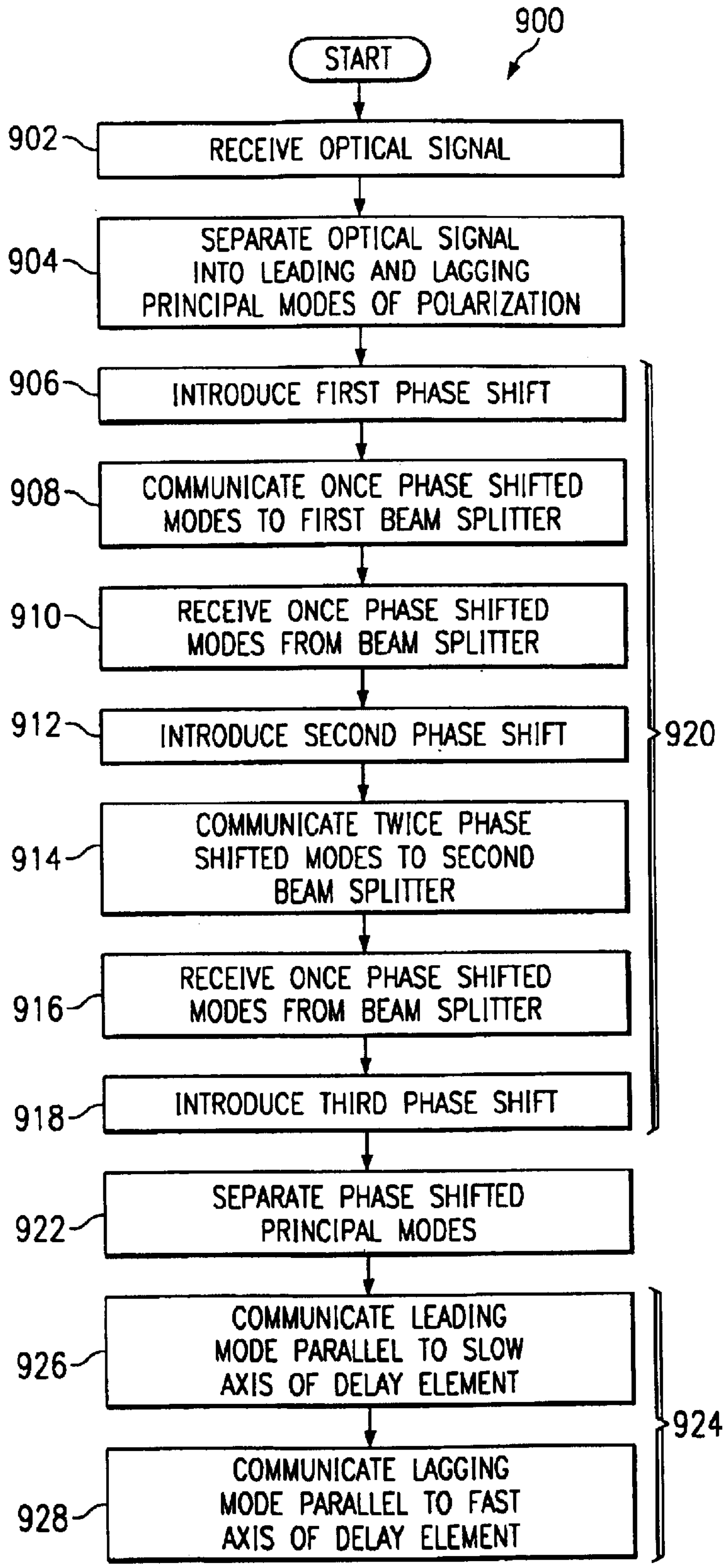
FIG. 9 is a flowchart showing one example of a method of controlling the polarization of an optical signal and of mitigating polarization mode dispersion according to the teachings of the present invention.

FIG. 9 is a flowchart showing one example of a method 900 of controlling the polarization of a signal and ultimately mitigating polarization mode dispersion. Method 900 begins at step 902 where polarization controller 610 receives optical signal 616 at step 902. Polarization controller 610 separates optical signal 616 into a leading principal mode of polarization and a lagging principal mode of polarization at step 904. This may include, for example, polarization beam splitter 618 receiving optical signal 616, and communicating first mode 662 toward first mirror 630 and communicating second mode 664 toward second mirror 640.

Polarization controller 610 introduces phase shift between the leading and lagging modes of polarization at step 920. This may include, for example, first phase shift stage 620 introducing a first phase shift at step 906, and communicating phase shifted modes 662 and 664 to first beam splitter 626 at step 908. In a particular embodiment, beam splitter 626 may comprise a mode coupling beam splitter operable to flip the polarization of one of the signal copies to facilitate processing of eigen modes.

First beam splitter 626 communicates substantial copies of phase shifted modes toward first and second mirrors 630*b* and 640*b*, where a second phase shift is introduced at step 912. First and second mirror 630*b* and 640*b* communicate the twice phase shifted modes 662 and 664 to second beam splitter 628 at step 914. Second beam splitter 628 receives the twice phase shifted modes and communicates copies of those signals to first and second mirrors 630*c* and 640*c*, where a third phase shift is introduced at step 918. In a particular embodiment, second beam splitter 628 may comprise a mode coupling beam splitter operable to flip the polarization of one of the modes, to facilitate communication of a single output signal and reduce polarization dependent losses.

Polarization beam splitter 619 receives phase shifted principal modes of polarization 662 and 664 and separates the principal modes of polarization at step 922. Steps 902 through 922 have described one example of a method of controlling polarization in an optical signal. This method may find application, for example, in a PMD compensator as discussed below, or in a polarization multiplexed lightwave transmission system, in a coherent communication system, or in conjunction with polarization sensitive optical components.

One particular method of mitigating polarization mode dispersion continues at step 924 where polarization controller 610 communicates the phase shifted principal modes of polarization to delay element 612. Although delay element 612 may comprise any of a variety of devices operable to introduce delay, in a particular embodiment, polarization controller 610 aligns the leading mode of polarization with a slow axis of a polarization maintaining fiber 612*a* at step 926, and aligns the lagging mode of polarization parallel to a fast axis of the polarization maintaining fiber 612*a* at step 928. Using a phase shift based polarization controller, PMD compensator 600 operates to align any arbitrary state of polarization with any other arbitrary state of polarization to result in mitigation of polarization mode dispersion.

Figure 10A:
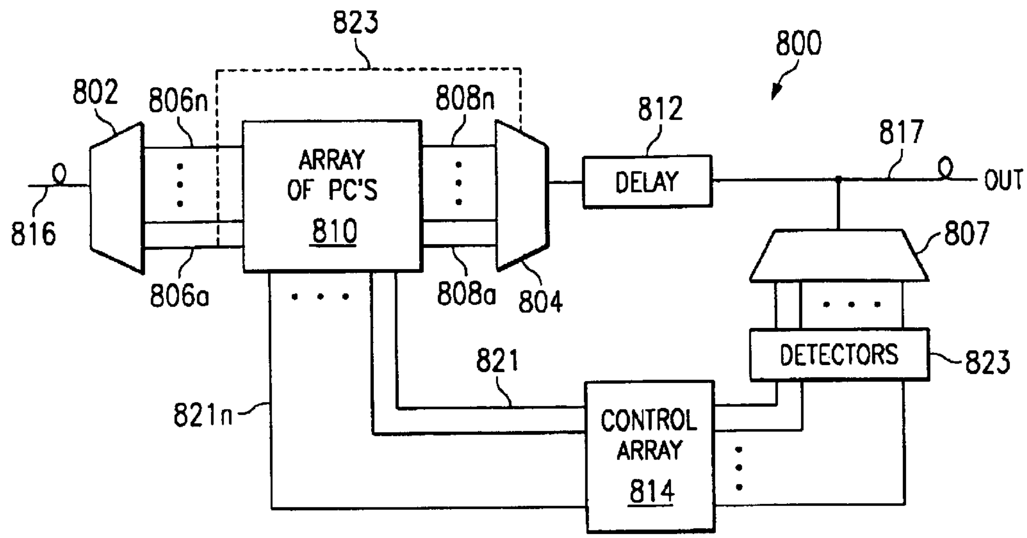
FIGS. 10*a*–10*b* are block diagrams showing a system and components thereof operable to mitigate polarization mode dispersion in optical signals having multiple wavelengths according to the teachings of the present invention.
Figure 10B:
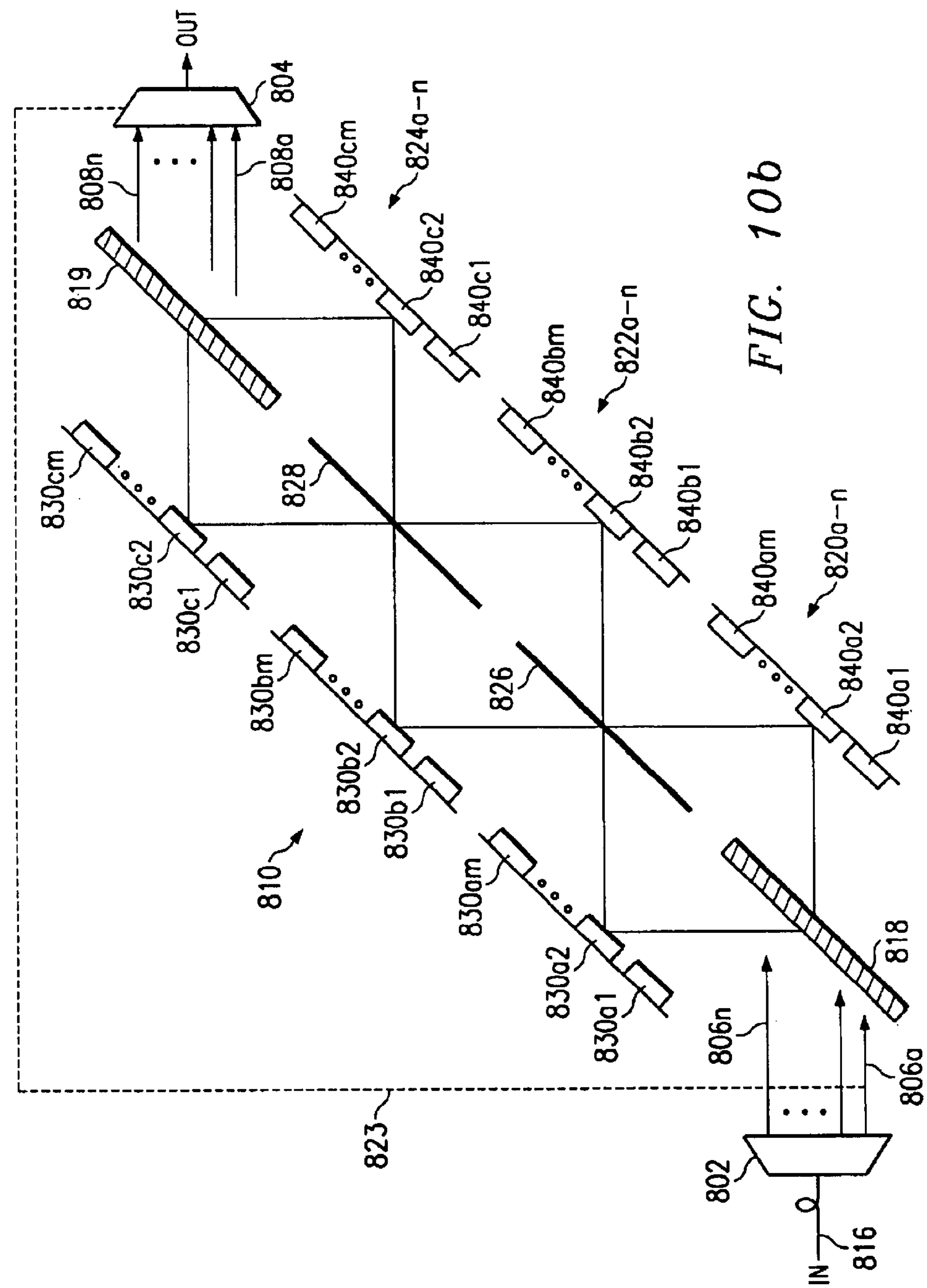

FIGS. 10*a*–10*b* are block diagrams showing various embodiments of a system and components thereof operable to mitigate polarization mode dispersion in multiple-wavelength optical signals. Where optical signals comprise multiple wavelengths, each wavelength will rotate in polarization differently as it traverses the optical fiber. Consequently, compensating for polarization mode dispersion must be done on a wavelength-by-wavelength basis. Conventional solutions to PMD compensation that offer endlessly rotatable operation—such as those using lithium niobate based polarization controllers—are very expensive, even on a single wavelength application. As optical systems implement more and more communication channels (using more and more wavelengths), the cost of PMD compensation using conventional equipment quickly becomes prohibitive.

One aspect of the invention provides an architecture that is easily and inexpensively replicated to facilitate arrays of PMD compensators capable of processing any number of wavelengths of light. System 800 as shown in FIG. 10*a* includes an array of polarization controllers 810. Each polarization controller in array 810 comprises a MEMS-based phase shift polarization controller. System 800 also includes a delay element 812. Delay element 812 may comprise a fixed delay element, such as polarization maintaining fiber 612 shown in FIG. 8*d*, or a variable delay element, such as variable delay line 710 shown in FIG. 8*f*. In the illustrated embodiment, all polarization controllers share a single delay element 812. Alternatively, system 10 could implement multiple delay elements 812, each servicing one or more polarization controllers of array 810.

Where delay element 612 comprises a fixed delay element, each polarization controller of array 810 comprises three or more stages of phase shifters, such as in polarization controller 610 shown in FIG. 8*d*. Where delay element 612 comprises a variable delay element such as variable delay line 710 shown in FIG. 8*f*, each polarization controller of array 810 may comprise as few as two stages of phase shifters, as in polarization controller 760 shown in FIG. 8*g*.

In the illustrated embodiment, system 800 further includes a wavelength division demultiplexer 807 coupled to the output of delay element 812, and an array of detectors 823. Wavelength division multiplexer 807 is operable to receive a compensated signal 817 from delay element 812, separate the various wavelengths of that signal, and pass those wavelengths to a detector 823. Detectors 823 convert the optical signals received into electrical signals for processing in an array of control circuitry 814. Control circuitry 814 generates control signals 821*a*–821*n*, which are communicated to associated polarization controllers of array 810.

In an alternative embodiment, demultiplexer 807 and array of detectors 823 could be replaced by a variable filter or a scanning filter operable to sequentially filter each wavelength from signal 817, and to pass each wavelength to control array 814. Control array 814 could, for example, communicate control signals to array of polarization controllers 810 and also communicate a signal to the scanning filter instructing the filter to deliver the next wavelength.

In operation, wavelength division demultiplexer 802 receives an optical input signal 816 having a plurality of wavelengths, and separates signal 816 into a plurality of individual wavelength signals 806*a*–806*n*. In one embodiment, polarization controllers of array 810 each receive one of wavelengths 806*a*–806*n* for processing. Alternatively, system 800 may communicate only some of wavelengths 806 to polarization controller array 810, and allow other wavelengths 806 to bypass polarization controller array 810 through bypass path 823. This may be useful, for example, where system 10 provides PMD compensation for communication systems using only some of the wavelengths of signal 816. In those cases, system 10 can provide efficiencies of compensating only those wavelengths being utilized, allowing non-utilized wavelengths to pass without processing.

Polarization controllers of array 810 receiving utilized wavelengths introduce phase shift into those signals to align the principal modes of polarization to the appropriate axes of delay element 812. Wave division multiplexer 804 receives phase shifted signals 808*a*–808*n* from polarization controller array 810, multiplexes those signals into a one or more phase shifted optical signals for communication to delay element 812. Delay element 812 communicates the leading mode of polarization parallel to its faster axis, and communicates the lagging mode of polarization parallel to its slower axis to mitigate polarization mode dispersion.

Control array 814 receives compensated signals 817 and generates control signals 821 for feedback to polarization controllers of array 810. In a particular embodiment, control array 814 comprises an array of electronic circuitry, which receives electronic signals from one or more detectors 823 operable to convert optical signals to electrical signals. Control signals 821 may comprise, for example, voltage signals operable to control the amount of movement in moveable mirror structures, such as 630 and 640 shown in FIG. 7*b* or mirrors 730 and 740 shown in FIG. 8*h*. Controlling the amount of displacement of these mirrors controls the change in path length of signals communicating with those mirrors and, therefore, the phase shift of the resulting signals. This embodiment provides an advantage of facilitating use of readily available electronic control circuitry for system 800.

FIG. 10*b* is a block diagram showing one possible embodiment of polarization controller array 810. Polarization controller array 810 may be useful, for example, in a multiple-wavelength PMD compensator. Alternatively, polarization controller array 810 could be applied to any system where it is desirable to control the polarization of multiple wavelengths in one or more optical signals. Although each polarization controller of array 810 is depicted as similar to polarization controller 610*a* of FIG. 7*a*, polarization controllers 810*a*–810*n* could alternatively comprise polarization controllers, such as controller 610*b* shown in FIG. 7*c* (or derivatives thereof).

In this example, each polarization controller 810*a*–810*n* of array 810 includes a polarization controller similar to that shown in FIG. 7*b*. Each phase shifter stage 820*a–n* through 824*a–n* (referred to generally as phase shifter stages 820–824) comprises a MEMS-based device, such as the device described above with respect to FIG. 4. Each phase shifter stage 820–824 includes two arms, at least one of which comprises a moveable mirror structure 630 and/or 640. Mirrors 630 and/or 640 are operable to move in response to one or more control signals 821 to result in a change in the length of the signal path and, therefore, a phase shift between signal copies communicated through the arms of phase shifters 820–824. Phase shifter stages 820–824 are coupled together by beam splitters 826 and 828. Beam splitters 826–828 may comprise, for example, approximately 50/50 beam splitters. In this example, polarization beam splitter 818 receives various wavelengths 806*a*–806*n* of optical input signal 816 and separates the two principal modes of polarization in those signals onto a first signal path and a second signal path. A polarization beam splitter 819 receives phase shifted signals from third phase shifter stages 824 and aligns the principal modes of polarization with the principal axes of delay element 812.

Although the illustrated embodiment shows three stages of phase shifters, additional stages could be implemented consistent with the present invention. Moreover, where delay element 812 comprises a variable delay line, each polarization controller in array 810 could comprise as few as two stages of phase shifters. Although this example shows just one MEMs device in each arm of each phase shifter stage, additional MEMs devices could be implemented without departing from the invention. Furthermore, although MEMs devices 830 and 840 are shown at an approximately forty-five degree grazing angle, these devices could be located at other grazing angles to the signals being reflected.

Implementing phase shifter based polarization controllers and/or variable delay lines using MEMs devices allows for fabrication of arrays of these devices at an incremental additional cost to fabricating a single compensator. This aspect of the invention provides significant advantages in facilitating rapid, effective, and economical PMD compensation, particularly in a multiple wavelength environment.

Figure 11:
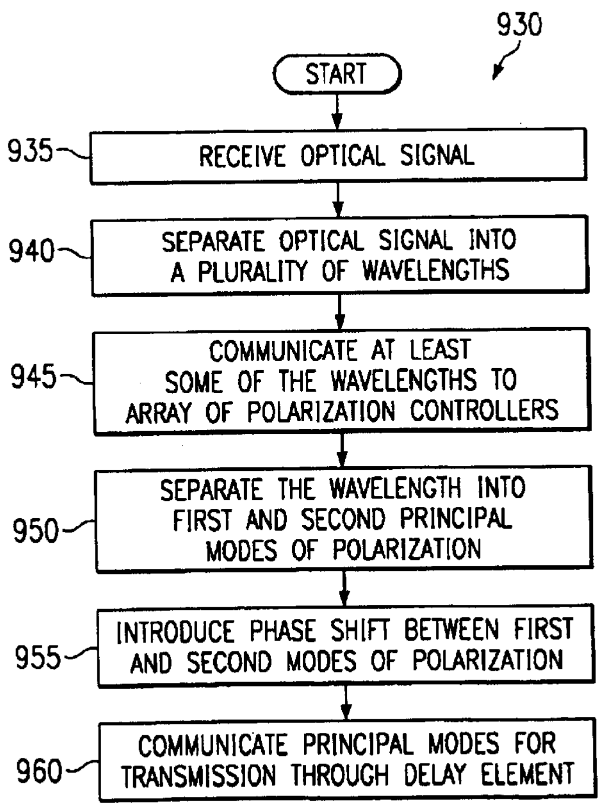
FIG. 11 is a flowchart showing one example of a method of mitigating polarization mode dispersion of optical signals having multiple wavelengths according to the teachings of the present invention.

FIG. 11 is a flowchart showing one example of a method 930 of mitigating polarization mode dispersion in multiple wavelengths of an optical signal. Method 930 begins at step 935 where system 800 receives optical signal 816 having a plurality of constituent wavelengths. System 800 separates optical signal 816 into a plurality of individual wavelength signals at step 940. This may include, for example, wavelength division demultiplexer 802 receiving optical signal 816 and separating optical signal 816 into a plurality of wavelength signals 806*a*–806*n*.

System 800 communicates at least some of the wavelengths 806 to array 810 of polarization controllers at step 945. This step may also include, for example, diverting one or more wavelengths 806 to a bypass path 823 where those wavelengths 806 are not to be processed by system polarization controllers 810.

Each polarization controller of array 810 separates its associated wavelength 806 into a first and a second principal mode of polarization at step 950. This may include, for example, polarization beam splitter 818 receiving one or more wavelengths 806 and separating those wavelengths into their principal modes of polarization. Each polarization controller of array 810 next introduces phase shift between the first and second modes of polarization of each wavelength at step 955. This may include, for example, introducing at least three stages of phase shift between the first and second modes of polarization to align each of the first and second modes with a principal axis of a fixed delay element. Alternatively, this may include introducing at least two stages of phase shift between the first and second modes of polarization to align each of the first and second modes with a principal axis of a variable delay line. In addition, polarization converters 635 and 637 could operate to flip polarizations of one of the signal copies, to facilitate processing of, for example, eigen modes, and to reduce polarization dependent losses.

Polarization controllers of array 810 communicate phase shifted principal modes of polarization for transmission through delay element 812 at step 960. This may include, for example, multiplexing the plurality of wavelength signals 806 into a single optical signal fed to a common delay element 812. Alternatively, this may include communicating each phase shifted wavelength signal 806 to a separate delay element 812.

Communicating principal modes of polarization through delay element 812 may further comprise determining a control signal based at least in part on an output from delay element 812, and altering the phase shift introduced in array of polarization controllers 810 based on the control signal. In a particular example, optical output 817 may be used as an input to one or more detectors 823, which convert optical signals 817 to electrical signals fed to control array 814. Control array 814, in that embodiment, may comprise electronic circuitry operable to generate electrical control signals 821 to control the amount of phase shift introduced into each wavelength 806.

Although array 810 of polarization controllers has been described as being useful in mitigating polarization mode dispersion, a similar array could be equally applicable to other situations in which it is useful to control polarization of multiple wavelength signals. For example, array 810 is equally suitable for use in conjunction with polarization sensitive optical components, polarization multiplexed lightwave transmission systems, and/or coherent communication systems.

Figure 12:
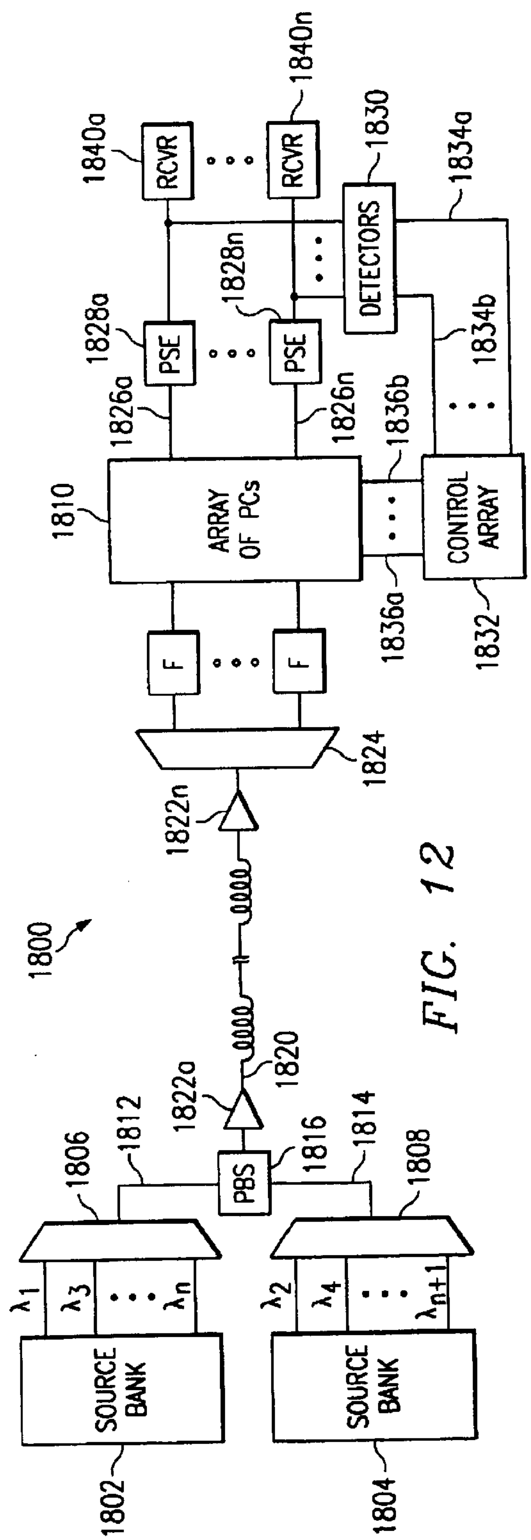
FIG. 12 is a block diagram showing an exemplary embodiment of a polarization multiplexing system constructed according to the teachings of the present invention.

FIG. 12 is a block diagram showing an exemplary embodiment of a polarization multiplexing system 1800. To meet the ever increasing bandwidth demands of current and future communication systems, optical communication systems often communicate information using multiple wavelengths multiplexed into one or several optical signals. Current filter technology often becomes a limiting factor in the number of optical wavelengths that can be communicated in any given signal. For example, a filter at the receiving end of the transmission system should be capable of at least substantially isolating each wavelength carrying information from its neighboring wavelengths. Current filter technology often limits the density of wavelengths that can be packed into any given signal. One way of increasing the density of wave division multiplexed signals is to alternately polarize neighboring wavelengths so that each wavelength is polarized orthogonally to its neighboring wavelength. A polarization controller can then be used to aid in the filtering at the receiving end of the transmission line to isolate each wavelength from its neighboring wavelengths. In this way, polarization controllers can be used to increase the spectral efficiency of the communication system.

System 1800 shown in FIG. 12 provides another example of an application for an array of polarization controllers useful in controlling the polarization of individual wavelength signals of a wavelength division multiplexed signal. System 1800 includes a first source bank of transmitters 1802 and a second source bank of transmitters 1804. First and second banks of transmitters may comprise any devices operable to generate optical signals having different wavelengths. In this example, first source bank 1802 generates odd wavelengths $\text{Lamda}_1$–$\text{Lamda}_n$, while second source bank 1804 generates even wavelengths $\text{Lamda}_2$ through $\text{Lamda}_{n+1}$. In this example, $\text{Lamda}_2$ has neighboring wavelengths $\text{Lamda}_1$ and $\text{Lamda}_3$, and $\text{Lamda}_4$ has neighboring wavelengths $\text{Lamda}_3$ and $\text{Lamda}_5$. First and second source banks 802 and 804 generate neighboring wavelength signals to those generated by the other source bank.

Wavelength division multiplexers 806 and 808 are coupled to first source bank 802 and second source bank 804, respectively. Wavelength division multiplexers 1806 and 1808 each multiplex the individual wavelength signals received into a multiple wavelength signal 1812 and 1814, respectively.

System 1800 also includes a polarization beam splitter 1816, which receives multiple wavelength signals 1812 and 1814, and orthogonally polarizes those signals for transmission over the principle modes of polarization of an optical communication link 1820. Optical communication link 1820 may comprise a number of lengths of optical fiber, and may include one or more amplifier stages 1822*a*–1822*n* as pre-amplifiers, post-amplifiers, and/or inline amplifiers to communication link 1820. System 1800 further includes a wave division demultiplexer 1824 coupled to optical communication link 1820. Wave division demultiplexer 1824 receives multiple wavelength signals 1812 and 1814 communicated over the principle modes of polarization of communication link 1820, and separates the individual wavelength signals. In a particular embodiment, System 1800 may include filters 1826*a*–1826*n*. Filters 1826 operate to at least substantially isolate the desired wavelength signal from its neighboring wavelength signals. System 1800 also includes an array of polarization controllers 1810. Each polarization controller of array 1810 operates to provide any necessary adjustment to the state of polarization of the incoming signal wavelength to facilitate a polarization selection element separating the neighboring orthogonally polarized wavelengths.

In a particular embodiment, array 1810 is similar in structure and function to array 810 described in FIG. 10*b*. Each polarization controller of array 1810 comprises a plurality of phase shift stages, where at least one of the phase shift stages shares a beam splitter with another of the phase shift stages, such as in polarization controller 610*a* shown in FIG. 7*b*. In one particular embodiment, each polarization controller of array 1810 may comprise three phase shift stages, where all phase shift stages share a common beam splitter, such as in polarization controller 610*b* shown in FIG. 7*c*.

In one particular example, each of the phase shift stages may, for example, include MEMS-based devices, such as those shown in FIGS. 3*a*–3*c*, operable to undergo a substantially piston-like motion to introduce a phase shift between copies of the optical signal being phase shifted. Each polarization controller of array 1810 operates to control polarization of one wavelength signal. By implementing an array of polarization controllers, such as shown in FIG. 10*b*, the invention facilitates processing of densely packed wavelengths at a small incremental cost over the cost of processing a single wavelength.

In addition, system 1800 includes a plurality of polarization selection elements 1828*a*–1828*n*. In a particular embodiment, each polarization selection element may comprise, for example, a polarization beam splitter or a polarizer. Polarization selection elements 1828 operate to separate the desired signal wavelength from its orthogonally polarized neighboring wavelengths.

System 1800 also includes an array 1830 of detectors. Array of detectors 1830 operates to receive optical signals from polarization selection elements 1828 and to form electrical signals 1834*a*–1834*n*, which can be fed to array 1832 of control circuitry. Control circuitry array 1832 may comprise, for example, electronic control circuitry operable to receive feedback signals from polarization selection elements 1428 and to generate control signals 1836*a*–1836*n* operable to effect an adjustment of polarization controllers 1810. Receivers 1840*a*–1840*n* receive individual wavelength signals from polarization selection elements 1828.

In operation, system 1810 generates a plurality of neighboring wavelength signals at one or more source banks 1802, 1804, and communicates those signals to two or more wavelength division multiplexers 1806, 1808. Each wavelength division multiplexer 1806, 1808 receives a plurality of wavelength signals and multiplexes those signals into a multiple wavelength optical signal 1812, 1814, respectively.

Polarization beam splitter 1816 receives the multiple wavelength optical signals and communicates each signal along a separate principle mode of polarization of an optical fiber 1820. Wavelength division demultiplexer 1824 receives the multiple wavelength signals and separates the individual wavelength signals therefrom.

Each polarization controller of array 1810 of polarization controllers receives one of the wavelength signals and adjusts the state of polarization of that wavelength signal to assist in separating that wavelength signal from its neighboring wavelength signals. Filters 1826 and polarization selection elements 1828 at least substantially isolate the individual wavelength signal from any remnants of neighboring wavelength signals, and communicate the individual wavelength signals to receivers 1840.

Control array 1832 receives input from polarization selection elements 1828 and generates control signals 1836, which are communicated to polarization controllers of array 1810. These control signals facilitate adjustment of the state of polarization of the incoming wavelength signals to ensure that those signals can be identified distinctly from neighboring wavelength signals.

Figure 13:
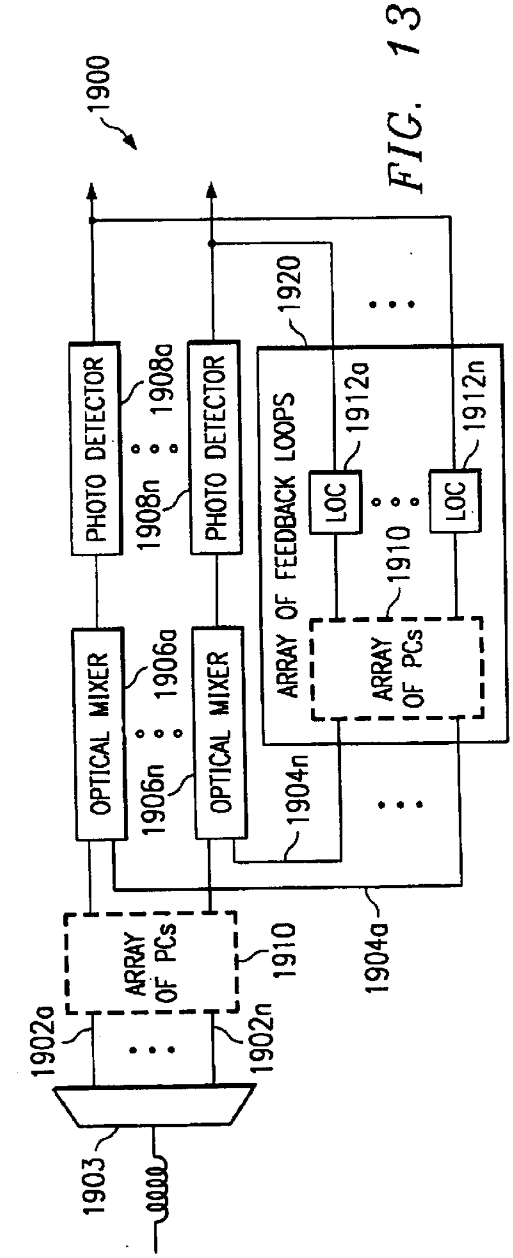
FIG. 13 is a block diagram of an exemplary system operable to facilitate coherent optical communication according to the present invention.

FIG. 13 is a block diagram of an exemplary system 1900 operable to facilitate coherent optical communication. Coherent optical communication typically involves combining an optical signal carrying desired information (an incident signal) with a higher power signal from a local oscillator to create a cross product of the two signals, which is of higher power than the incident signal. By substantially matching the phases of the incident signal with the local oscillator signal, the power of the cross product can be maximized and made significantly larger in magnitude than the incident signal. The cross product portion of the signal is more easily detectable than the incident signal, thus increasing the sensitivity of the optical system and increasing the system's tolerance to noise.

The equation below mathematically illustrates the operation of a coherent optical system, such as system 1900.

$$I_{ph}=R[P_{inc}+P_{loc}+2(P_{inc}P_{loc})^{1/2}\cos(w_{inc}t-w_{loc}t)]$$

In this equation, $I_{ph}$ is the intensity of the combined signal received at the photo-detector; R is the responsibility of the photo-detector; $P_{inc}$ is the power of the incident signal; and $P_{loc}$ is the power of the local oscillator signal. Because the local oscillator signal is known, it can easily be filtered from the output signal. By using a local oscillator signal having a power that is significantly larger than the power of the incoming signal, the cross product term of this equation—assuming the incident signal and local oscillator signal have substantially equal polarizations—will overwhelm the power of the incident signal, such that the incident signal can be ignored compared to the cross product.

Because the polarization of the incident signal can vary over time, it is desirable to implement a polarization controller to ensure that the incident signal is not orthogonally polarized to the local oscillator signal. Thus, coherent optical communication systems provide another application for polarization controllers.

System 1900 shown in FIG. 13 illustrates a generic example of a system for providing coherent optical communication. This example shows an embodiment of a system operable to facilitate coherent optical communication of multiple wavelength signals 1902*a*–1902*n* ($Lamda_1$–$Lamda_n$) System 1900 includes an optical mixer 1906 for each wavelength signal 1902*a*–1902*n*. Each optical mixer receives an incident wavelength signal 1902 from a wavelength division demultiplexer 1903, and a local oscillator signal 1904 from a local oscillator 1912. Optical mixers 1906 combine incident wavelength signals 1902 with local oscillator signals 1904, and communicate the combined signal to a photo-detector 1908. Local oscillators 1912 reside in feedback loops 1920 between photo-detectors 1908 and optical mixers 1906.

Coherent system 1900 may comprise a homodyne or a heterodyne system. In a homodyne system, the frequencies of the incident signal and the local oscillator signal are approximately equal. In that case, the output of photo-detector 1908 carries the phase difference information of the incident signal and the local oscillator signal. Where coherent system 1900 comprises a homodyne system, local oscillator may be preceded by, for example a loop filter operable to generate an output that drives the local oscillator. In addition, these systems may implement an isolator downstream from the local oscillator to ensure that optical signals are not fed back to the local oscillator.

Heterodyne systems are those in which the frequency of the incident signal and the local oscillator signal differ by a frequency generally referred to as the "intermediate frequency." Heterodyne systems may implement, for example, an intermediate frequency filter between the photo-detector and the local oscillator. The output of the intermediate frequency filter is used to drive an automatic frequency controller coupled between the intermediate frequency filter and the local oscillator. The automatic frequency controller generates an output that is proportional to the difference of the frequency of the intermediate frequency filter output and a desired intermediate frequency value. This signal can be used to maintain the frequency difference between the local oscillator output and the received signal.

To help ensure that the incident wavelength signals 1902 and the local oscillator signals 1904 are not orthogonally polarized, system 1900 includes at least one polarization controller for each wavelength signal 1902 being processed. In the illustrated embodiment, an array 1910 of polarization controllers may reside within feedback loop 1920 to adjust the state of polarization of the local oscillator signals 1904 relative to the incident wavelength signals 1902. Alternatively, or in addition, an array 1910 of polarization controllers could reside in line with incident wavelength signals 1902, to facilitate adjustment of the state of polarization of those signals relative to the local oscillator signals 1904.

In operation, system 1900 receives incident optical wavelength signals at optical mixers 1906, and combines those signals with optical signals 1904 generated by local oscillators 1912. Optical mixers 1906 communicate combined signals to photo-detectors 1908, which generate electrical equivalents of the optical signals received. A control signal derived from the outputs from photo-detectors 1908 is communicated through feedback loops 1920 to local oscillators 1912 and/or control circuitry coupled thereto. Local oscillators 1912 generate local oscillator signals 1904 in response to the outputs of photo-detectors 1908.

In a particular embodiment, array 1910 of polarization controllers is coupled to local oscillators 1912. Each polarization controller of array 1910 includes, or is coupled to control circuitry operable to determine an adjustment needed to the state of polarization of the local oscillator signal 1904 to ensure that incident wavelength signal 1902 is not polarized orthogonally to local oscillator signal 1904. Polarization controllers of array 1910 can then adjust the state of polarization of the local oscillator signals 1904 to more closely align with the state of polarization of the corresponding incident wavelength signals 1902. As discussed above, array 1910 could alternatively, or in addition reside in line with incident wavelength signals 1902 and operate to adjust the state of polarization of those signals.

Each array of polarization controllers could be similar in structure and function to array 810 shown in FIG. 10*b*. In that embodiment, each polarization controller of array 1910 comprises a plurality of phase shift stages, where at least one of the phase shift stages shares a beam splitter with another of the phase shift stages, such as in polarization controller 610*a* shown in FIG. 7*b*. In one particular embodiment, each polarization controller of array 1810 may comprise three phase shift stages, where all phase shift stages share a common beam splitter, such as in polarization controller 610*b* shown in FIG. 7*c*. System 1900 may be particular well suited to this type of polarization controller, since the state of polarization of the local oscillator is known.

In one particular example, each of the phase shift stages may, for example, include MEMS-based devices, such as those shown in FIGS. 3*a*–3*c*, operable to undergo a substantially piston-like motion to introduce a phase shift between copies of the optical signal being phase shifted. By implementing an array of polarization controllers, such as shown in FIG. 10*b*, the invention facilitates processing of multiple wavelengths at a small incremental cost over the cost of processing a single wavelength.

V. Gain Equalization in Multiple-Wavelength Optical Signals

Figure 14A:
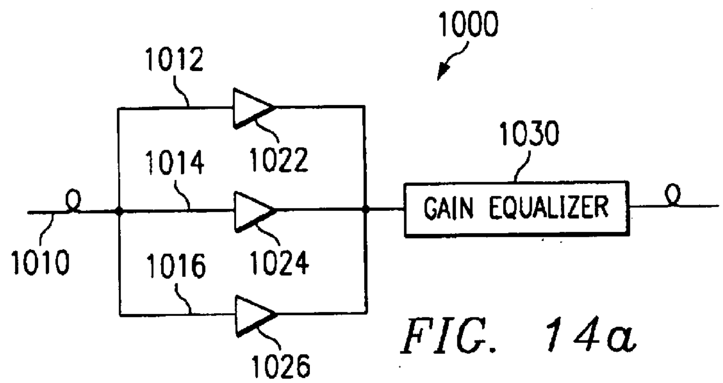
FIG. 14*a* is a block diagram of an exemplary embodiment of a multiple channel communication system having gain equalization capabilities constructed according to the teachings of the present invention.

FIG. 14*a* is a block diagram of an exemplary embodiment of a multiple channel communication system 1000 having gain equalization capabilities. Existing systems have used the conventional ("C") band of wavelengths to communicate optical signals. With the increasing demand for bandwidth, the capacity of communication systems is being expanded by the addition of new communication bands. System 1000 utilizes not only the C-band 1012 of wavelengths, but also the long wavelength ("L") band 1024 and the short wavelength ("S") band 1026. In this embodiment, each band 1012–1016 is approximately 40 nanometers wide. Other bandwidths could be utilized consistent with the invention.

System 1000 includes an optical fiber 1010 operable to communicate a plurality of wavelength bands 1012, 1014, and 1016. In the illustrated embodiment, each band 1012–1016 is amplified using one of optical amplifiers 1022–1026, respectively. Optical amplifiers 1022–1026 may comprise, for example, thulium-doped amplifiers, Raman amplifiers, and/or rare-earth doped amplifiers, such as erbium-doped amplifiers.

As additional bands are added to a communication system, the net power of the fiber is increased. The invention recognizes that when multiple bands of wavelength are communicated using a single system, longer wavelength signals tend to rob energy from shorter wavelength signals. As a consequence, it is desirable to introduce additional attenuation for longer wavelength signals to compensate for the introduced gain tilt. System 1000 addresses this need by including a gain equalizer 1030, which comprises a device operable to provide variable attenuation to one or more selected wavelengths.

In a particular embodiment, a single gain equalizer 1030 is coupled to the outputs of a plurality of amplifiers 1012–1016 in parallel. System 1000 provides an advantage of compensating for gain tilt in a multiple channel system, while maintaining an acceptable signal to noise ratio. By coupling gain equalizer 1030 to the output side of amplifiers 1012–1016, system 1000 avoids attenuating the inputs to amplifiers 1012–1016, which would degrade the signal to noise ratio.

In operation, system 1000 receives optical signal 1010 comprising a plurality of wavelength bands 1012–1016. Each of wavelength bands 1012–1016 is passed through a respective optical amplifier 1022–1026, where the optical signals are amplified. Gain equalizer 1030 receives amplified optical signals from amplifiers 1022–1026, and attenuates the signals on a per wavelength basis. In a particular embodiment, gain equalizer 1030 attenuates longer wavelength signals more than shorter wavelength signals to adjust for a gain tilt caused by the longer wavelength signals robbing energy from shorter wavelength signals.

Figure 14B:
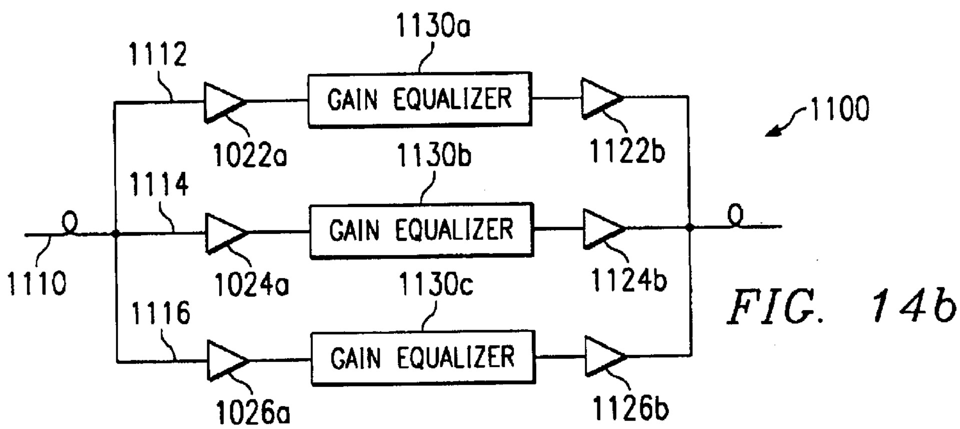
FIG. 14*b* is a block diagram of another exemplary embodiment of a multiple channel communication system having gain equalization capabilities constructed according to the teachings of the present invention.

FIG. 14*b* is a block diagram of another exemplary embodiment of a multi-channel communication system 1100 having gain equalization capabilities. System 1100 includes an optical fiber 1110 operable to communicate a plurality of wavelength bands 1112, 1114, and 1116. In the illustrated embodiment, each band 1112–1116 is amplified using one of multiple stage optical amplifiers 1122–1126, respectively. Each optical amplifier 1122–1126 comprises a plurality of stages; in this example two stages. Each amplifier 1122–1126 may comprise, for example, thulium-doped amplifiers, Raman amplifiers, and/or rare-earth doped amplifiers, such as erbium-doped amplifiers.

In the illustrated embodiment, system 1100 includes gain amplifiers 1030*a*–1030*c* coupled intermediate two stages of each of the multi-stage amplifiers 1022–1026. Implementing a gain equalizer for each of the bands 1112 provides an advantage of facilitating optimization of each gain equalizer for a more narrow range of wavelengths. Moreover, coupling gain equalizers between stages of the multi-stage amplifiers provides an advantage of maintaining an acceptable optical signal-to-noise ratio, while reducing the risk of saturating optical amplifiers.

Figure 14C:
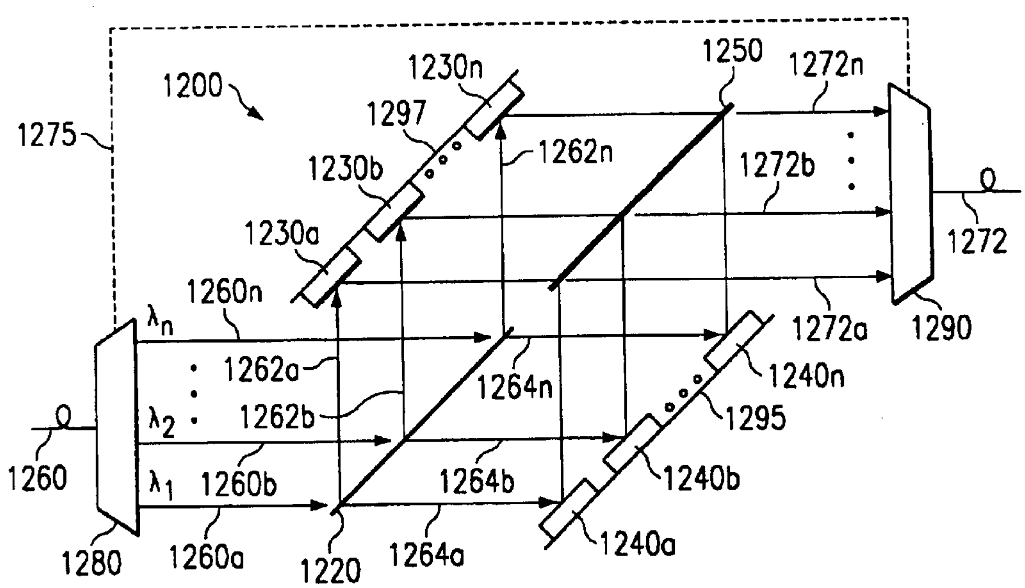
FIG. 14*c* is a block diagram of an exemplary gain equalizer suitable for use in a single or multiple band communication system and constructed according to the teachings of the present invention.

FIG. 14*c* is a block diagram of one example of a gain equalizer 1200 suitable for use in a single band communication system or a multiple band communication system. In this embodiment, gain equalizer 1200 comprises a phase-shift based gain equalizer operable to provide variable gain or attenuation on a per-wavelength basis by introducing interference between two instances of the optical signal. Gain equalizer 1200 includes a wavelength demultiplexer 1280 operable to receive optical signal 1260 and to separate optical signal 1260 into a plurality of wavelengths 1260*a*–1260*n*. Gain equalizer 1200 further includes a wavelength multiplexer 1290 operable to receive processed versions of wavelengths 1260*a–n* and to multiplex those wavelengths into one or more optical output signals 1272.

In some cases, optical input signal 1260 may comprise wavelengths that need not be processed by gain equalizer 1200. In particular embodiments, gain equalizer 1200 includes a bypass 1275 coupled between demultiplexer 1280 and multiplexer 1290. Bypass 1275 facilitates communication of selected wavelengths between demultiplexer 1280 and multiplexer 1290 without the need to process those signals. Gain equalizer 1200, therefore, provides an advantage in systems, such as metro communication systems, which may use multiple wavelengths, but not require processing of all wavelengths all of the time.

In this example, gain equalizer 1200 comprises a plurality of phase shift stages, each operable to receive one wavelength 1260 and to introduce attenuation or gain into that wavelength depending on a phase shift operating on that signal 1260. Although the phase shift stages shown in FIG. 14*c* have a similar configuration to those shown in FIG. 2*a*, other configurations could be implemented, such as those shown in FIGS. 1*c*–1*d*.

In this example, each phase shift stage receives from a first beam splitter 1220*a* a first copy 1262 and a second copy 1264 of its associated wavelength 1260. Each phase shift stage includes at least a first mirror 1230 and a second mirror 1240, operable to receive the first and second signal copies 1262 and 1264, respectively.

At least one of first and second mirrors 1230 and 1240 comprises a moveable mirror operable to change its position relative to first beam splitter 1220 to create a change in the length of the signal path traveled by first signal copy 1262 relative to the length of the signal path traveled by second signal copy 1264. This change in signal path length corresponds to a phase shift between the two signal copies, which results in an interference when the signal copies are combined at a second beam splitter 1250. System 1200 may implement any moveable mirror structure, such as one of the moveable mirror structures described with respect to FIGS. 3*a*–3*c*. By controlling the amount and direction that each mirror 1230 and/or 1240 is moved, system 1200 facilitates variable gain or attenuation of each wavelength 1260*a*–1260*n* of signal 1260.

Using micro-electro-optic system (MEMS) based mirrors, such as those described with respect to FIGS. 3*a*–3*c*, provides an advantage of facilitating large scale replication of each phase shift stage. For example, each plurality of first mirrors 1230 could be simultaneously formed on a single semiconductor substrate 1295. Likewise, each plurality of second mirrors 1240 could be simultaneously formed on a single semiconductor substrate. One aspect of the invention, therefore, facilitates construction of gain equalizers capable of processing numerous wavelengths for a small incremental cost over a single stage of attenuators. This aspect of the invention provides significant cost savings in processing signals carrying information on multiple channels or wavelengths.

Figure 15:
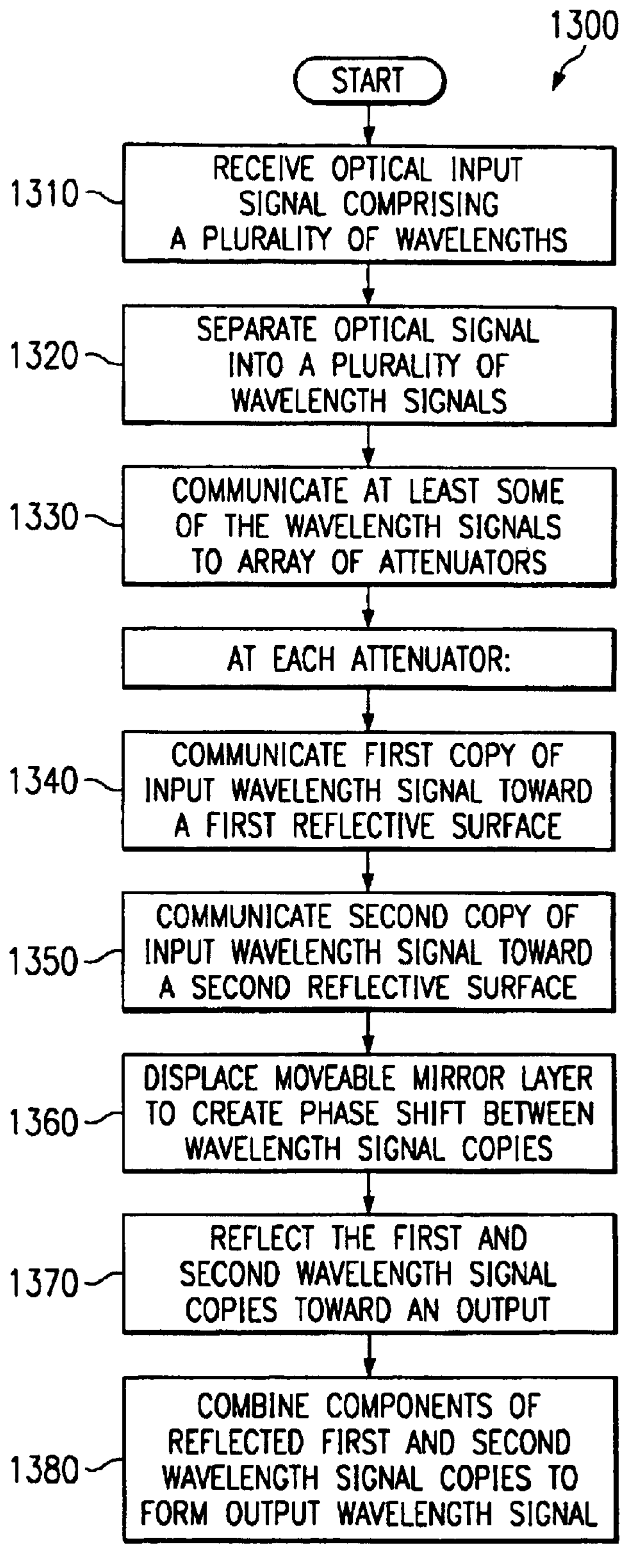
FIG. 15 is a flowchart showing one example of a method of facilitating gain equalization of a plurality of wavelengths according to the teachings of the present invention.

FIG. 15 is a flowchart showing one example of a method 1300 of facilitating gain equalization of an optical signal having a plurality of wavelengths. The method 1300 begins at step 1310 where gain equalizer 1200 receives optical signal 1260 and separates wavelengths 1260*a*–1260*n* at step 1320. This may include, for example, demultiplexing input signal 1260 into its constituent wavelengths.

Gain equalizer 1200 may bypass wavelengths that do not need to be processed by communicating those wavelengths over bypass 1275. Other wavelengths are communicated to one or more first beam splitters 1220 of each attenuator of equalizer 1200 at step 1330. Beam splitters 1220 of each attenuator communicate a first copy of the input wavelength 1262 toward first mirrors 1230 at step 1350, and communicate a second copy 1264 toward second mirrors 1240. In this example, at least one of first mirror 1230 and second mirror 1240 comprises a MEMS device having a moveable mirror layer operable to move in an at least substantially piston-like motion relative to a semiconductor substrate. One or more MEMS devices 1230 and/or 1240 receive control signals at step 1360 causing their respective moveable mirror layers to undergo an at least substantially piston-like movement, changing the moveable mirror layer's location with respect to beam splitter 1220. First and second mirrors 1230 and 1240 reflect wavelength signal copies 1262 and 1264 toward an output at step 1370. The output may comprise, for example, beam splitter 1250. In other embodiments, beam splitter 1220 may comprise the input and the output to the attenuator.

In any case, components of the wavelength signal copies are combined at step 1380 to generate an output wavelength signal that varies in amplitude from the input wavelength signal 1260 due to a phase shift caused by the piston-like movement of one or more moveable mirror layers of mirrors 1230 and/or 1240.

VI. Optical Add/Drop Multiplexing

FIG. 16*a* is a block diagram showing one embodiment of an exemplary system 1400 operable to perform wave division add/drop multiplexing. System 1400 includes a wave division demultiplexer 1410 operable to receive an optical signal 1460 and to separate optical signal 1460 into a plurality of wavelengths 1460*a*–1460*n*. System 1400 further includes a wavelength multiplexer 1490 operable to receive processed versions of wavelengths 1460*a–n* and to multiplex those wavelengths into one or more optical output signals 1472.

System 1400 further comprises an array 1445 of MEMS-based optical add/drop multiplexers, each operable to facilitate add/drop multiplexing of one of wavelengths 1460*a–n*. In a particular embodiment, MEMS array 1445 may comprise an array of MEMS having moveable mirror structures operable to be displaced in an at least substantially piston-like motion to create an interference between two substantial copies of the wavelength signal. Implementing array 1445 using MEMS-based arrays facilitates wave-division add/drop multiplexing on any number of wavelengths 1460*a–n* at a small incremental cost over facilitating add/drop multiplexing for a single wavelength signal. As a result, system

1400 provides a cost effective mechanism for wave-division add/drop multiplexing large numbers of wavelengths.

In some cases, optical input signal 1460 may comprise wavelengths that need not be processed by array 1445. In particular embodiments, system 1400 includes a bypass 1475 coupled between demultiplexer 1410 and multiplexer 1490. Bypass 1475 facilitates communication of selected wavelengths between demultiplexer 1410 and multiplexer 1490 without the need to process those signals. System 1400, therefore, provides an advantage in systems, such as metro communication systems, which may use multiple wavelengths, but not require processing of all wavelengths all of the time.

In operation, system 1400 receives input signal 1460 and demultiplexes that signal into a plurality of wavelength signals 1460*a*–1460*n*. Some of wavelengths 1460*a–n* may be routed over bypass 1475, while others are directed toward array 1445 of MEMS-based add/drop multiplexers. MEMS-based add/drop multiplexers receive wavelengths 1460*a–n* and may drop the received wavelength in favor of an added wavelength signal to replace the dropped wavelength. Processed wavelengths 1460*a–n* and bypassed wavelengths 1460*a–n* are then combined at wavelength division multiplexer 1490 and communicated as output signal 1472.

FIG. 16*b* is a block diagram showing one particular example of a MEMS-based add/drop multiplexer (ADM) 1405. In the illustrated embodiment, ADM 1405 is similar in structure and operation to two-by-two switch 310 shown in FIG. 5*b*. The invention is equally applicable to other configurations, such as that shown in FIG. 1*c*.

ADM 1405 includes a first beam splitter 1420, which receives both an input optical signal 1461, as well as an added signal 1465. Beam splitter 1420 generates a first copy and a second copy of both input signal 1461 and added signal 1465. ADM 1405 communicates the first copies along a first signal path 1462 and the second copies along a second signal path 1464. A first mirror 1430 receives first signal copies from signal path 1462 and reflects those signal copies toward an output, in this case second beam splitter 1450. A second mirror 1440 receives second signal copies from signal path 1464 and reflects those signal copies toward an output, in this case second beam splitter 1450. The reflected first and second signal copies are combined at the output, in this case a second beam splitter 1450.

By changing the position of one or more of the mirrors 1430 and 1440 residing between the input and the output of the phase shifter, a phase shift is introduced between the first and second signal copies. By introducing a particular phase shift, ADM 1405 can facilitate pass through operation, or add/drop operation. In a pass through mode of operation, ADM 1405 operates to communicate input signal 1461 to an output 1472 for further transmission. In an add/drop mode, ADM 1405 operates to drop input signal 1461 at drop output 1474, and to communicate added signal 1465 to output 1472 for transmission in lieu of input signal 1461.

Some or all of mirrors 1430 and 1440 can comprise moveable mirror structures operable to vary their positions to result in a change in the length of the path of and phase difference between first and/or second signal copies communicated along signal paths 1462 and 1464. For example, the intensity of transmitted output signal 1472 is proportional to $\cos^2$ of one half of the phase difference between first and second signal copies of the input signal 1461, and the $\sin^2$ of one half of the phase difference between the first and second copies of added signal 1465. Likewise, the intensity of dropped output signal 1474 is proportional to $\sin^2$ of one half of the phase difference between first and second signal copies of the input signal 1461, and the $\cos^2$ of one half of the phase difference between the first and second copies of added signal 1465.

Therefore, when there is no phase difference (or a phase difference of 2Pi, or an even multiple thereof) input signal 1461 is communicated as transmitted output 1472. Where there is a Pi (or odd multiple of Pi) phase difference, input signal 1461 is dropped at drop output 1474, and added signal 1465 is communicated over transmitted output 1472. By varying the positions of mirrors 1430 and/or 1440 to switch between a phase difference of, for example, approximately zero and Pi, ADM 1405 facilitates either passing input signal 1461 through to transmitted output 1472, or dropping input signal 1461 in favor of added signal 1465 for transmission over transmitted output 1472.

Although the illustrated embodiment shows just one MEMs device in each arm of the phase shifter, additional MEMs devices could be implemented without departing from the invention. Furthermore, although MEMs devices 1430 and 1440 are shown at an approximately forty-five degree grazing angle, these devices could be located at other grazing angles to the signals being reflected.

FIG. 16*c* is a block diagram showing another example of a MEMS-based add/drop multiplexer (ADM) 1500. In the illustrated embodiment, ADM 1500 includes a drop phase shift stage 1505 that is separate from an add phase shift stage 1510. This embodiment may be particularly useful, for example, where it is desired to reduce or eliminate interference between input and added signals that would otherwise traverse the same phase shift stage.

In this example, drop phase shift stage 1505 receives an optical input signal 1560 and operates to either communicate signal 1560 to add phase shift stage 1510, or to drop signal 1560 from the circuit. Add phase shift stage 1510 operates to either input signal 1560 from drop phase shift stage 1505 or to receive an added optical signal 1565, and to communicate the received signal to output 1572.

In this example, add phase shift stage 1505 includes a beam splitter 1520*a*, which receives input signal 1560 and sends a first signal copy 1562*a* toward a first mirror 1530*a*, and a second signal copy 1564*a* toward a second mirror 1540*a*. First and second mirrors 1530*a* and 1540*a* reflect first and second signal copies 1562*a* and 1564*a* toward a second beam splitter 1550*a*. In this embodiment, second beam splitter 1550*a* combines components of the reflected first and second signal copies 1562*a* and 1564*a* to form output signals 1572*a* and 1574*a*.

Add phase stage 1510 is similar in structure and function to drop phase stage 1505. Add phase stage 1510 includes a beam splitter 1520*b*, which receives either signal 1574*a* being passed through from add phase stage 1505, or an added signal 1565. Beam splitter 1520*b* sends a first signal copy 1562*b* of the signal it receives toward a first mirror 1530*b*, and a second signal copy 1564*b* toward a second mirror 1540*b*. First and second mirrors 1530*b* and 1540*a* reflect first and second signal copies 1562*b* and 1564*b* toward a second beam splitter 1550*b*. In this embodiment, second beam splitter 1550*b* combines components of the reflected first and second signal copies 1562*b* and 1564*b* to form output signal 1576.

Some or all of mirrors 1530 and 1540 can comprise moveable mirror structures operable to vary their positions to result in a change in the length of the path of and phase difference between first and/or second signal copies 1562 and 1564. By varying the positions of mirrors 1530*a* and/or 1540*a* to switch between a phase difference of, for example, approximately zero and Pi, drop phase stage 1505 facilitates switching between passing input signal 1560 though stage 1505 and dropping signal 1560 from stage 1505. Similarly, by varying the positions of mirrors 1530*b* and/or 1540*b* to switch between a phase difference of, for example, approximately zero and Pi, drop phase stage 1505 facilitates outputting either pass through signal 1574, or added signal 1565 at output 1576.

Although this embodiment shows pass-through operation between stages over output 1574 and drop operation over port 1572, add/drop multiplexer could be reconfigured to communicate pass-through signals from port 1572 to port 1565 and drop signals from port 1574. In that embodiment, signals would pass through from the drop stage to the add stage at port 1572 where mirrors 1530*a*/1540*a* are positioned to provide a Pi phase shift, and would be dropped at port 1574 where those mirrors were positioned to provide no phase shift. Likewise, the input signal would pass through add stage to output 1576 where mirrors 1530*b*/1540*b* are positioned to create a Pi phase shift, whereas added signal 1565 would pass to output 1576 where those mirrors create no phase shift.

In operation, ADM 1500 receives input signal 1560 at beam splitter 1520*a* and communicates a first signal copy 1562*a* toward first mirror 1530*a* and a second signal copy 1564*a* toward second mirror 1540*a*. Mirrors 1530*a* and 1540*a* reflect first and second signal copies 1562*a* and 1564*a* toward beam splitter 1550*a*, which operates to combine components of those signals to generate an output signal. Depending on the position of mirrors 1530*a* and/or 1540*a*, drop phase shift stage 1505 will either pass input signal 1560 toward add phase shift stage 1510, or will drop input signal 1560 at output 1572, sending no signal to add phase shift stage 1510.

Add phase shift stage 1510 either receives pass through input signal 1574 from drop phase shift stage 1505, or receives added signal 1565. Mirrors 1530*b* and/or 1540*b* are then positioned to pass the received signal to output 1576. For example, in this embodiment if add phase shift stage 1510 receives a pass through signal 1574, mirrors 1530*b* and/or 1540*b* are positioned to introduce approximately no phase shift (or a multiple of 2Pi phase shift) between signal copies 1562*b* and 1564*b* to result in pass through signal 1574 being communicated through output 1576. On the other hand, if add phase shift stage instead receives added signal 1565, mirrors 1530*b* and/or 1540*b* are positioned to introduced an approximately Pi (or odd multiple of PI) phase shift between signal copies 1562*b* and 1564*b* to result in added signal 1565 being communicated through output 1576.

Figure 16D:
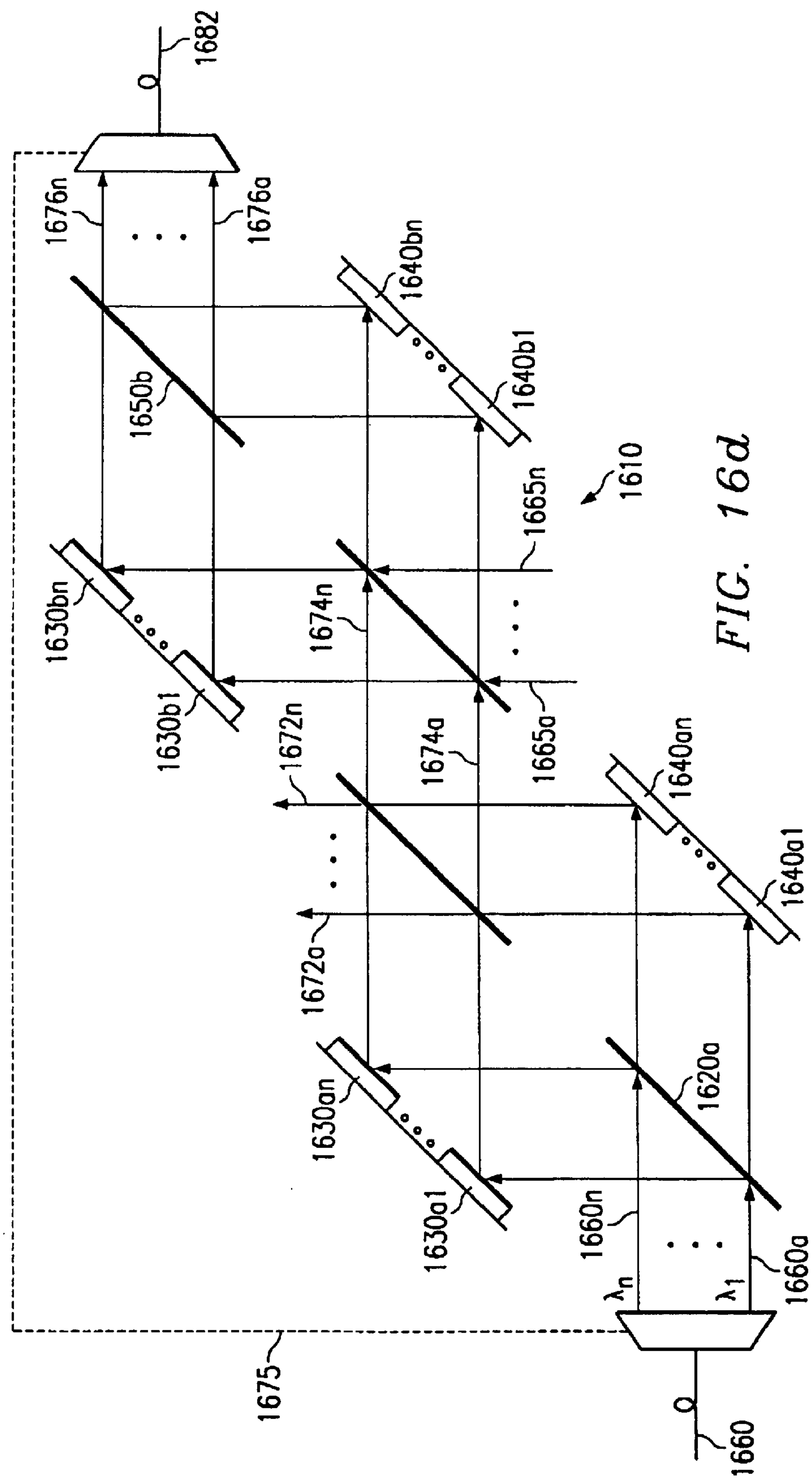
FIG. 16*d* is a block diagram showing a plurality of add/drop multiplexers as shown in FIG. 10*b* arranged to collectively form a wave division add/drop multiplexer according to the teachings of the present invention.

FIG. 16*d* is a block diagram showing a plurality of add/drop multiplexers as shown in FIG. 16*b* arranged to collectively form a wave division add/drop multiplexer 1600. In this example, each ADM of array 1610 is similar to that shown in FIG. 16*c*. Of course, an array of add/drop multiplexers could likewise be formed from add/drop multiplexers such as those shown in FIG. 16*b*.

In the illustrated embodiment, each drop phase shift stage includes two arms, at least one of which comprises a moveable mirror structure 1630*a* and/or 1640*a*. Mirrors 1630*a* and/or 1640*a* are operable to move in response to one or more control signals to result in a change in the length of the signal path and, therefore, a phase shift between signal copies communicated through the arms of the drop phase shift stages. Depending on the positions of mirrors 1630*a*1–*n* and/or 1640*a*1–*n*, wavelength signals 1660*a*–1660*n* can be selectively dropped or passed as inputs to the add phase shift stages.

Each add phase shift stage includes two arms, at least one of which comprises a moveable mirror structure 1630*b* and/or 1640*b*. Mirrors 1630*b* and/or 1640*b* are operable to move in response to one or more control signals to result in a change in the length of the signal path and, therefore, a phase shift between signal copies communicated through the arms of the drop phase shift stages. Depending on the positions of mirrors 1630*b*1–*n* and/or 1640*b*1–*n*, either pass though signals 1674 or added signals 1665 can be selectively communicated to outputs 1676.

Although the illustrated embodiment shows just one MEMs device in each arm of each phase shifter stage, additional MEMs devices could be implemented without departing from the invention. Furthermore, although MEMs devices 1630 and 1640 are shown at an approximately forty-five degree grazing angle, these devices could be located at other grazing angles to the signals being reflected.

Using micro-electro-optic system (MEMS) based mirrors, such as those described with respect to FIGS. 3*a*–3*c*, provides an advantage of facilitating large scale replication of each add/drop stage. For example, each plurality of first mirrors 1530 could be simultaneously formed on a single semiconductor substrate. Likewise, each plurality of second mirrors 1540 could be simultaneously formed on a single semiconductor substrate. One aspect of the invention, therefore, facilitates construction of add/drop multiplexers capable of processing numerous wavelengths for a small incremental cost over a single stage add/drop multiplexer. This aspect of the invention provides significant cost savings in processing signals carrying information on multiple channels or wavelengths.

Figure 17:
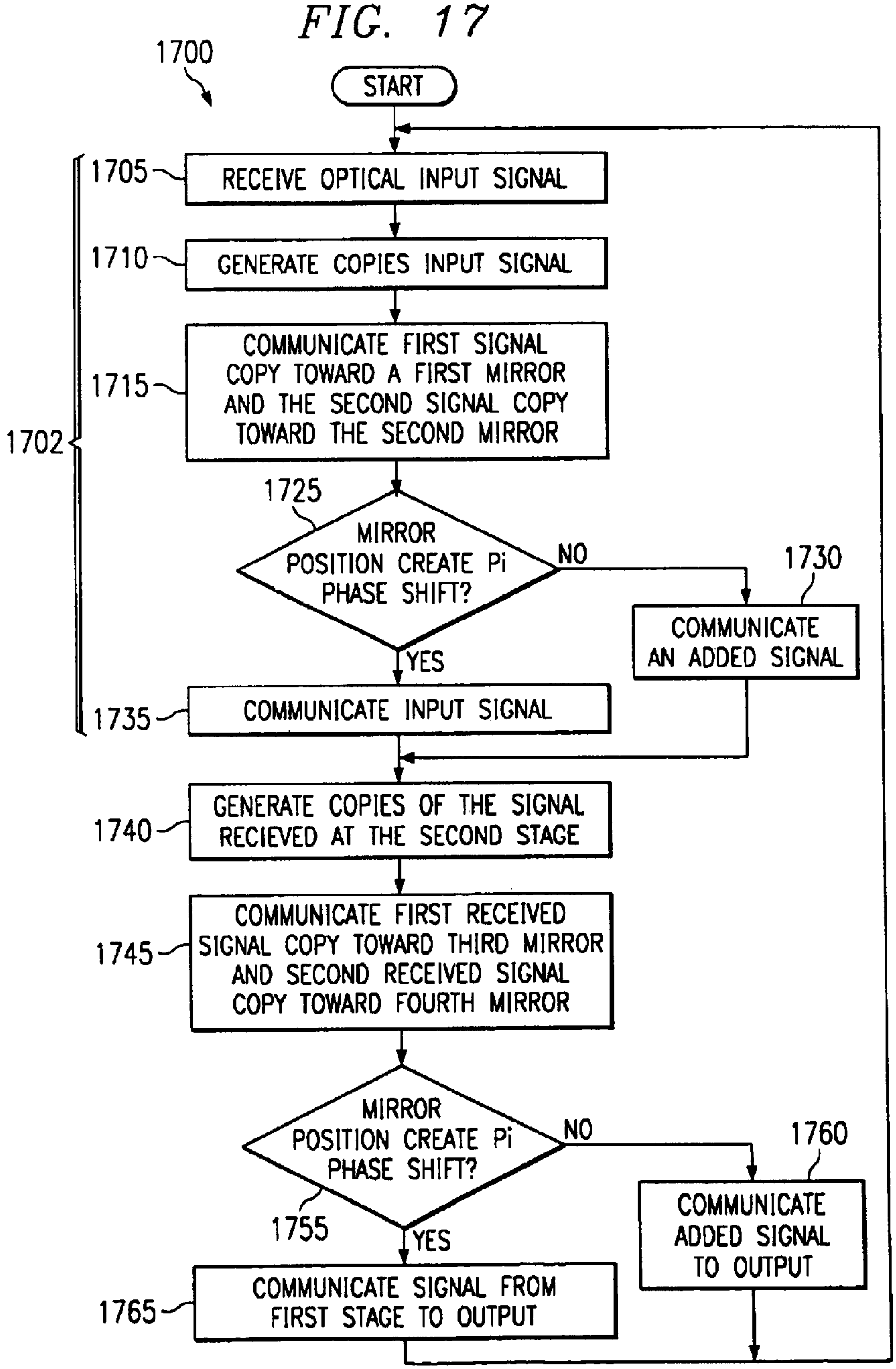
FIG. 17 is a flowchart showing one example of a method of facilitating add/drop multiplexing of optical signals according to the teachings of the present invention.

FIG. 17 is a flowchart showing examples of a method 1700 of facilitating optical add/drop multiplexing. Steps 1705 through 1730 describe a method 1702 applicable to both single phase shift solutions as well as embodiments using separate phase shift stages for add and drop operations.

In an embodiment using one phase shift stage to facilitate both pass-through operation and add/drop operation, the method 1700 begins at step 1705 where optical add/drop multiplexer (ADM) 1405 receives an optical input signal 1461. This may include, for example, receiving from a wave division multiplexer one wavelength of an optical signal at a beam splitter 1420. This may further include receiving an added signal 1465 at beam splitter 1420. ADM 1405 generates copies of the signals received by beam splitter 1420 at step 1710 and communicates, at step 1715, those copies toward first and second mirrors 1430 and 1440, respectively.

Depending on the desired function, ADM 1405 may position one or more of the mirrors to contribute to phase shift between the first and second signal copies. This may include, for example, one or both of mirrors 1430 and 1440 receiving control signals operable to cause a moveable mirror element to move toward an inner conductive layer.

Through the use of moving mirror elements, ADM 1405 can introduce a phase shift sufficient to either pass input signal 1461 transmitted output 1472, or to drop input signal 1461 in favor of added signal 1465, which will then be communicated from transmitted output 1472. For example, mirrors 1430 and/or 1440 can introduce no phase shift (or a multiple of 2 Pi) between the signal copies, causing input signal 1461 to pass toward transmitted output 1472 at step 1735. Alternatively, mirrors 1430 and/or 1440 can introduce a Pi (or odd multiple of Pi) phase shift at step 1725 to cause input signal 1461 to be dropped at output 1474. In that case, added signal 1465 is communicated as transmitted output 1472 at step 1730. Of course, the locations of input for input signal 1461 and added signal 1465 could be flipped without departing from the invention. In that case, a Pi (or odd multiple of Pi) phase difference would cause the input signal 1461 to be communicated at output 1472, while a zero (or 2Pi, or multiple of 2Pi) phase difference would cause added signal 1465 to be communicated as output 1472.

Steps 1705 through 1730 are also applicable to an embodiment using separate phase shift stages for the add and drop operations. In that case, the method 1700 begins at step 1705, where optical add/drop multiplexer (ADM) 1500 receives an optical input signal 1560. This may include, for example, receiving from a wave division multiplexer one wavelength of an optical signal at a beam splitter 1520*a*. ADM 1500 generates copies of that signal at step 1710 and communicates, at step 1715, the copies toward first and second mirrors 1530*a* and 1540*a*, respectively.

Depending on the desired signal processing function, ADM 1500 may position one or more of the mirrors to contribute to phase shift between the first and second signal copies at step 1720. This may include, for example, one or both of mirrors 1530*a* and 1540*a* receiving control signals operable to cause a moveable mirror element to move toward an inner conductive layer. ADM 1500 can introduce a phase shift sufficient to either pass input signal 1560 toward second stage 1510, or to drop input signal 1560 at output 1572, depending on the particular configuration being utilized.

In the particular example shown in FIG. 16*b*, mirrors 1530*a* and/or 1540*a* can introduce no phase shift (or a multiple of 2 Pi phase shift) between the signal copies, causing input signal 1560 to pass toward second phase 1510 at step 1735. Alternatively, mirrors 1530*a* and/or 1540*a* can introduce a Pi (or odd multiple of Pi) phase shift at step 1725 to cause input signal 1560 to be dropped at output 1572. In that case, an added signal 1565 is input to second stage 1510 at step 1730.

Regardless of whether the input signal 1560 is passed to second stage 1510 or whether added signal 1565 is introduced at second stage 1510, beam splitter 1520*b* of second stage 1510 generates copies of the signal received at step 1740. The signal copies are communicated to first and second mirrors 1530*b* and 1540*b* at step 1745. Again depending on the configuration and signal processing desired, ADM 1500 can positions one or more of the mirrors 1530*b* and/or 1540*b* to contribute to phase shift between the first and second signal copies. This may include, for example, one or both of mirrors 1530*b* and 1540*b* receiving control signals operable to cause a moveable mirror element to move toward an inner conductive layer.

ADM 1500 can introduce a phase shift sufficient to either pass input signal 1560 toward output 1576, or to pass added signal 1565 to output 1576. For example, mirrors 1530*b* and/or 1540*b* can introduce no phase shift (or a multiple of 2 Pi phase shift) between the signal copies, causing input signal 1560 to pass to output 1576 at step 1765. Alternatively, mirrors 1530*b* and/or 1540*b* can introduce Pi (or odd multiple of Pi) phase shift at step 1755 to cause added signal 1565 to be output at step 1760. Of course, the phase shifts discussed herein are for exemplary purposes only. Other configurations could use other phase shift combinations to achieve the desired signal processing consistent with the invention.

These steps can be duplicated at each add/drop multiplexer in an array of add/drop multiplexers to facilitate processing of any number of individual wavelength signals. This aspect of the invention provides a significant advantage in providing cost effective signal processing in multiple wavelength systems.

Although various aspects of the present invention have been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. An optical processing system, comprising:

a light pipe operable to communicate at least a portion of an optical signal for processing, the optical signal comprising a plurality of wavelengths;

a first beam splitter operable to divide the optical signal into at least a first part and a second part, the first part of the optical signal having an input state of polarization;

an optical signal separator operable to receive at least the first part of the optical signal and to communicate at least a portion of the first part to a polarization adjustment device for processing, the polarization adjustment device comprising:

a first polarization beam splitter operable to receive the at least a portion of the first part of the optical signal and to separate the at least a portion of the first part of the optical signal into a first and a second principal mode of polarization; and at least three stages of phase shifters each operable to introduce a phase shift between the first and second principal modes, at least one phase shifter comprising a second beam splitter that is shared with at least one other of the phase shifters, the at least three stages of phase shifters comprising a first stage coupled to the first polarization beam splitter and a second stage coupled to a second polarization beam splitter, wherein the second beam splitter that is shared comprises a partially transmitting mirror;

a combiner operable to combine one or more phase shifted portions of the first part of the optical signal into a phase shifted output signal; and an optical reflector operable to receive at least some of the phase shifted optical signal and to communicate the phase shifted optical signal to an output.

2. The optical processing system of claim 1, wherein at least some of the plurality of wavelengths comprise a different center wavelength.

3. The optical processing system of claim 1, wherein the optical signal comprises three bands of light and wherein each of the three bands of light comprise 40 nanometers or more of optical bandwidth.

4. The optical processing system of claim 1, wherein the first and second beam splitters are selected from the group consisting of a substrate having one or more layers of dielectric coating, a partially silvered mirror, and a fiber coupler.

5. The optical processing system of claim 1, wherein the second beam splitter is operable to pass a first copy of the first part of the optical signal in a first direction and a second copy of the first part of the optical signal in a second direction.

6. The optical processing system of claim 5, wherein the first copy and second copy have substantially equal quantities of wavelengths.

7. The optical processing system of claim 5, wherein the first copy and second copy have substantially unequal amplitudes.

8. The optical processing system of claim 1, wherein light pipe comprises an optical fiber.

9. The optical processing system of claim 1, further comprising one or more polarization converters operable to receive the optical signal and to change at least one of a first and second principal modes of polarization of the optical signal.

10. The optical processing system of claim 9, wherein the polarization converter is operable to change the at least one of the first and second principal modes of polarization of the optical signal to an orthogonal mode of polarization.

11. The optical processing system of claim 9, wherein the polarization converter is operable to form a substantially common polarization state for the optical signal.

12. The optical processing system of claim 9, wherein the polarization converter is selected from the group consisting of wave plates, transverse electrical transverse magnetic converters, Faraday converters, polarization beam splitters, and mirrors.

13. The optical processing system of claim 1, wherein the optical signal separator is a wavelength division demultiplexer.

14. The optical processing system of claim 1, wherein the optical signal separator is a beam splitter with one or more dielectric layers.

15. The optical processing system of claim 1, wherein the phase shift introduced by each of the phase shifters operates to orient an outgoing state of polarization of at least a portion of the first part of the optical signal.

16. The optical processing system of claim 1, wherein at least one phase shifter comprises a reflective surface for reflecting at least a portion of the first part of the optical signal.

17. The optical processing system of claim 1, wherein at least one of the phase shifters is formed on a semiconductor substrate.

18. The optical processing system of claim 17, wherein the semiconductor substrate is selected from the group consisting of silicon and polysilicon.

19. The optical processing system of claim 1, wherein at least one phase shifter comprises an array of phase shifting devices formed on a semiconductor substrate.

20. The optical processing system of claim 1, wherein at least one phase shifter changes state based on a voltage applied to the phase shifter.

21. The optical processing system of claim 1, wherein at least one phase shifter comprises a micro-electro-optic system (MEMS) device, the MEMS device comprising:

an inner conductive layer;

a conductive moveable mirror layer disposed outwardly from the inner conductive layer and forming a space between the moveable mirror layer and the inner conductive layer;

wherein the moveable mirror layer is operable to move relative to the inner conductive layer in response to a voltage difference between the moveable mirror layer and the inner conductive layer.

22. The optical processing system in claim 1, wherein the three stages of phase shifters are serially connected.

23. The optical processing system of claim 1, wherein at least some of the phase shifters operate in parallel on different portions of the first part of the optical signal received from the optical signal separator.

24. The optical processing system of claim 1, wherein the combiner comprises a wavelength division multiplexer that multiplexes the phase shifted portions of the first part of the optical signal into a phase shifted multiple wavelength output signal.

25. The optical processing system of claim 1, wherein the optical reflector comprises one or more mirrors.

26. The optical processing system of claim 1, wherein the optical reflector operates to change the direction of the phase shifted output signal to the output.

27. The optical processing system of claim 1, wherein the optical reflector comprises one or more substantially flat mirrors.

28. The optical processing system of claim 1, further comprising one or more reflective surfaces to communicate the optical signal to the polarization adjustment device.

29. The optical processing system of claim 1, further comprising electronic circuitry to generate one or more control signals for controlling the at least three stages of phase shifters.

30. A method of processing multiple wavelengths of light, the method comprising:

communicating at least a portion of an optical signal for processing, the optical signal comprising a plurality of wavelengths;

dividing the optical signal into at least a first part and a second part, the first part of the optical signal having an input state of polarization;

separating the first part of the optical signal into at least a first portion of optical signal wavelengths and a second portion optical signal wavelengths;

receiving at least the first portion of optical signal wavelengths at a polarization adjustment device;

using the polarization adjustment device, controlling a state of polarization of at least the first portion the optical signal wavelengths, wherein controlling the state of polarization of the first portion of the optical signal wavelengths comprises:

separating the first portion the optical signal wavelengths into a first principal mode of polarization and a second principal mode of polarization; and introducing at least three stages of phase shift between the first and second modes of polarization to align the first and second modes of polarization, wherein at least one phase shift stage shares a beam splitter with at least one other phase shift stage and wherein the beam splitter that is shared comprises a partially transmitting mirror;

combining one or more phase shifted portions of the first portion the optical signal wavelengths into a phase shifted output signal; and communicating the phase shifted optical signal to an output.

31. The method of claim 30, wherein the beam splitter that is shared is operable to pass a first copy of the first portion of the optical signal wavelengths in a first direction and a second copy of the first portion of the optical signal wavelengths in a second direction.

32. The method of claim 31, wherein the first copy and second copy have substantially equal quantities of wavelengths.

33. The method of claim 30, further comprising manipulating at least one of a first principal mode of polarization and a second principal modes of polarization of the optical signal.

34. The method of claim 33, wherein manipulating at least one of the first and second principal modes of polarization operates to form a substantially common polarization state for the optical signal.

35. The method of claim 30, wherein the introduction of the phase shift operates to orient an outgoing state of polarization of at least a portion of the first portion of the optical signal wavelengths.

36. The method of claim 30, wherein the least one phase shift state comprises a micro-electro-optic system (MEMS) device, the MEMS device comprising:

an inner conductive layer;

a conductive moveable mirror layer disposed outwardly from the inner conductive layer and forming a space between the moveable mirror layer and the inner conductive layer;

wherein the moveable mirror layer is operable to move relative to the inner conductive layer in response to a voltage difference between the moveable mirror layer and the inner conductive layer.

37. An optical processing system, comprising:

a light pipe operable to communicate at least a portion of an optical signal for processing, the optical signal comprising a plurality of wavelengths;

a first beam splitter operable to divide the optical signal into at least a first part and a second part, the first part of the optical signal having an input state of polarization;

an optical signal separator operable to receive at least the first part of the optical signal and to communicate at least a portion of the first part to a polarization adjustment device for processing, the polarization adjustment device comprising:

at least two stages of phase shifters each operable to receive a first and a second principal mode of polarization of the first part of the optical signal, and to introduce a phase shift between the first and second principal modes, at least one phase shifter comprising a beam splitter that is shared with at least one other of the phase shifters, wherein the beam splitter that is shared comprises a partially transmitting mirror and wherein each of the phase shift stages is operable to introduce a phase shift between the first and second principal modes in less than one milli-second;

a combiner operable to combine one or more phase shifted portions of the first part of the optical signal into a phase shifted output signal; and an optical reflector operable to receive at least some of the phase shifted optical signal and to communicate the phase shifted optical signal to an output.

38. The optical processing system of claim 37, wherein the second beam splitter is operable to pass a first copy of the first part of the optical signal in a first direction and a second copy of the first part of the optical signal in a second direction.

39. The optical processing system of claim 38, wherein the first copy and second copy have substantially equal quantities of wavelengths.

40. The optical processing system of claim 37, further comprising one or more polarization converters operable to receive the optical signal and to change at least one of a first and second principal modes of polarization of the optical signal.

41. The optical processing system of claim 40, wherein the polarization converter is operable to form a substantially common polarization state for the optical signal.

42. The optical processing system of claim 37, wherein the phase shift introduced by each of the phase shifters operates to orient an outgoing state of polarization of at least a portion of the first part of the optical signal.

43. The optical processing system of claim 37, wherein at least one phase shifter comprises an array of phase shifting devices formed on a semiconductor substrate.

44. The optical processing system of claim 37, wherein at least one phase shifter comprises a micro-electro-optic system (MEMS) device, the MEMS device comprising:

an inner conductive layer;

a conductive moveable mirror layer disposed outwardly from the inner conductive layer and forming a space between the moveable mirror layer and the inner conductive layer;

wherein the moveable mirror layer is operable to move relative to the inner conductive layer in response to a voltage difference between the moveable mirror layer and the inner conductive layer.

45. The optical processing system in claim 37, wherein the two stages of phase shifters are serially connected.

46. The optical processing system of claim 37, wherein the optical reflector comprises one or more substantially flat mirrors.

47. The optical processing system of claim 37, further comprising electronic circuitry to generate one or more control signals for controlling the at least three stages of phase shifters.

48. A method of processing multiple wavelengths of light, the method comprising:

communicating at least a portion of an optical signal for processing, the optical signal comprising a plurality of wavelengths;

dividing the optical signal into at least a first part and a second part, the first part of the optical signal having an input state of polarization;

separating the first part of the optical signal into at least a first portion of optical signal wavelengths and a second portion optical signal wavelengths;

receiving at least the first portion of optical signal wavelengths at a polarization adjustment device;

using the polarization adjustment device, controlling a state of polarization of at least the first portion the optical signal wavelengths, wherein controlling the state of polarization of the first portion of the optical signal wavelengths comprises:

separating the first portion the optical signal wavelengths into a first principal mode of polarization and a second principal mode of polarization; and introducing at least two stages of phase shift between the first and second modes of polarization to align the first and second modes of polarization, wherein at least one phase shift stage shares a beam splitter with at least one other phase shift stage, wherein the beam splitter that is shared comprises a partially transmitting mirror, and wherein each of the phase shift stages are operable to introduce a phase shift between the first and second principal modes in less than one milli-second;

combining one or more phase shifted portions of the first portion the optical signal wavelengths into a phase shifted output signal; and communicating the phase shifted optical signal to an output.

* * * * *